US012551550B2

(12) United States Patent
Brahmbhatt et al.

(10) Patent No.: US 12,551,550 B2
(45) Date of Patent: *Feb. 17, 2026

(54) COMPOSITIONS AND VACCINES FOR TREATING AND/OR PREVENTING CORONAVIRUS VARIANT INFECTIONS AND METHODS OF USING THE SAME

(71) Applicant: EnGeneIC Molecular Delivery Pty Ltd, Sydney (AU)

(72) Inventors: Himanshu Brahmbhatt, Sydney (AU); Jennifer MacDiarmid, Sydney (AU)

(73) Assignee: EnGeneIC Molecular Delivery Pty Ltd, Sydney (AU)

( * ) Notice: Subject to any disclaimer, the term of this patent is extended or adjusted under 35 U.S.C. 154(b) by 718 days.

This patent is subject to a terminal disclaimer.

(21) Appl. No.: 17/870,536

(22) Filed: Jul. 21, 2022

(65) Prior Publication Data

US 2023/0041309 A1    Feb. 9, 2023

Related U.S. Application Data

(63) Continuation-in-part of application No. 17/480,073, filed on Sep. 20, 2021, now Pat. No. 12,357,687.

(60) Provisional application No. 63/224,838, filed on Jul. 22, 2021.

(51) Int. Cl.
| | |
|---|---|
| *A61K 39/215* | (2006.01) |
| *A61K 9/00* | (2006.01) |
| *A61K 31/427* | (2006.01) |
| *A61K 31/4706* | (2006.01) |
| *A61K 31/513* | (2006.01) |
| *A61K 31/519* | (2006.01) |
| *A61K 31/53* | (2006.01) |
| *A61K 31/635* | (2006.01) |
| *A61K 31/675* | (2006.01) |
| *A61K 38/19* | (2006.01) |
| *A61K 39/00* | (2006.01) |
| *A61K 39/39* | (2006.01) |
| *A61P 31/14* | (2006.01) |

(52) U.S. Cl.
CPC .......... *A61K 39/215* (2013.01); *A61K 9/0019* (2013.01); *A61K 31/427* (2013.01); *A61K 31/4706* (2013.01); *A61K 31/513* (2013.01); *A61K 31/519* (2013.01); *A61K 31/53* (2013.01); *A61K 31/635* (2013.01); *A61K 31/675* (2013.01); *A61K 38/19* (2013.01); *A61K 39/001169* (2018.08); *A61K 39/39* (2013.01); *A61P 31/14* (2018.01)

(58) Field of Classification Search
None
See application file for complete search history.

(56) References Cited

U.S. PATENT DOCUMENTS

| | | | |
|---|---|---|---|
| 8,524,484 B2 * | 9/2013 | Sabbadini | C12N 15/00 435/320.1 |
| 10,973,908 B1 | 4/2021 | Bermudes | |
| 2006/0002956 A1 | 1/2006 | Surber et al. | |
| 2008/0038296 A1 | 2/2008 | Brahmbhatt et al. | |
| 2008/0051469 A1 | 2/2008 | Brahmbhatt et al. | |
| 2009/0011490 A1 | 1/2009 | Sabbadini et al. | |
| 2010/0028380 A1 | 2/2010 | Kang et al. | |
| 2012/0252099 A1 | 10/2012 | Sabbadini et al. | |
| 2017/0165345 A1 * | 6/2017 | Leadbetter | A61K 9/5153 |
| 2017/0326235 A1 | 11/2017 | Brahmbhatt et al. | |
| 2020/0054689 A1 | 2/2020 | Brahmbhatt et al. | |
| 2021/0283244 A1 | 9/2021 | Chen et al. | |

FOREIGN PATENT DOCUMENTS

| | | |
|---|---|---|
| JP | 2009-530264 A | 8/2009 |
| JP | 2012-505174 A1 | 3/2012 |
| WO | WO-00/67776 A1 | 11/2000 |
| WO | WO 2000/67776 | 11/2000 |
| WO | WO-03/033519 A2 | 4/2003 |
| WO | WO 2003/033519 A2 | 4/2003 |
| WO | WO 2004/113507 A1 | 12/2004 |
| WO | WO-2006/107097 A1 | 10/2006 |
| WO | WO 2020/021437 A1 | 1/2020 |
| WO | WO-2021/191796 A1 | 9/2021 |
| WO | WO 2021/243974 A1 | 12/2021 |

OTHER PUBLICATIONS

GENBANK "Severe acute respiratory syndrome coronavirus 2 isolate Wuhan-Hu-1, complete genome," GenBank, URL: https://www.ncbi.nlm.nih.gov/nuccore/MN908947.3, 2020, Accession No. MN908947, Version MN908947.3 (10 pages).
Giacalone et al, "Immunization with non-replicating *E. coli* minicells delivering both protein antigen and DNA protects mice from lethal challenge with lymphocytic choriomeningitis virus," Vaccine, vol. 25, No. 12 (Mar. 2007).
Notice of Allowance issued in U.S. Appl. No. 17/480,073 dated Mar. 7, 2025.
Notice of Reasons for Refusal on Japanese Appl. No. 2022-557099, dated Mar. 11, 2025 (14 pages with English language translation).
Agnihothram et al., "Evaluation of serologic and antigenic relationships between Middle Eastern respiratory syndrome coronavirus and other coronaviruses to develop vaccine platforms for the rapid response to emerging coronaviruses," *J Infect Dis*. 2014;209(7):995-1006.
Bolles et al., "A double-inactivated severe acute respiratory syndrome coronavirus vaccine provides incomplete protection in mice and induces increased eosinophilic proinflammatory pulmonary response upon challenge," J. Virol. 2011;85(23):12201-12215.
Bungener et al., "Delivery of protein antigens to the immune system by fusion-active virosomes: a comparison with liposomes and ISCOMs," Biosci. Rep., 22(2):323-38 (2002).

(Continued)

*Primary Examiner* — Agnieszka Boesen
(74) *Attorney, Agent, or Firm* — Foley & Lardner LLP

(57) ABSTRACT

The present disclosure is directed to compositions and methods useful for treating, as well as vaccinating against, SARS-CoV-2 viral infections, including SARS-CoV-2 variant viral infections.

20 Claims, 34 Drawing Sheets

(56) References Cited

OTHER PUBLICATIONS

Chan, et al., "Genomic characterization of the 2019 novel human-pathogenic coronavirus isolated from a patient with atypical pneumonia after visiting Wuhan," Emerg. Microbes Infect. 9, 221-236 (2020).
Chen et al., "Antigen Delivery to Macrophages Using Liposomal Nanoparticles Targeting Sialoadhesin/CD169," PLoS ONE 7(6): e39039 (2012), 9 pages.
Daemen et al., "Virosomes for antigen and DNA delivery," Adv Drug Deliv Rev., Jan. 10, 2005;57(3):451-463.
Drosten, et al., "Identification of a novel coronavirus in patients with severe acute respiratory syndrome," N Engl J Med. 2003; 348(20):1967-1976.
Duan, et al., "Pre- and post-treatment chest CT findings: 2019 novel coronavirus (2019-nCOV) pneumonia," Radiology 2020, 1 page.
Grohskopf, et al., "Prevention and control of seasonal influenza with vaccines: Recommendations of the Advisory Committee on Immunization Practices—United States, 2018-19 influenza season. MMWR," Recomm. Rep. 67, 1-20 (2018).
Guan, et al., "Clinical characteristics of 2019 novel coronavirus infection in China," medRxiv. (2020), 30 pages.
Huang, et al., "Clinical features of patients infected with 2019 novel coronavirus in Wuhan, China," Lancet. 395, 497-506 (2020).
Jiang, et al., "SARS vaccine development," Emerg. Infect. Dis. 11, 1016-1020 (2005).
Kersten, et al., "Liposomes and ISCOMs," Vaccine, 21(9-10):915-920 (2003).
Ksiazek, et al., "A novel coronavirus associated with severe acute respiratory syndrome," *N Engl J Med*. 2003; 348(20):1953-1966.
Lew, et al., "Acute respiratory distress syndrome in critically Ill patients with severe acute respiratory syndrome," *JAMA*. 2003; 290(3):374-380.
Menachery et al., "A SARS-like cluster of circulating bat coronaviruses shows potential for human emergence," Nat Med. 2015; 21:1508-1513.
Regla-Nava, et al., "Severe acute respiratory syndrome coronaviruses with mutations in the E protein are attenuated and promising vaccine candidates," J. Virol. 89, 3870-3887 (2015).
Schoggins, et al, "A diverse range of gene products are effectors of the type I interferon antiviral response," Nature. 2011;472(7344):481-485.
Shang, et al., "The outbreak of SARS-CoV-2 pneumonia calls for viral Vaccines," Vaccines (2020) 5:18, 3 pages.
Sheahan et al., "Successful vaccination strategies that protect aged mice from lethal challenge from influenza virus and heterologous severe acute respiratory syndrome coronavirus," J Virol. 2011, 85(1): 217-230.
Su, et al., "Construction of Stable LamB-Shiga Toxin B Sununit Hybrids: Analysis of Expression in *Salmonella typhimurium* aroA Strains and Stimulation of B Subunit-Specific Mucosal and Serum Antibody Responses," Infection and Immunity, 60(8):3345-3359 (1992).
Wu, F. et al., "A new coronavirus associated with human respiratory disease in China," Nature, 20 pages, (2020).
Yue, et al., "Progress and perspectives in developing polymeric vectors for in vitro gene delivery," Biomater. Sci., 1:152-170 (2013).
Zaki, et al., "Isolation of a novel coronavirus from a man with pneumonia in Saudi Arabia," N Engl J Med. 2012;367(19):1814-1820.
International Preliminary Report on Patentability issued in International Patent Application No. PCT/IB2021/052402, dated Oct. 6, 2022.
International Search Report that issued in International Patent Application No. PCT/IB2021/052402, dated Jun. 23, 2021.
Fotouhi, et al., "Adjuvant use of the NKT cell agonist alpha-galactosylceramide leads to enhancement of M2-based DNA vaccine immunogenicity and protective immunity against influenza A virus," *Archives of Virology*, vol. 162, pp. 1251-1260 (2017).
Gao, et al., "Nanocell COVID-19 Vaccine elicits iNKT-licensed dendritic cells to produce high affinity antibodies neutralizing variants of concern," Research Square, (Apr. 2022), pp. 1-36.
International Search Report and Written Opinion issued in International Patent Application No. PCT/IB2022/056759, dated Nov. 1, 2022.
Search Report issued in European Patent Application No. 22845545.7, dated May 13, 2025 (9 pages).
Hosseini et al., "Potential SARS-CoV-2 vaccines: Concept, progress, and challenges", International Immunopharmacology, 2021, vol. 97 (15 pages).
European Search Report for EP Appl. Ser. No. 21774470 dated Feb. 26, 2024 (7 pages).
Fotouhi et al., "Adjuvant use of the NKT cell agonist alpha-galactosylceramide leads to enhancement of M2-based DNA vaccine immunogenicity and protective immunity against influenza A virus," Archives of Virology, 2017, vol. 162 (pp. 1251-1260).
International Preliminary Report on Patentability for PCT Appl. Ser. No. PCT/IB2022/056759 dated Feb. 1, 2024 (7 pages).
International Search Report and Written Opinion for Appl. Ser. No. PCT/IB2021/052402 dated Jun. 23, 2021 (15 pages).
International Search Report and Written Opinion for PCT Appl. Ser. No. PCT/IB2022/056759 dated Nov. 1, 2022 (12 pages).
Kemp et al., "Recurrent emergence and transmission of a SARS-Co V-2 spike deletion H69N70" Posted on BioRxiv, Mar. 8, 2020 (41 pages).
King et al. "CD1d-Invariant Natural Killer T Cell-Based Cancer Immunotherapy: Alpha-B1-Galactosylceramide and Beyond" Front. Immunol. 9:1519. Jul. 2, 2018 (7 pages).
US Non-Final Office Action on U.S. Appl. No. 17/480,073 Dated Nov. 7, 2024 (10 pages).
Office Action issued in Chinese Patent Application No. 202180035730.3 dated Dec. 3, 2025 (16 pages with English language translation).
Zhang et al., "Research and development of coronavirus vaccine and prospect of 2019 novel coronavirus vaccines," Journal of Nanjing Medical University (Natural Sciences), 2020, vol. 40, No. 2 (5 pages with English language abstract).

\* cited by examiner

Mutant Spike protein e.g. delta variant

Mutant Spike protein e.g. Brazil variant

Spike protein produced by SARS-CoV-2

Gene expression promoter expresses all proteins as a single mRNA and separate proteins

EDV

Plasmid expressing cloned Spike proteins from original SARS-CoV-2 and multiple genetic variants Glycolipid α-galactosyl ceramide IFN-γ stimulating adjuvant

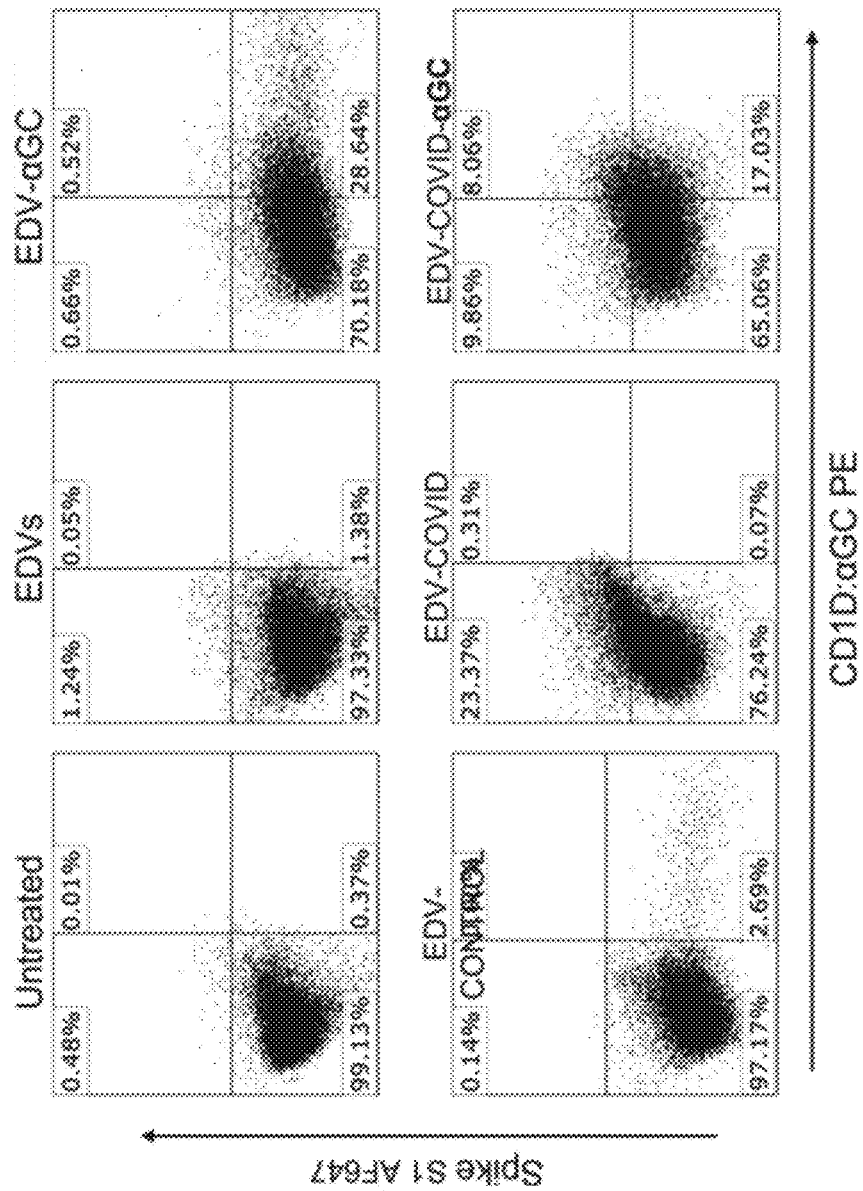

COMPOSITIONS AND VACCINES FOR TREATING AND/OR PREVENTING CORONAVIRUS VARIANT INFECTIONS AND METHODS OF USING THE SAME

CROSS-REFERENCE TO RELATED APPLICATION

The present application claims the benefit of priority to U.S. Provisional Patent Application No. 63/224,838, filed Jul. 22, 2021, and is a continuation-in-part of U.S. patent application Ser. No. 17/480,073, filed Sep. 20, 2021, the entire disclosures of which are hereby incorporated by reference in their entirety.

BACKGROUND

Outbreaks of severe acute respiratory syndrome (SARS, 2002-2004 (Ksiazek et al., 2003; Drosten et al., 2003) and Middle East respiratory syndrome (MERS, 2012-current (Zaki et al., 2012)) in the last two decades are a significant threat to global public health.

Respiratory syndromes caused by coronaviruses (CoVs) that are transmitted from person-to-person via close contact, result in high morbidity and mortality in infected individuals. Although SARS and MERS initially present as mild, influenza-like illnesses with fever, dyspnea, and cough, progression to more severe symptoms is characterized by an atypical interstitial pneumonia and diffuse alveolar damage. Both SARS-CoV and MERS-CoV are capable of causing acute respiratory distress syndrome (ARDS), the most severe form of acute lung injury where alveolar inflammation, pneumonia, and hypoxic lung conditions lead to respiratory failure, multiple organ disease, and death in 50% of ARDS patients (Lew et al., 2003).

Vaccines have long been considered the gold standard for infectious disease prevention and eradication targeted at human populations as well as conferring the benefits of longlived immune protection for the individual. While several SARS-CoV-2 vaccines have been developed, they have been less effective against numerous SAR-CoV-2 variants, which have emerged over the past year.

Accordingly, new compositions and methods are needed for effective stimulation of antiviral immunity, particularly against SARS-CoV-2 variants. The present invention satisfies these needs.

SUMMARY OF THE INVENTION

In one aspect, described herein is a composition comprising: (a) a vector comprising a plasmid that encodes at least one viral antigen, wherein the viral antigen is from a SARS-CoV-2 variant; (b) a vector comprising a CD1d-recognized antigen; and (c) at least one pharmaceutically acceptable carrier, wherein at least one of vector (a) and vector (b) is an intact, bacterially-derived minicell or killed bacterial cell.

In another aspect, the SARS-CoV-2 variant is selected from the group consisting of: (a) UK SARS-CoV-2 variant (B.1.1.7/VOC-202012/01); (b) B.1.1.7 with E484K variant; (c) B.1.617.2 (Delta) variant; (d) B.1.617 variant; (e) B.1.617.1 (Kappa) variant; (f) B.1.617.3 variant; (g) South Africa B.1.351 (Beta) variant; (h) P.1 (Gamma) variant; (i) B.1.525 (Eta) variant; (j) B.1.526 (Iota) variant; (k) Lambda (lineage C.37) variant; (l) Epsilon (lineage B.1.429) variant; (m) Epsilon (lineage B.1.427) variant; (n) Epsilon (lineage CAL.20C) variant; (o) Zeta (lineage P.2) variant; (p) Theta (lineage P.3) variant; (q) R.1 variant; (r) Lineage B.1.1.207 variant; and (s) Lineage B.1.620 variant.

In another aspect, the SARS-CoV-2 variant is selected from the group consisting of a SARS-CoV-2 variant comprising: (a) a L452R Spike Protein Substitution; (b) an E484K Spike Protein Substitution; (c) K417N Spike Protein Substitution; (d) E484K Spike Protein Substitution; (e) N501Y Spike Protein Substitution; (f) K417T Spike Protein Substitution; (g) E484K Spike Protein Substitution; (h) N501Y Spike Protein Substitution; and (h) SARs-CoV-2 variants having one or more of the following missense mutations: N440, L452R, S477G/N, E484Q, E484K, N501Y, D614G, P681H, P681R, and A701V.

In one aspect, the vaccine compositions can comprise a vector (a) which additionally comprises at least one viral antigen from a SARS-CoV-2 strain (e.g., a non-variant). For example, the SARS-CoV-2 strain can be selected from the group consisting of the L strain, the S strain, the V strain, the G strain, the GR strain, and the GH strain. In another aspect, the SARS-CoV-2 viral antigen can be encoded by a polynucleotide comprising the sequence of SARS-CoV-2, or a polynucleotide having at least 80% sequence identity to the polynucleotide comprising the sequence of SARS-CoV-2.

In one aspect of the compositions described herein, the plasmid encodes at least one of spike (S) protein, nucleocapsid (N) protein, membrane (M) protein, and envelope (E) protein of SARS-CoV-2 or a SARS-CoV-2 variant. In addition, the plasmid can encode all of the spike (S) protein, nucleocapsid (N) protein, membrane (M) protein, and the envelope (E) protein of a SARS-CoV-2 strain or variant, or any combination thereof (e.g., a Spike protein from a variant and an envelope protein from a non-variant strain).

In another aspect, the plasmid can encode the receptor binding domain (RBD) of a Spike protein of SARS-CoV-2 or a SARS-CoV-2 variant.

In one aspect for the compositions described herein, vector (a) is a first intact, bacterially derived minicell or killed bacterial cell, and vector (b) is a second intact, bacterially derived minicell or killed bacterial cell. In another aspect, vector (a) and vector (b) are the same intact, bacterially derived minicell or killed bacterial cell, comprising the CD1d-recognized antigen and the plasmid that encodes at least one viral SARS-CoV-2 variant viral antigen. In a further aspect, one of vector (a) and vector (b) is not an intact, bacterially derived minicell or killed bacterial cell and the other of vector (a) and vector (b) is an intact, bacterially derived minicell or killed bacterial cell In one embodiment, the CD1d-recognized antigen comprises a glycosphingolipid. For example, the CD1d-recognized antigen can be selected from the group consisting of α-galactosylceramide (α-GalCer), C-glycosidific form of α-galactosylceramide (α-C-GalCer), 12 carbon acyl form of galactosylceramide (β-GalCer), β-D-glucopyranosylceramide (β-GlcCer), 1,2-Diacyl-3-O-galactosyl-sn-glycerol (BbGL-II), diacylglycerol containing glycolipids (Glc-DAG-s2), ganglioside (GD3), gangliotriaosylceramide (Gg3Cer), glycosylphosphatidylinositol (GPI), α-glucuronosylceramide (GSL-1 or GSL-4), isoglobotrihexosylceramide (iGb3), lipophosphoglycan (LPG), lyosphosphatidylcholine (LPC), α-galactosylceramide analogue (OCH), threitolceramide, and a derivative of any thereof.

4) In another aspect, the CD1d-recognized antigen comprises α-GalCer. In addition, the CD1d-recognized antigen can comprise a synthetic α-GalCer analogue. For example, the CD1d-recognized antigen can comprise a synthetic α-GalCer analogue selected from 6'-deoxy-6'-acetamide α-GalCer (PBS57), napthylurea α-GalCer (NU-α-GC), NC-α-GalCer, 4ClPhC-α-GalCer, PyrC-α-GalCer, α-carba-GalCer, carba-α-D-galactose α-GalCer analogue (RCAI-56), 1-deoxy-neo-inositol α-GalCer analogue (RCAI-59), 1-O-methylated α-GalCer analogue (RCAI-92), and HS44 aminocyclitol ceramide.

In one aspect, the CD1d-recognized antigen is an IFNγ agonist.

The compositions described herein can be formulated for any pharmaceutically acceptable use. Examples of pharmaceutically acceptable formulations include but are not limited to oral administration, injection, nasal administration, pulmonary administration, or topical administration.

In another aspect, encompassed is a vaccine composition comprising at least one intact, bacterially-derived minicell or killed bacterial cell, and comprised within the minicell or cell: (a) a plasmid encoding a Spike protein from one or more of SARS-CoV-2 variant Alpha (B.1.1.7.UK), SARS-CoV-2 variant Beta (B.1.351. SA), SARS-CoV-2 variant Delta (B.1.617.2 India), and/or SARS-CoV-2 variant Gamma (P.1 Brazil); and (b) α-galactosylceramide. In addition, the vaccine composition can comprise (a) and (b) within a single minicell. Further, plasmid of the vaccine composition can encode the Spike protein from each of SARS-CoV-2 variant Alpha (B.1.1.7.UK), SARS-CoV-2 variant Beta (B.1.351. SA), SARS-CoV-2 variant Delta (B.1.617.2 India), and SARS-CoV-2 variant Gamma (P.1 Brazil).

The disclosure also encompasses methods of treating and/or vaccinating against a viral infection, comprising administering to a subject in need a composition described herein.

In one aspect, the subject is suffering from or at risk of developing lymphopenia. In another aspect, the subject is deemed at risk for severe illness and/or serious complications from the viral infection. For example, an "elderly" subject at higher risk for severe illness and/or serious complications from the viral infection is about age 50 or older, about age 55 or older, about age 60 or older, or about age 65 or older.

In another aspect of the methods described herein, the subject suffers from one or more pre-existing conditions selected from the group consisting of diabetes, asthma, a respiratory disorder, high blood pressure, and heart disease. In yet another aspect, the subject is immunocompromised. For example, the subject can be immunocompromised due to AIDS, cancer, a cancer treatment, hepatitis, an autoimmune disease, steroid receiving, immunosenescence, or any combination thereof.

In one embodiment, administration of a composition described herein increases the chance of survival following exposure to a coronavirus. For example, the chance of survival can be increased by about 10%, about 20%, about 30%, about 40%, about 50%, about 60%, about 70%, about 80%, about 90%, or about 100%, as measured using any clinically recognized technique.

In yet another aspect, administration of a composition described herein reduces the risk of transmission of coronavirus. For example, the reduction in risk of transmission can be by about 10%, about 20%, about 30%, about 40%, about 50%, about 60%, about 70%, about 80%, about 90%, or about 100%, as measured using any clinically recognized technique.

In all of the methods described herein, the administration step can be via any pharmaceutically acceptable methods.

In another aspect, the subject can be exposed to or is anticipated to be exposed to an individual who is contagious for a coronavirus. In addition, the individual who is contagious for a coronavirus can have one or more symptoms selected from the group consisting of fever, cough, shortness of breath, diarrhea, sneezing, runny nose, and sore throat.

In one embodiment, the subject of the methods described herein is a healthcare worker, aged 60 years or older, frequent traveller, military personnel, caregiver, or a subject with a preexisting condition that results in increased risk of mortality with infection.

In another aspect, the method further comprises administering one or more antiviral drugs. For example, the one or more antiviral drugs can be selected from the group consisting of chloroquine, darunavir, galidesivir, interferon β, lopinavir, ritonavir, remdesivir, and triazavirin.

In the methods of the disclosure, the CD1d-recognized antigen induces a Th1 cytokine response in the subject. For example, the cytokine can comprise IFNγ.

In another aspect, a first minicell comprising the CD1d-recognized antigen and a second minicell comprising the plasmid encoding at least one SARS-CoV-2 variant viral antigen are administered to the subject simultaneously. In yet another aspect, a first minicell comprising the CD1d-recognized antigen and a second minicell comprising the plasmid encoding at least one viral antigen are administered to the subject sequentially. Alternatively, the disclosure encompasses a method wherein first minicells comprising the CD1d-recognized antigen and second minicells comprising the plasmid encoding at least one viral antigen are administered to the subject repeatedly.

In the methods described herein, first minicells comprising the CD1d-recognized antigen and second minicells comprising the plasmid encoding at least one viral antigen can be administered to the subject at least once a week, twice a week, three times per week, or four times per week.

Both the foregoing summary and the following description of the drawings and detailed description are exemplary and explanatory. They are intended to provide further details of the invention, but are not to be construed as limiting. Other objects, advantages, and novel features will be readily apparent to those skilled in the art from the following detailed description of the invention.

BRIEF DESCRIPTION OF THE DRAWINGS

FIG. 3 is a graphical depiction of an EDV-COVID-19 vaccine composition, comprising a bacterial expression plasmid ("EDV"), such as that shown in FIG. 1B, wherein the EDV contains (i) a plasmid expressing cloned Spike proteins from original SARS-CoV-2 and multiple genetic variants, such as delta variant and Brazil variant, (ii) a gene expression promotor expressing all proteins as a single mRNA and separate proteins in the EDV cytoplasm, (iii) multiple Spike proteins, including Spike protein produced by SARS-CoV-2, Brazil variant Spike Protein, and delta variant Spike protein, and (iv) the CD1d-restricted iNKT cell antigen glycolipid α-galactosylceramide (α-GalCer) IFN-7 as an adjuvant or stimulating agent. Expressed Spike proteins encoded are designated by stars on FIG. 3.

FIG. 4A shows a sustained increase in serum IFNα levels from all 3 patients following 2 doses of EDV-αGC, and FIG. 4B shows a sustained increase in serum IFNγ levels from all 3 patients following 2 doses (one week apart) of EDV-αGC. IFN levels were measured via ELISA from patients' blood serum samples taken throughout treatment cycles. FIG. 4C shows the results of measuring lymphocyte counts ($\times 10^9$/L) for four pancreatic cancer patients (CB11, CB14, CB18, and CB41) over a 46 day period following 2 doses (one week apart) of EDV-αGC. The results depicted in FIG. 4C show a rise in lymphocyte counts to within normal range (1.0-4.0) in the four pancreatic cancer patients. Lymphocyte levels were measured from patient blood samples throughout treatment cycles, by pathology service.

FIG. 5B shows the results of mouse experiments, where four groups of mice were evaluated (Group 1=untreated; Group 2=EDVs with no payload; Group 3=administration of free αGC; and Group 4=administration of a bacterial minicell vaccine comprising a combination of SARS-CoV-2 Spike protein and αGC (depicted in FIG. 2A). The data shown in FIG. 5B demonstrates using a FACS analysis that EDV™-COVID-α-GC was able to effectively deliver α-GC into murine bone marrow derived, JAWSII, cells and presented through CD1d-ligand to a similar efficiency as free α-GC. FIG. 5D-5H show the results following intramuscular (IM) injections of $2\times 10^9$ EDV-COVID-α-GC into five groups of BALB/c mice, with IFNα concentration (pg/mL) (FIG. 5D), IFNγ concentration (pg/mL) (FIG. 5E), IL12p40 concentration (pg/mL) (FIG. 5F), IL6 concentration (pg/mL) (FIG. 5G), and TNFα concentration (pg/mL) (FIG. 511) shown on the Y axis of the figures. The results show that administration resulted in a strong type I interferon response within 8 h post-injection. The five groups of mice (n=6 per group; ELISA samples run in triplicate) were: Group 1=saline; Group 2=EDV (bacterial minicell with no payload); Group 3=EDV$_{control}$ (EDVs carrying the plasmid with no insert expressing the Spike protein i.e. plasmid backbone only); Group 4=EDV$_{Covid}$ (bacterial minicell comprising the plasmid and the encoded SARS-CoV-2 Spike protein) and Group 5=EDV$_{Covid}$+αGC (construct shown in FIG. 2A).

FIG. 6C shows the results following isolation of B-cells from the mouse bone marrow at 28-day post-initial injection and co-incubation with the SARS-CoV-2 S protein ex vivo. It was found that B-cells isolated from EDV-COVID-α-GC immunized mice produced a significantly greater amount of S protein-specific IgG in response to the presence of S protein as compared to all other groups tested. FIG. 6D shows the results of a neutralizing antibody assay, which demonstrated that the serum of 100% of the mice immunized with EDV-COVID-α-GC resulted in SARS-CoV-2 RBD binding inhibition to hACE2 receptor. The cPASS™ SARS-CoV-2 Neutralizing Antibody Assay (FDA approved; Tan et al, *Nature Biotech*, 2020) for detection in various species was used to assess inhibition of RBD binding to hACE2 receptor. FIG. 6E shows the results of an FACS analysis of CD8+ cytotoxic T-cells in mouse splenocytes, demonstrating that mice immunized with EDV$_{COVID-α-GC}$ had the highest amount of antigen-specific memory CD137+CD69+ cytotoxic T-cell at 4 weeks (1 boost at day 21) post-initial injection, e.g., there were significantly high number of CD137+CD69+ population within the cytotoxic T-cell population in the EDV$_{Covid-αGC}$ treated mice as compared to all other treatment groups. CD137+ signalling is essential in the CD8+ T cell anti-viral response.

FIG. 6F shows the results of an ex-vivo AIMS Assay showing Spike antigen specific CD8+ T cell response. There is an increase in the CD69+ CD8+ T cell numbers following the stimulation with Covid Spike protein in the EDV-Covid and EDV-Covid-αGC groups but not in any other groups. PHA was used as a positive control. These results indicate that both plasmid and protein contained within EDVs creates an S protein-specific response.

FIGS. 7A-7D show the robustness of the immunity generated by EDV-COVID-α-GC by analyzing the specificity and cross-reactivity of the serum IgG from immunized mice against the RBD and S1 subunits of the UK (B.1.1.7) and South Africa (B.1.351) variants of the virus. The results showed that, while UK variant RBD-specific IgG was produced in some of the EDV-COVID-α-GC immunized mice (FIG. 7A), a much greater S1-specific IgG antibody titer was observed (FIG. 7B) indicating the binding of the S protein-specific antibody lands mainly outside of the RBD. A similar trend was observed for the SA variant (FIGS. 7C and D).

FIGS. 11A-K depicts SARS-CoV-2 S-protein construct design, antigen processing and presentation to DC cells and ability to elicit Th1 and Th2 responses. FIG. 11A shows an image of EDV-COVID-αGC depicting the LPS, membrane and nanocell contents including plac-CoV-2 plasmid, S-protein and αGC. FIG. 11B shows a construct: SARS-CoV-2 spike protein nucleotide sequence (Genbank MN908947.3) at the 3'-end of a modified constitutive gene expression β-lactamase promoter and inserted between KpnI 5' and SalI 3' sites of the M13 multiple cloning site of PUC57-Kan backbone plasmid to create plac-CoV2. FIG. 11E shows co-staining of JAWSII cells with anti-CD1d:αGC and anti-spike Abs, demonstrating αGC and S-protein delivery by EDVs with EDV-COVID-αGC delivering both S-protein and αGC on the same cell surface. FIGS. 11D-F: I.M. injections of 2 and 3 ($\times10^9$) EDV-COVID-αGC into BALB/c mice resulted in increased IFNα, IFNγ, IL-12-p40 levels 8 h post dose 1. FIG. 11G: IL-2 levels in $2\times10^9$ and $3\times10^9$ EDV-CoV2-αGC particle dose after 8 h dose 1. FIGS. 11H and 11I: TNFα and IL-6 levels in 2 and 3 ($\times10^9$) EDV-CoV2-αGC particle dose after 8 h dose 1. FIG. 11J: IL-21 levels for $3\times10^9$ dose level measured at day 28. FIG. 11K: IL-10 levels in $3\times10^9$ EDV-CoV2-αGC particle dose after 8 h dose 1.

(FIG. 12A) Day 28 IgM S-protein specific titers for $2\times10^9$ and $3\times10^9$ dose levels. (FIG. 12B) Day 28 IgG S-protein specific titers for $2\times10^9$ and $3\times10^9$ dose levels. (FIG. 12C-F) IgM and IgG S-protein specific titers for $3\times10^9$ dose at day 7 (FIG. 12C, D) and at day 21 (FIG. 12E, F). (FIG. 12G) Schematic diagram of iNKT-licensed dendritic cell activation; (1) EDV-COVID-αGC injected i.m. in mice, (2) phagocytosed by dendritic cells (DC), degraded in lysosomes, (3.1) αGC released from EDVs, (3.2) CD1d binds to αGC, (3.3) CD1d:αGC complex displayed on DC cell surface, (4.1) spike polypeptides also released from EDVs, (4.2) MHC Class II binds to the S-peptides, (4.3) display them on same DC cell surface. (5) iNKT semi-invariant T cell receptor binds to CD1d/αGC complex, (6) rapidly secretes IFNγ which triggers upregulation of CD40 ligand in DCs inducing DC maturation/activation with increased costimulatory capacity through upregulation of CD80, CD86, CCR7, MHC Class I molecules, pro-inflammatory cytokine IL-12 & chemokine CCL17. (7) Binding of CD1: αGC complex to the iNKT TCR triggers perforin release which kills the CD1d/αGC complex displaying DCs. (8) S-polypeptides are released from dying DCs, (9) endocytosed by activated CD11c+ DCs and (10) naïve B cells via B cell surface receptor, and (11, 12) displayed on each cell surface via MHC Class II. (13) MHC Class II/spike on DC surface binds to CD4+ TCRβ on CD4+ T follicular helper (T$_{FH}$) cells, and (14.1) these signals induce the T$_{FH}$ cell differentiation and upregulation of chemokine receptor CXCR5 and downregulation of CCR7, which allows these cells to migrate to the T/B border. (14.2) B cells activated by S-polypeptide engagement of BCR increase CCR7 expression and migrates to the T/B follicle border in search of cognate CD4+ T cells. (15) Recognition of the S-peptide/MHC II complex on B cells by the TCRβ enables T$_{FH}$ cells (16) to express CD40 ligand and ICOS and (17) secretes the cytokines IL-21, IFNγ, IL-4, IL-2, and IL-10. T$_{FH}$ cells are strongly enriched for cells expressing the highest levels of IL-21. (18) this cognate help stimulates B cells to undergo intense proliferation, induction of Ig class switching, differentiation to plasma-like cells capable of secreting all major Ig isotypes. (19) Within GCs, B cells undergo somatic hypermutation and only B cells with the highest affinity antibody are selected. (20) These plasma cells secrete high affinity S-specific antibodies that can neutralize a variety of S-mutants. (21) These B cells differentiate into long-lived memory B cells. Throughout this process, IL-21 induces expression of CD25, enabling the B cells to respond to IL-2, also derived from T$_{FH}$ cells, which promotes the effect of IL-21. Similarly, IL-21 induces expression of IL-6R on PCs, which allows these cells to integrate survival signals by IL-6. (22) DCs displaying S-peptides via MHC class II also elicit an S-specific CD8+ T cell response.

(FIG. 13E) IFNγ (Th1) and IL-4 (Th2) expression with the CD3+ CD4+ T cell population in SARS-CoV-2 S-protein stimulated ex vivo splenocytes. (FIG. 13F-K) Viral neutralization tests (VNTs) using the cPASS™ SARS-CoV-2 Neutralizing Antibody Assay (FDA approved) for detection in various species was used to assess inhibition of RBD binding to hACE2 receptor. (FIG. 13F) VNTs using the serum of $2\times10^9$ and (FIG. 13G) $3\times10^9$ EDVs immunized mice against SARS-CoV-2 RBD Wuhan Wild Type. Subsequent VNTs were conducted using the serum of $3\times10^9$ EDV immunized mice against the Alpha (FIG. 13H), Beta (FIG. 13I), Gamma (FIG. 13J) and Delta (FIG. 13K) variant RBDs.

(FIG. 14A) SVNT analysis of volunteer serum on day 1, 21, 28 and 3 months post-initial injection against wildtype (WT), delta, omicron and omicron BA2 variants of the SARS-CoV2 RBD. Results from 5 volunteers who received at least 2 doses of Pfizer vaccine were used as a comparison. (FIG. 14B) Serum IFNγ levels on day 1, 21 and 28 post-initial injection. (FIG. 14C) Serum IFNα levels on day 1, 21 and 28 post-initial injection. (FIG. 14D) CD4+ central memory T cells (CD45RA− CD27+ CCR7+ CD3+ CD4+) analysis on day 1 and day 28. (FIG.

14E) CD8$^+$ central memory T cells (CD45RA$^-$ CD27$^+$ CCR7$^+$ CD3$^+$ CD8$^+$) analysis on day 1 and day 28. (FIG. 14F) Ex vivo PBMC production of IFNγ following SARS-CoV2 spike protein stimulation on day 1 and day 28. (FIG. 14G) CD69 expression in T cells (CD45$^+$ CD3$^+$ CD69$^+$) in ex vivo PBMCs following SARS-CoV2 spike protein stimulation on day 1 and day 28. (FIG. 14H) Amount of spike protein specific CD19$^+$ B cells in PBMCs on day 1, 28, 2 months and 3 months following initial injection. (FIG. 14I) Amount of spike protein specific CD19$^+$ CD27$^+$ memory B cells in PBMCs on day 1, 28, 2 months and 3 months following initial injection. (FIG. 14J) Amount of IgM$^+$ CD19$^+$ CD27$^+$ memory B cells in PBMCs on day 1, 28, 2 months and 3 months following initial injection. (FIG. 14K) Amount of IgG$^+$ CD19$^+$ CD27$^+$ memory B cells in PBMCs on day 1, 28, 2 months and 3 months following initial injection. Data presented as mean±SEM.

DETAILED DESCRIPTION

I. Overview

Figure 1A:
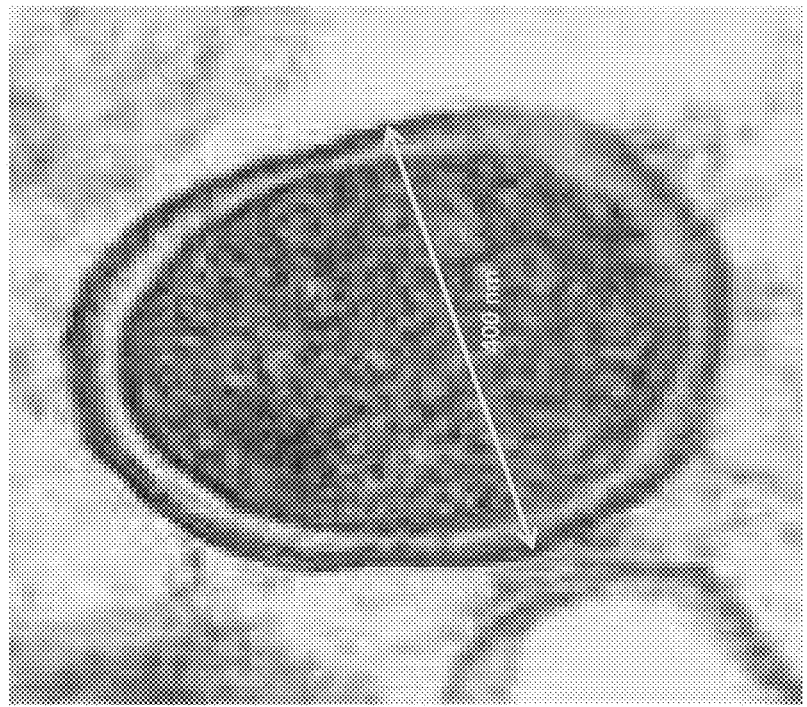
FIG. 1A depicts a scanning electron microscope image showing production of an EnGeneIC Dream Vector (EDV™) nanocell, i.e., an intact, bacterially derived minicell, from a safe bacterium *Salmonella typhimurium* strain.

The present disclosure is directed to novel compositions useful in treating and/or vaccinating subjects against coronavirus infections, and in particular where the patient population is elderly, immunocompromised (e.g., from cancer, HIV, hepatitis, autoimmune disease, organ transplant patients on immune-suppressive therapy etc.) and/or having a co-morbidity. Such patient populations are unlikely to develop a robust anti-COVID immune response from any of the current COVID-19 vaccines. Current COVID-19 vaccines being used in at least one region of the world include the Pfizer/BioNTech Comirnaty® COVID-19 vaccine, Moderna COVID-19 vaccine (mRNA 1273), Janssen/Ad26.COV 2.S developed by Johnson & Johnson, SII/Covishield and AstraZeneca/AZD1222 vaccines (developed by AstraZeneca/Oxford and manufactured by the State Institute of India and SK Bio, respectively), Sinopharm COVID-19 vaccine, produced by Beijing Bio-Institute of Biological Products Co Ltd, subsidiary of China National Biotec Group (CNBG), and the Sinovac Biotech Ltd. CoronaVac COVID-19 Vaccine.

SARS-CoV-2 (Severe Acute Respiratory Syndrome-Coronavirus type 2) is the causative agent of the COVID-19 pandemic and despite global vaccination efforts the pandemic is failing to abate, particularly with the continuous emergence of variants of concern (VOC). Structurally, SARS-CoV-2 has 4 proteins; Spike (S), Envelope, Membrane and Nucleocapsid (Chan et al., 2020). S-protein Receptor Binding Domain (RBD) binds to human angiotensin-converting enzyme 2 (hACE2) receptor on host cells (Song et al., 2018), and is responsible for cell attachment and fusion during viral infection. S-protein is 1273 amino acids (aa) in length and consists of a signal peptide (1-13 aa) located at the N-terminus, the S1 subunit (14-685 aa) comprising an N-terminal domain (14-305 aa) and RBD (319-541 aa), and the S2 subunit (residues 686-1273 aa) (Lan et al., 2020). RBDs are key neutralization targets and current vaccines primarily aim to elicit RBD-specific neutralizing antibody and T cell responses (Brouwer et al., 2020).

According to the US Centers for Disease Control and Prevention (CDC), a SARS-CoV-2 variant has one or more mutations that differentiate it from other variants in circulation. As expected, multiple variants of SARS-CoV-2 have been documented in the United States and globally throughout this pandemic. To inform local outbreak investigations and understand national trends, scientists compare genetic differences between viruses to identify variants and how they are related to each other. The US Department of Health and Human Services (HHS) established a SARS-CoV-2 Interagency Group (SIG) to improve coordination among the CDC, National Institutes of Health (NIH), Food and Drug Administration (FDA), Biomedical Advanced Research and Development Authority (BARDA), and Department of Defense (DoD). This interagency group is focused on the rapid characterization of emerging variants and actively monitors their potential impact on critical SARS-CoV-2 countermeasures, including vaccines, therapeutics, and diagnostics. https://www.cdc.gov/coronavirus/2019-ncov/variants/variant-info.html (accessed on Jul. 21, 2021).

Genetic variants of SARS-CoV-2 have been emerging and circulating around the world throughout the COVID-19 pandemic. Viral mutations and variants in the United States are routinely monitored through sequence-based surveillance, laboratory studies, and epidemiological investigations.

Immunologists and health authorities caution that not everyone generates a robust immune response following a Covid-19 infection, especially people who are older or have weakened immune systems. Immune response also likely depends on how much virus a person was exposed to or how ill they became. Vaccines appear to confer more consistent protection than infection. *Wall Street Journal*, "COVID-19 Immune Response Could be Long Lasting, but Variants Present Risks" (Jul. 16, 2021). Many people who are immunocompromised fail to elicit a strong immune response even after full vaccination. Israel has started giving booster shots to people with weaker immune systems as cases caused by the Delta variant increase in the country. Id. An advisory panel to the CDC is scheduled to discuss the potential for additional doses for immunocompromised individuals next week. Id. Thus, there is a particular need for a vaccine that would be effective for this at-risk patient population.

For COVID-19 vaccines, high-affinity antigen-specific antibody, CD8$^+$ T cell and memory B cell responses are essential to maximize protection against Variants of Concern (VOC). Described herein are results in mice and human volunteers immunized with bacterially-derived, non-living nanocells (EDV™) packaged with bacterial plasmid expressing spike protein of SARS-CoV-2 and IFNγ stimulating adjuvant α-galactosylceramide (EDV-COVID-αGC). EDV-COVID-αGC is shown to elicit iNKT-licensed dendritic cell activation/maturation, follicular helper T cell cognate help to B cells to undergo germinal center based somatic hypermutation and production of high affinity antibodies able to neutralize Alpha, Beta, Gamma, Delta, and Omicron VOC including a memory B cell response. Type I and Type II interferon stimulation and S-specific CD8$^+$ T cells was also achieved. EDV-COVID-αGC are lyophilized, stored and transported at room temperature.

For vaccines to be successful, the host requires a robust immune system which is sub-optimal in immune-compromised patients e.g., cancer, HIV, and hence these patients remain vulnerable to SARS-CoV-2 and VOC (Haidar et al., 2021; Liang et al., 2020; Pegu et al., 2021; Uriu et al., 2021). Furthermore, there are logistical issues since currently approved vaccines need to be stored and transported at −20° C. to −70° C. with a shelf-life of only three to six months.

Figures 11A, 11B:
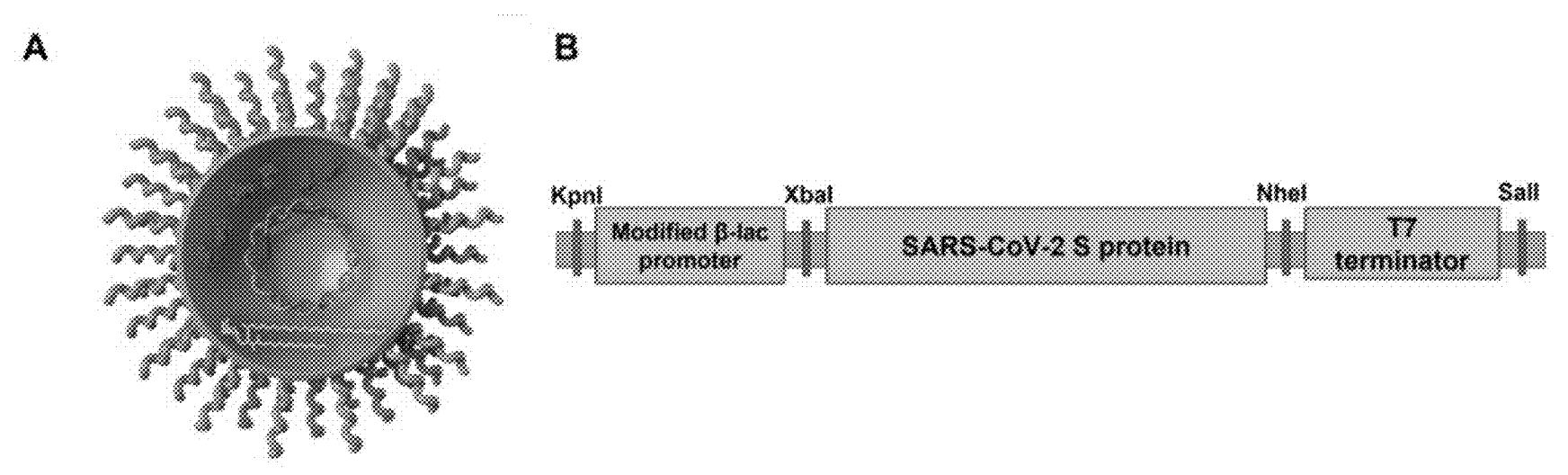

In one aspect, the present disclosure describes a novel class of vaccine, designated EDV-COVID-αGC, comprising a submicron diameter, non-living, achromosomal nanocell, EDV™ (EnGeneIC Dream Vector) packaged with (i) Type I interferon stimulating bacterial gene expression recombinant plasmid carrying S-protein encoding sequence, (ii) plasmid expressed S-protein produced in the nanocell cytoplasm, and (iii) Type II interferon stimulating glycolipid adjuvant αGC (FIG. 11A). EDVs are derived from a mutant non-pathogenic *Salmonella typhimurium* bacterium that buds off the bacterium during its normal replication due to asymmetric cell division induced by the chromosomal mutation (MacDiarmid et al., 2009; MacDiarmid et al., 2007). Single chain Fv bispecific (scFv) antibody-targeted EDVs have been used to deliver cytotoxic payloads and small molecules to solid cancers in Phase I and IIa clinical trials in several solid tumors. Tumor stabilization/regression, prolonged overall survival, and minimal to no toxicity despite repeat dosing, has been achieved in these patients who had exhausted all treatment options (Kao et al., 2015; van Zandwijk et al., 2017; Whittle et al., 2015).

A. Clinical Data

The data describes herein shows, for example, that EDV-COVID-αGC can deliver SARS-CoV-2 S-protein and αGC to dendritic cells (DCs) setting off a S-specific humoral and cellular response with broad-spectrum neutralization against Wild Type, Alpha, Beta, Gamma and Delta variants at greater than 90% and Omicron variant at greater than 70%. Furthermore, results of the first 4 volunteers of the EDV-COVID-αGC Phase I clinical trial are presented, which echo the pre-clinical data thus far.

Despite an unprecedented global effort over two years to curb the COVID-19 pandemic, the effort is frustrated by the continuous emergence of VOC resulting in the decline of vaccine protective efficacy to various degrees. Additionally, the current vaccines demonstrate limited protective efficacy in immune-compromised population such as those with cancer, HIV, organ transplant and autoimmune diseases. Logistic issues such as the requirement to store and transport vaccines at −20° C. to −70° C. and a shelf life of only 3 to 6 months makes it difficult to get these vaccines to rural populations especially in Africa. Described herein is a novel COVID-19 vaccine that readily overcomes these limitations.

The vaccine comprises a submicron (e.g., in one aspect 400 nm) non-living, achromosomal nanocell (EDV™; EnGeneIC Dream Vector) derived from a non-pathogenic strain of *Salmonella typhimurium*. The bacterial strain carries a mutation that results in asymmetric cell division during normal bacterial cell division where the EDVs bud off at the poles of the mutant bacteria (MacDiarmid et al., 2007). The purified EDVs are pre-packaged with a bacterial gene expression recombinant plasmid carrying the SARS-CoV-2 S-protein encoding gene (or other SARS-CoV protein disclosed herein) under a constitutive gene expression, modified β-lactamase promoter (EDV-COVID). The plasmid expresses the S-protein in the bacterial cytoplasm during normal bacterial growth and when the EDV is formed, a significant concentration of the S-protein segregates into the EDV cytoplasm. Additionally, the EDV-COVID nanocells are further packaged with αGC (EDV-COVID-αGC). 109 EDVs were shown to carry ~16 ng of S-protein, ~30 ng of αGC and ~100 copies of plasmid per EDV.

Previous studies had shown that post-systemic administration, EDVs are phagocytosed by professional phagocytic cells such as macrophages and DCs and are degraded in lysosomes releasing the drug, nucleic acid, or adjuvant payload into the cytoplasm (MacDiarmid et al., 2007). Flow cytometry studies showed that EDV-COVID-αGC effectively delivered both S-polypeptides and αGC into murine bone marrow derived JAWSII DCs and that αGC was presented on the DC surface through glycolipid antigen presenting MHC Class I-like molecule, CD1d, to a similar efficiency as free αGC (FIG. 5B). The same DCs also presented S-polypeptides likely via MHC Class II molecules on the cell surface (FIG. 11C).

Figures 11D, 11E, 11F:
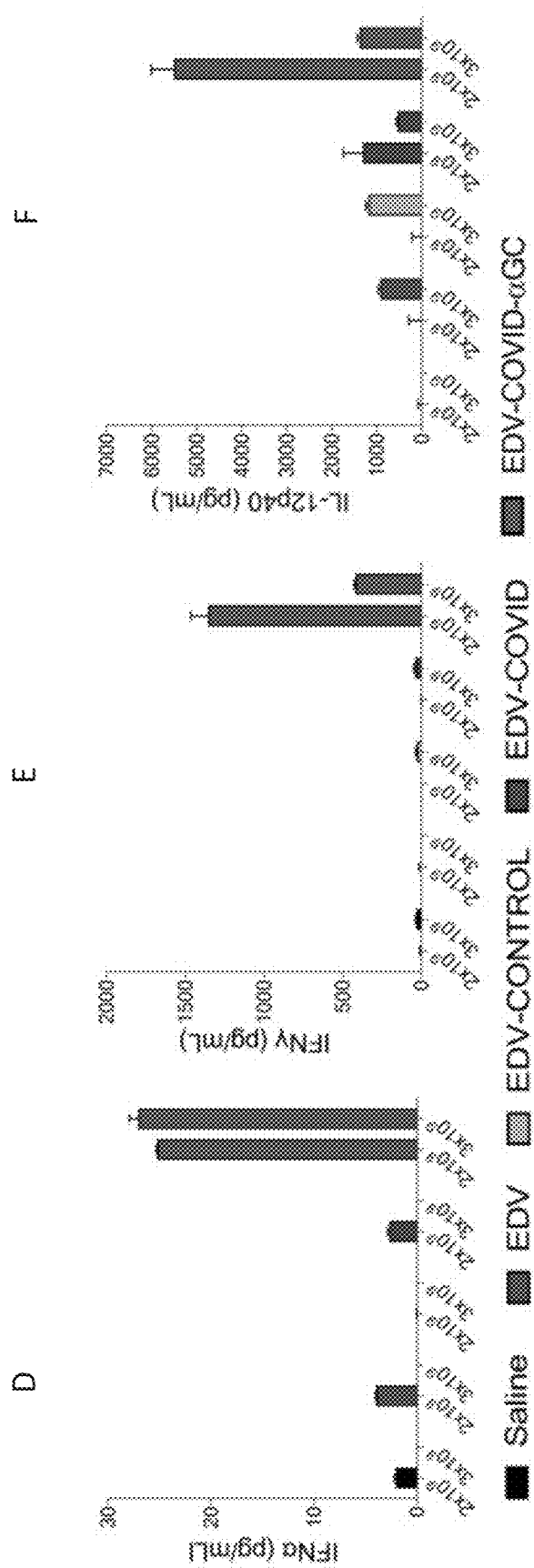
Figures 12A, 12B:
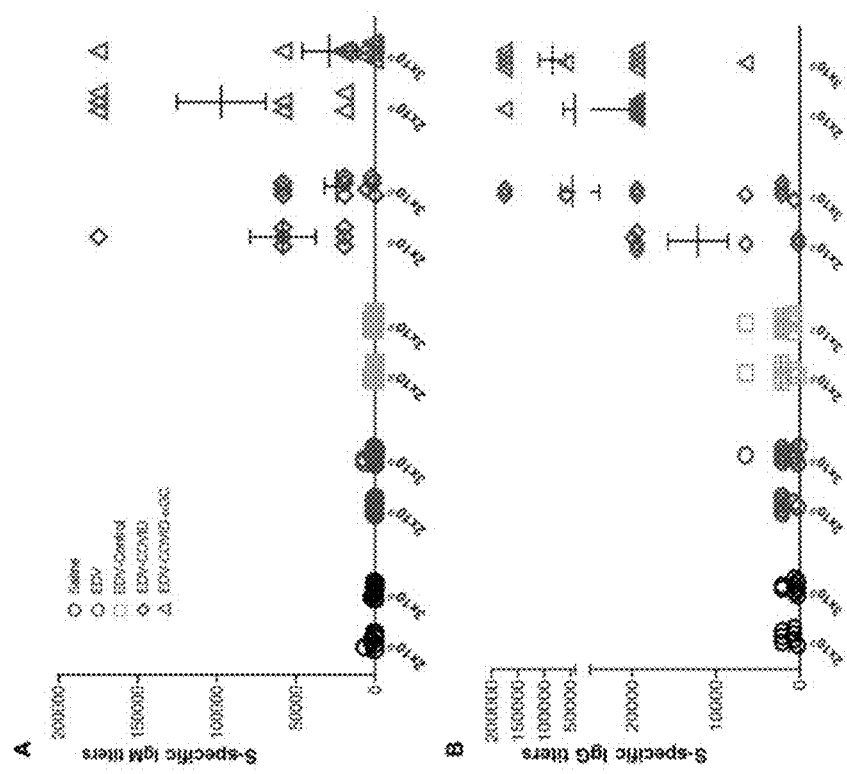
FIGS. 12A-G. 2. S-specific IgM and IgG titers.
Figures 12C, 12D, 12E, 12F:
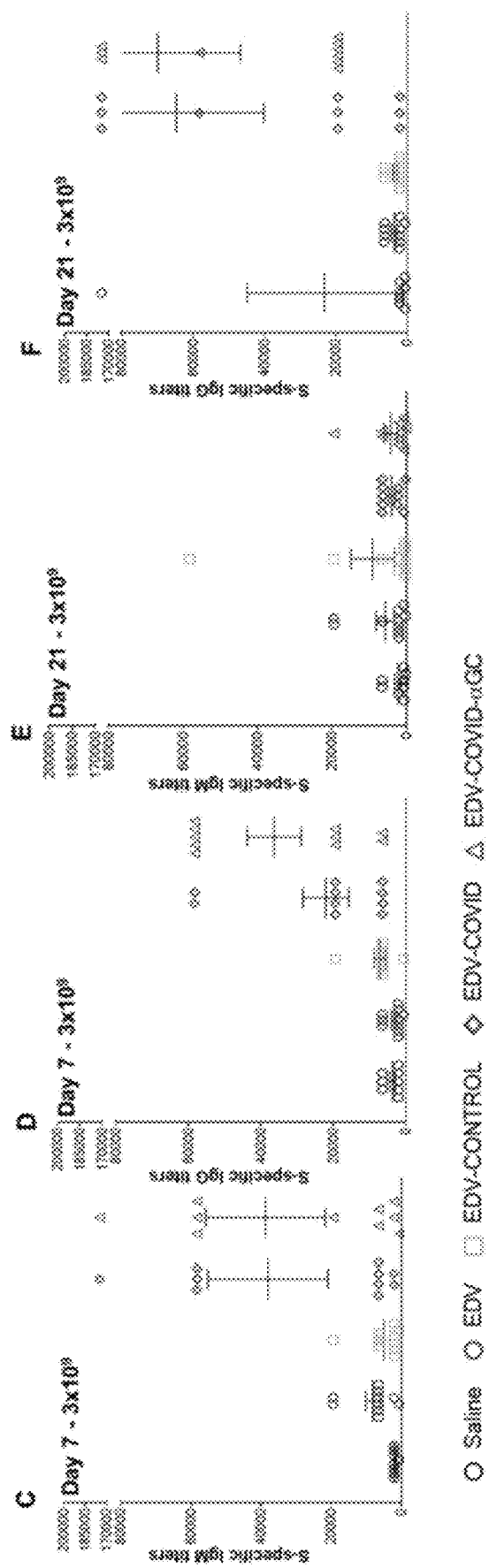
Figure 12G:
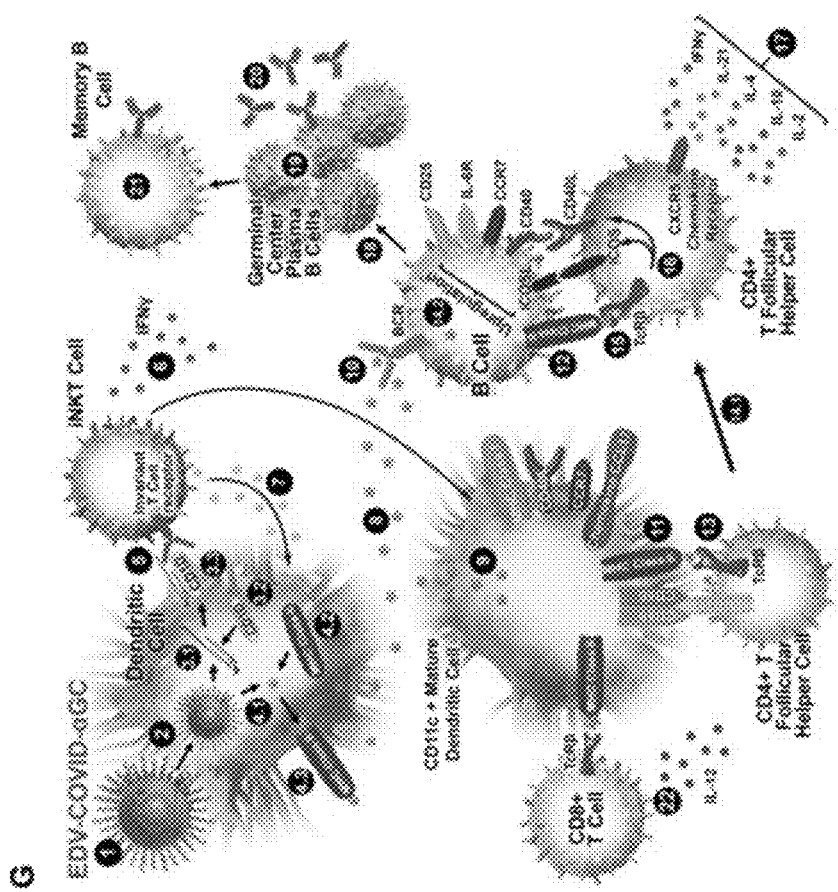

The display of αGC:CD1d on the DC cell surface recruits iNKT cells which carry the invariant TCR that is known to bind to CD1d-associated αGC on DCs, resulting in rapid secretion of IFNγ (Bricard and Porcelli, 2007) as seen in only the EDV-COVID-αGC group of mice (FIG. 11E). Vaccination using EDV-COVID-αGC resulted in significant serum IFNγ release by day 28 in the 6 human volunteers (FIG. 14B) suggesting activation of iNKT cells via the αGC:CD1d display on APCs (FIG. 12G). In contrast, the currently approved mRNA vaccine (BNT162b2) showed transient serum IFNγ release, which wanes by day 8 (Bergamaschi et al., 2021). This is not surprising since the mRNA vaccines do not elicit antigen-specific antibodies via the iNKT/DC pathway. This iNKT cell activation and IFNγ secretion is critical in the activation of the high-affinity antibody production pathway depicted in FIG. 12G.

Figures 11G, 11H, 11I:
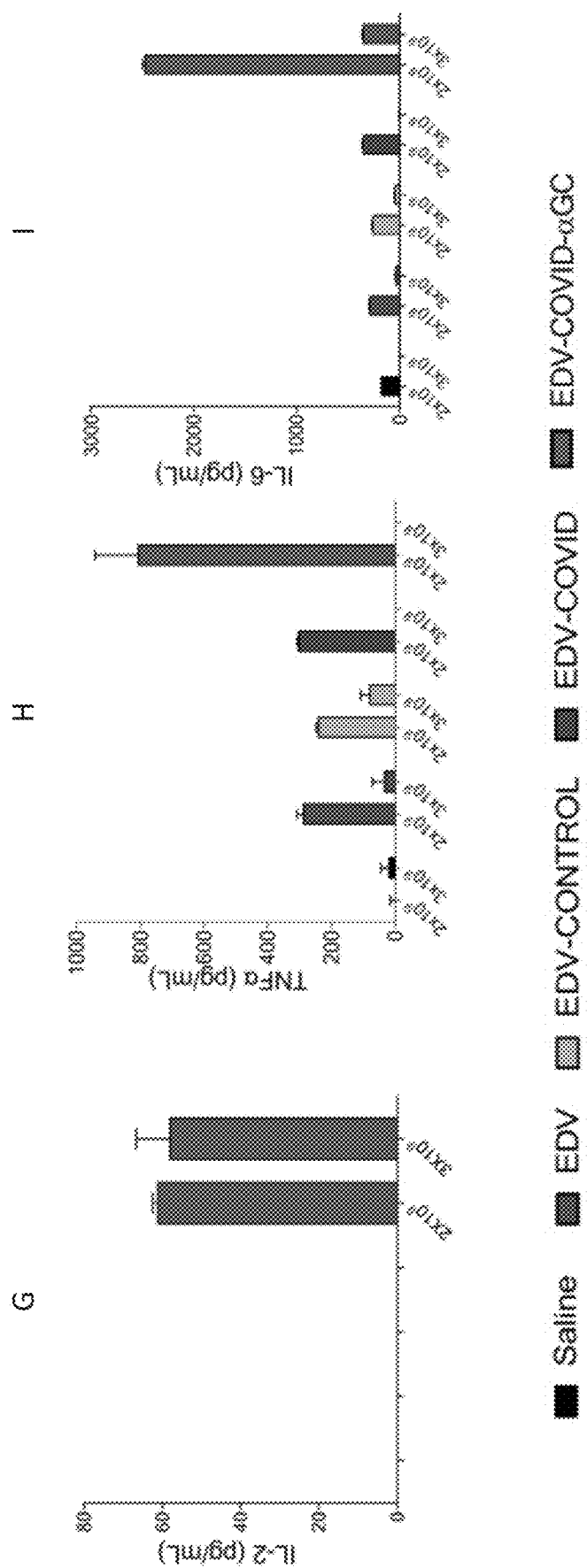

The DCs engulfing the EDVs are further activated via the pathogen associated molecular patterns (PAMPs) like EDV-associated LPS (Sagnella et al., 2020). This activation releases TNFα which is evident in all four EDV containing groups (FIG. 11H).

It has been demonstrated that activated iNKT cells promote DC maturation via CD40/40L signaling and cytokines IFNγ and TNFα (Hermans et al., 2003). It is also established that DCs express co-stimulatory molecules CD80/86 but after activation by iNKT cells, expression of these molecules is rapidly upregulated as seen in EnGeneIC's cancer studies (data not shown). Upregulation of CD40L on DC surface induces their maturation and secretion of IL-12 (FIG. 11F). Once more, the secretion of IL-12 was only observed with the EDV-COVID-αGC group. This promotes the cytolytic function of cytotoxic CD8+ T cells and priming of CD4+ T cells (Vinuesa et al., 2016) to provide cognate help to B cells for antibody production.

Figures 13A, 13B, 13C, 13D:
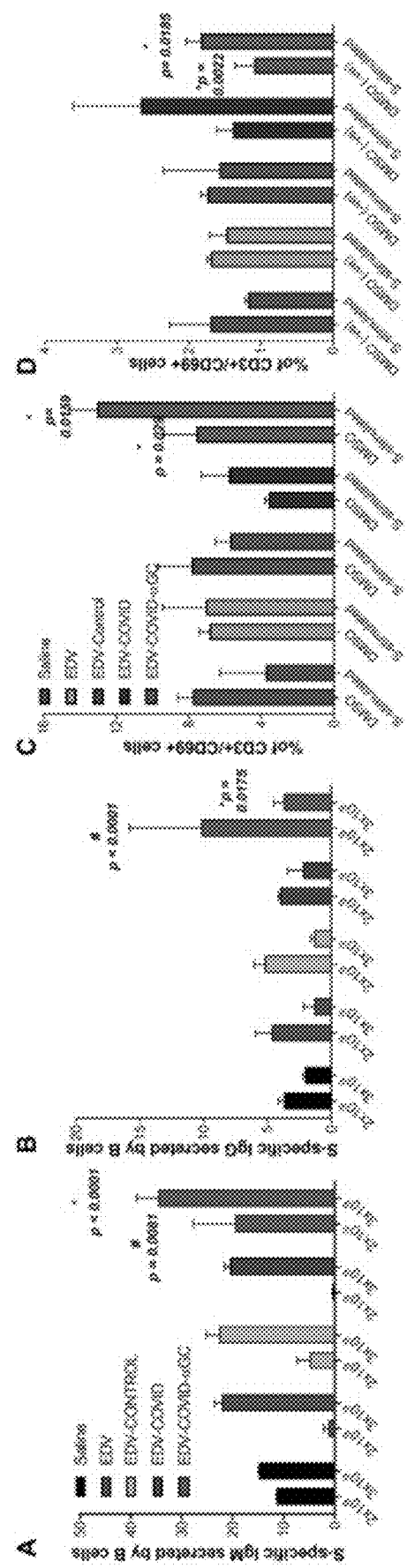
FIGS. 13A-K. Ex-vivo AIM Assay on murine bone marrow derived B cells and splenocytes and Surrogate Viral Neutralization Test (sVNT) on mouse serum. IgM (FIG. 13A) and IgG (FIG. 13B) S-protein specific titers from bone marrow-derived B cells isolated from $2\times10^9$ and $3\times10^9$ treated mice at day 28 post-initial dose after ex-vivo stimulation with SARS-CoV-2 S-protein. #: the difference was significant compared to all $2\times10^9$ injected mice; *: the difference was significant compared to all $3\times10^9$ groups. S-specific CD69 expression within the CD8+ cytotoxic T cell population in $2\times10^9$ (FIG. 13C) and $3\times10^9$ (FIG. 13D) EDV immunized mice following the stimulation of ex vivo splenocytes using the SARS-CoV-2 S-protein. *: the difference was significant compared to DMSO (−ve) stimulated controls. Data presented as mean±SEM.

Splenic CD8+ cytotoxic T cells from mice immunized with EDV-COVID-αGC exhibited the highest number of CD3+/CD69+ cytotoxic T cells compared to those in all other groups (FIG. 13C, D). T cell responses are important for both early viral clearance and long-term protection through memory S-specific T cells (Sattler et al., 2020). This data suggests that EDVs carrying S-protein were able to induce CD8+ T cell specificity, further enhanced by the inclusion of αGC.

It has been established that B cells that have MHC Class II presented protein antigen first engage in cognate interactions with TFH cells at the junction between the T cell-rich areas and B cell follicles of secondary lymphoid tissues (Eertwegh et al., 1993; Garside et al., 1998; Toellner et al., 1996). Engagement of MHC Class II/antigen complex on these B cells with the TFH cell surface TCR results in the rapid upregulation of cognate helper co-stimulatory molecules CD40L (Ma and Deenick, 2014), inducible T cell co-stimulator ICOS (Beier et al., 2000) and PD-1 (FIG. 12G).

Binding of ICOS ligand which is expressed on naive B cells (Hu et al., 2011), to ICOS on TFH cells is essential for the progression of pre-TFH to fully differentiated TFH cells. ICOS/ICOSL signalling also leads to the release of multiple cytokines including IFNγ, IL-4, IL-10, IL-17, IL-2, IL-6 and IL-21 (Bauquet et al., 2009; Bonhagen et al., 2003; Crotty, 2014; Lohning et al., 2003).

IL-6 has been shown to promote differentiation of activated CD4+ T cells into TFH cells during an immune response. IL-6 was shown to be elevated in the EDV-COVID-αGC injected group compared to all the controls (FIG. 11I). Secretion of TNFα and IL-6 (FIG. 11H, I) was short lived, self-limiting and none of the mice experienced any observable side effects. IL-10 also has anti-inflammatory properties playing a key role in limiting host response to inflammatory cytokines like TNFα. IL-10 is part of the innate immune response to the EDV associated LPS and hence occurred to the same extent (FIG. 11K) in all the EDV containing groups. Splenocytes from mice immunised with EDVs when stimulated with S-protein trimer showed that CD4+ T cells from EDV-COVID and EDV-COVID-αGC mice, but not those from other groups produced IFNγ but not IL-4 (FIG. 13E) indicating that CD4+ T cells were primed to elicit an antigen specific Th1 type response following vaccination.

IL-21 is mainly expressed by TFH cells and stimulates the proliferation of B cells and their differentiation into plasma cells. Class switching to IgG and IgA of CD-40L-interacting B cells is also promoted by IL-21 (Avery et al., 2008). A highly significant increase in IL-21 only in EDV-COVID-αGC treated mice was also observed (FIG. 11J) suggesting that αGC in EDV-COVID was essential to activate CD4+ TFH cells likely due to iNKT-licensed DC activation of TFH cells. In terms of S-specific antibody responses, IL-21 plays a critical role in T cell-dependent B cell activation, differentiation, germinal center (GC) reactions (Avery et al., 2010) and selection of B cells secreting antigen-specific high affinity antibodies. IL-21 secretion following mRNA vaccines has not yet been reported.

B cell activation results in either the extrafollicular proliferation of long-lived antibody producing B cells as plasmablasts or their entry into GCs for the subsequent development of memory or plasma cells (MacLennan et al., 2003). Post-TFH cell cognate interactions in the follicles, proliferating B cells give rise to GCs and undergo somatic hypermutation (SHM) in their immunoglobulin V-region genes and affinity maturation which produces plasma and memory cells of higher affinity (Ansel et al., 1999; Breitfeld et al., 2000; Gunn et al., 1998; Jacob et al., 1991; Kim et al., 2001; MacLennan, 1994; Schaerli et al., 2000). Within the GC, TFH cells provide further B cell help mainly through the secretion of IL-21 and CD40L co-stimulation, which are two major factors for B cell activation and differentiation. IL-21 also induces class switching to IgG1 and IgG3 by human naive B cells and increased secretion of these Ig isotypes by human memory B cells (Pène et al., 2004).

B cells isolated from mouse bone marrow at 28-day post-initial injection when co-incubated with S-protein showed that B cells from EDV-COVID-αGC immunized mice produced significantly higher levels of S-specific IgM (FIG. 13A) and IgG (FIG. 13B) as compared to all other groups. This indicates that EDV-COVID-αGC treatment induced SARS-CoV-2 specific memory B cells that could respond rapidly to S-protein re-exposure.

The presence of antigen specific memory B cells was detected in the PBMCs of the 6 healthy volunteers 28 days post-EDV-COVID-αGC vaccination (FIG. 14I), with seroconversion appeared to occur at around the 60 days post-initial injection mark (FIGS. 14J, K).

At both dose levels, high levels of anti-S protein IgM (FIG. 12A) and IgG (FIG. 12B) antibody titers were detected in the serum of most mice immunized with EDV-COVID-αGC at 28 days post-initial dose and a booster dose at day 21. IgM and IgG antibodies were also elicited by mice immunized with EDV-COVID but the IgG response was lower (FIGS. 12A, B). The inclusion of αGC into EDV-COVID resulted in a dramatic and consistent elevation of S-specific IgG titers. S-specific IgG responses by days 7 and 21 with EDV-COVID and EDV-COVID-αGC were similar (FIGS. 12D, H, F) however, the booster effect was pronounced on day 28 only in EDV-COVID-αGC immunized mice suggesting that the inclusion of αGC is likely to have directed the EDV-COVID-αGC towards the iNKT-licensed DC pathway, known to result in germinal center B cell activation/maturation with high titer antibody secretion.

Interestingly, EDV-COVID would not be expected to elicit S-specific antibodies via the iNKT/DC/TFH pathway and hence would not be expected to elicit the immunoglobulin class switching from the initial IgM response to IgG as would be expected via the iNKT/DC/TFH pathway elicited by EDV-COVID-αGC.

Surrogate virus neutralization tests showed 100% of the mice immunized with EDV-COVID-αGC were positive for neutralizing antibody against the wildtype SARS-CoV-2 virus (FIGS. 13F and 13G). In contrast, neutralizing antibodies were only detected in 50% (FIG. 13F) and 75% (FIG. 13G) of the mice immunized with EDV-COVID, highlighting the importance αGC in this vaccine. When tested against 4 common SARS-CoV-2 variants, Alpha (B.1.1.7), Beta (B.1.351), Gamma (P.1) and Delta (B.1.617.2), mice immunized with $3\times10^{9}$ EDV-COVID-αGC strongly neutralized binding of Alpha (100%; FIG. 13H), Beta (80%; FIG. 13I), Gamma (90%; FIG. 13J) and Delta (90%; FIG. 13K) S-proteins. In contrast, EDV-COVID poorly neutralized Alpha (50%; FIG. 13F), Beta (0%; FIG. 13I), Gamma (40%; FIG. 13J) and Delta (50%; FIG. 13K) variants.

Similar results were seen in the 4 healthy human volunteers where the PRNT90 (90% reduction in binding of the respective RBD to hACE2) virus neutralization of the serum antibodies at day 28 showed strong neutralization of RBDs from Wuhan (100%), Alpha (100%), Beta (100%), Gamma (100%), Delta (100%) and Omicron (75%). In contrast, the data for the mRNA vaccine (BNT162b2) was only provided for the PRNT50 assay (requires only 50% neutralization of RBDs) and these results required a serum dilution reduction of 2-fold (Alpha), 5 to 10-fold (Beta), 2 to 5-fold (Gamma), 2 to 10-fold (Delta), to achieve PRNT50 (https://covid19.who.int/, 2021) and over 22-fold for Omicron (Cele et al., 2021).

In the presence of T cell help, B cells reacting to protein antigens can either differentiate into extrafollicular plasma cells, giving rise to a rapid wave of low-affinity antibody, or grow and differentiate in follicles, giving rise to germinal centres. The data from sVNT show that the antibodies elicited via EDV-COVID-αGC can provide high level of neutralization of the RBDs from VOC suggesting that these are high affinity antibodies likely due to the entry of B cells into GCs and undergoing SHM resulting in high affinity antibodies. In contrast, antibodies generated by EDV-COVID immunisation did not afford protection against the VOC RBDs, suggesting that these B cells did not receive full cognate TFH help resulting in the formation of released plasma cells producing low affinity antibodies that were ineffective against the VOC RBDs.

This data suggests that the EDV-COVID-αGC vaccine may have the potential for early activation of the immune system with a broad anti-viral immune response even in the highly immunocompromised population and may assist in withstanding the occurrence of severe lymphopenia in these patients if they were to get infected with SARS-CoV-2 or its variants. It is also interesting to note that, in contrast to the results obtained in mouse studies, early elevation of IL6 and TNFα following EDV vaccine administration was not observed in the human volunteers.

Figures 14A, 14B, 14C:
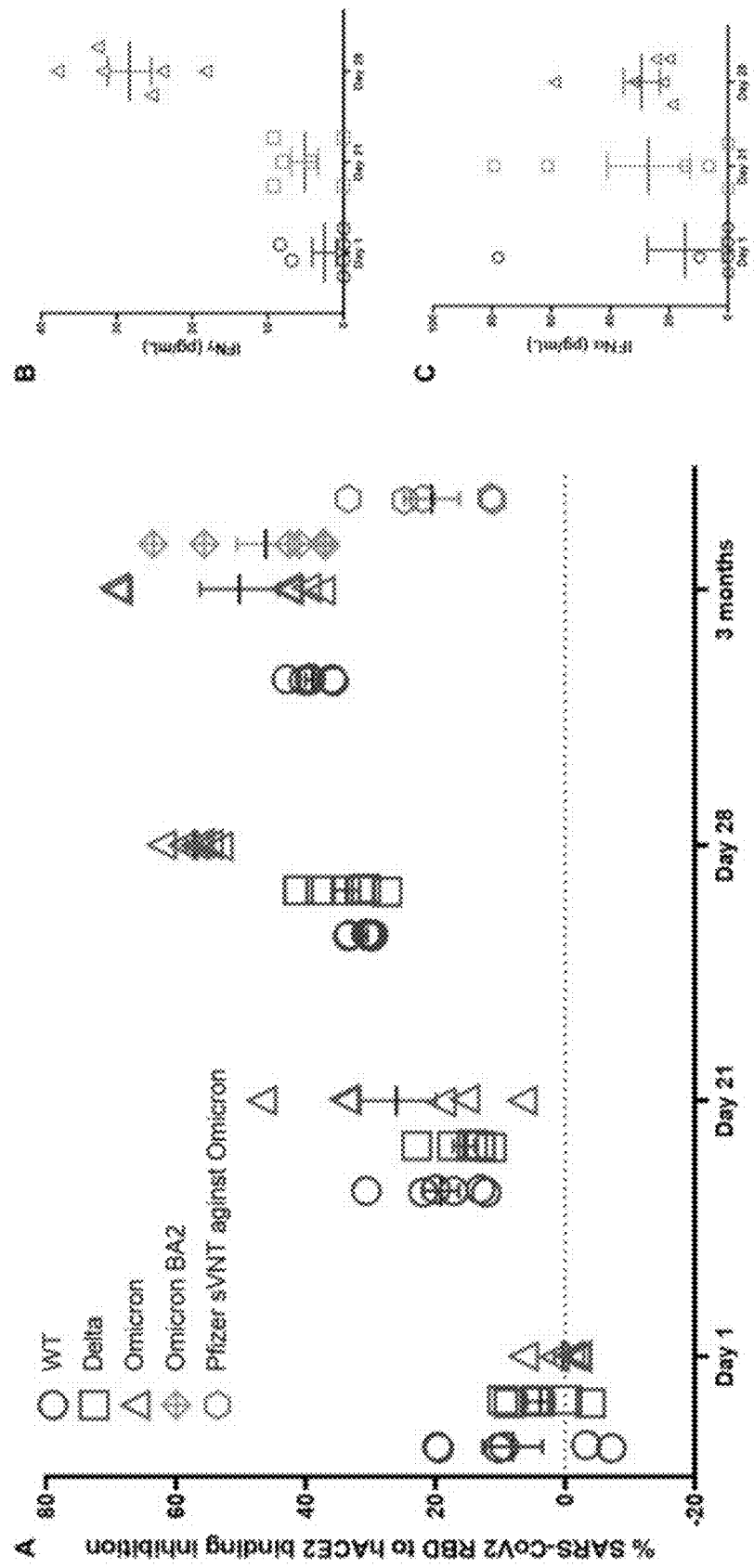
FIGS. 14A-K. Data from the first 4 EDV-COVID clinical trial volunteers at 28 days post-initial injection. Data from the cohort 2 of phase 1 clinical trial.

Serum sVNT from 6 healthy volunteers from the Covid vaccine phase I clinical trial exhibited strong neutralising activity (>PRNT90 equivalent) against wildtype, delta and omicron variants of the SARS-CoV2 virus by day 28. Neutralisation results for the omicron variant from 5 volunteers who had received at least 2 doses of the Pfizer vaccine are also shown as a comparison (FIG. 14A). These results demonstrate the effectiveness of the vaccines described herein as compared to a currently approved product, especially against the omicron variant, the current dominant variant of the SARS-CoV2 virus.

In addition, a notable increase in CD4+ and CD8+ central memory T cells were observed by day 28, in turn, an increase in the number of antigen-specific B cells as well memory B cells, suggesting successful B cell activation as indicated in FIG. 12G.

Figures 14D, 14E, 14F, 14G:
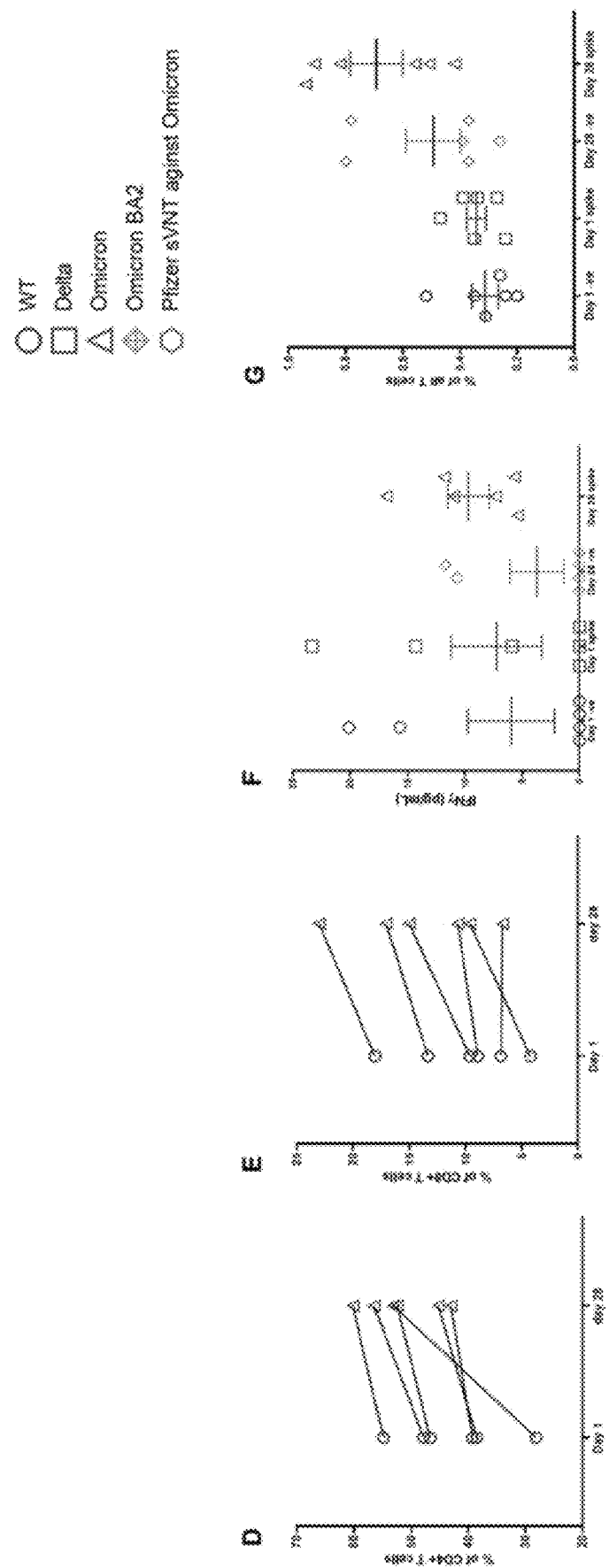
Figures 14H, 14I, 14J, 14K:
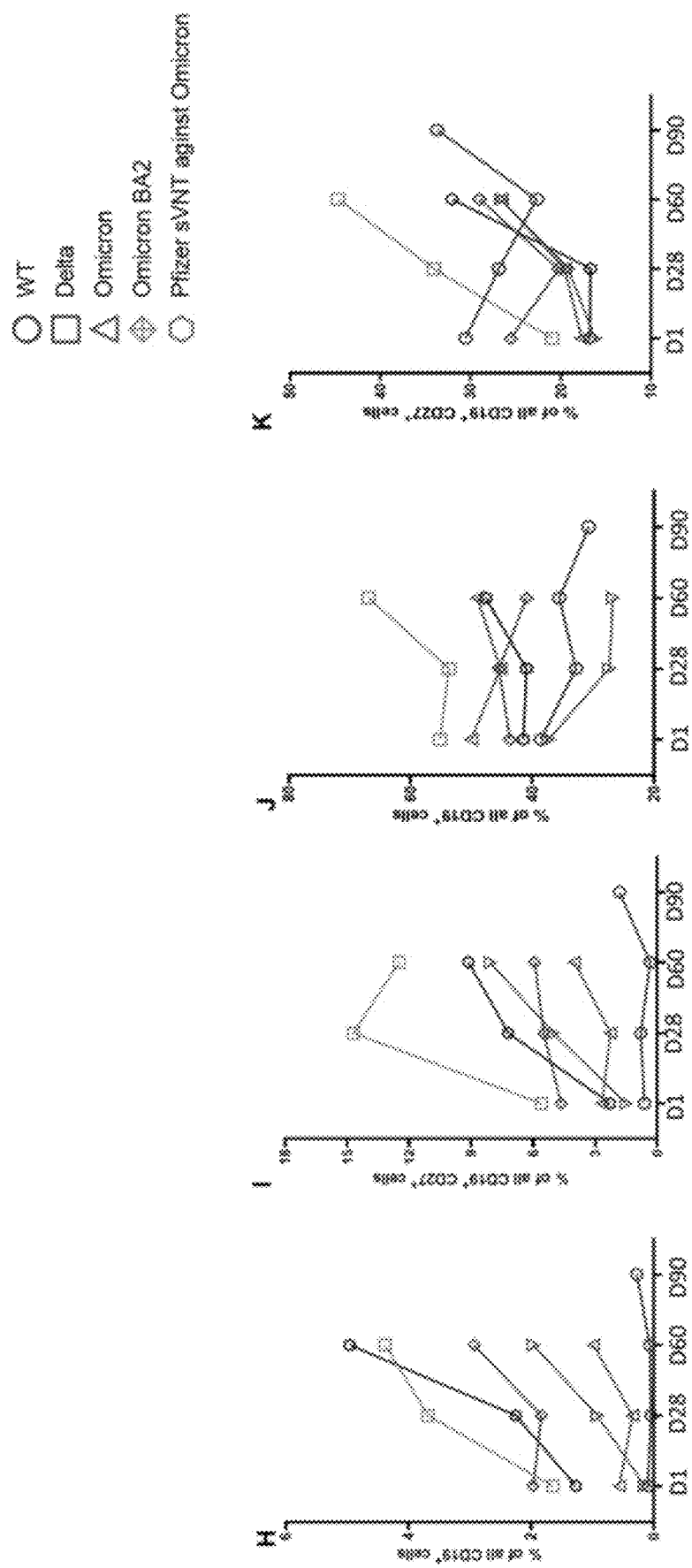

IFNγ could be detected in the supernatant of ex vivo PBMCs (FIG. 14F) stimulated with the SARS-CoV-2 spike protein, which corroborate the proposed pathway (FIG. 12G). Furthermore, the number of CD69+ T cells in the ex vivo PBMCs further increased following S-protein stimulation, this was not observed on day 1 (FIG. 14G). This indicates that the population of circulating T cells were SARS-CoV-2 antigen specific, as observed with other vaccines (Ewer et al., 2021).

It is currently thought that successful vaccination relies on both antibody- and T cell-mediated immunity, and while it is recognized that at least Type I and Type II interferons can elicit a broad anti-viral immunity, due to the multitude of effects that these interferons exhibit, it is quite possible that to curb the current and future viral pandemics, a broad specific and non-specific anti-viral immunity combined with a specific memory B and T cell response may be necessary.

Of greater importance is the type of antibodies that are elicited by the vaccines described herein. Most vaccines do not elicit the iNKT-licensed DC pathway and hence the B cells rapidly release low affinity antibodies, which then fail to neutralize VOC RBDs. In contrast, the iNKT-licensed DC pathway elicits high affinity antibodies due to B cells undergoing affinity maturation and SHM in GCs and these high affinity antibodies can be highly effective in neutralizing VOC RBDs.

EDV based cancer therapeutics or COVID vaccines can be lyophilized post-manufacturing and can be stored and transported world-wide at room temperature. The shelf life of EDV cancer therapeutics have currently been shown to be over 3 years and the EDV-COVID-αGC vaccine has exceeded 1 year of stability.

B. Aspects of the Present Disclosure

The SARS-CoV-2 vaccine compositions described herein comprise at least one antigen from a SARS-CoV-2 variant, and in other aspects can comprise at least one antigen from multiple SARS-CoV-2 variants (e.g., Alpha, Beta, Gamma, Delta). The vaccine compositions can additionally comprise a SARS-CoV-2 antigen from a non-variant SARS-CoV-2 strain.

A mature SARS-CoV-2 virus has four structural proteins, namely, envelope, membrane, nucleocapsid, and spike. It is believed that all these proteins may serve as antigens to stimulate neutralizing antibodies and increase CD4+/CD8+ T-cell responses. In one aspect, a Spike protein antigen from a SARS-CoV-2 variant is utilized in the compositions described herein. As noted above, the compositions can additionally comprise a viral antigen from a SARS-CoV-2 non-variant strain.

In another aspect, the SARS-CoV-2 antigen, either from a variant or non-variant strain, can be the receptor binding domain (RBD) of a Spike proteins, i.e., the site that is involved in binding to the human ACE2 receptor.

In one aspect, the vaccine compositions described herein comprise, within a single minicell, a bacterial gene expression plasmid encoding at least one SARS-CoV-2 antigen, such as a Spike protein, Spike protein (or other SARS-CoV-2 antigen) expressed by the plasmid, and α-galactosyl ceramide as an adjuvant that elicits an IFNγ response. In other aspects, the plasmid can encode more than one SARS-CoV-2 antigen, such as Spike proteins from a SARS-CoV-2 variant (e.g., Alpha, Beta, Gamma, Delta, or other variants described herein or as yet unidentified) as well as from a SARS-CoV-2 strain.

In other aspects, the disclosure encompasses a composition comprising a first minicell comprising α-galactosyl ceramide as an adjuvant that elicits an IFNγ response and a second minicell comprising a bacterial gene expression plasmid encoding at least one SARS-CoV-2 antigen, such as a Spike protein, and Spike protein (or other SARS-CoV-2 antigen) expressed by the plasmid. Again, in other aspects, the plasmid can encode more than one SARS-CoV-2 antigen, such as Spike proteins from a SARS-CoV-2 variant (e.g., Alpha, Beta, Gamma, Delta, or other variants described herein or as yet unidentified) as well as from a SARS-CoV-2 strain.

Unlike current COVID-19 vaccines, the bacterial minicell coronavirus vaccine is expected to be effective against COVID-19 variants, both present variants as well as emergent variants. This is because, as described herein, the design of the bacterial minicell coronavirus vaccines results in broad antiviral effectiveness, which is in contrast to all COVID-19 vaccines currently being used. Effectiveness against variants is critical for the long term success and management of the COVID-19 pandemic.

Exemplary advantages of the present vaccine compositions described herein over other COVID-19 vaccines are detailed in the Table below.

|  | EDV-COVID-19 Therapeutic vaccine | Other vaccines e.g. Pfizer-BioNTech, Moderna, Regeneron |
|---|---|---|
| Anti-spike protein serum IgG & IgM response | Yes | Yes |
| Anti-spike protein nasal and oral mucosa secretory IgA response with intranasal delivery | Yes | No |
| Anti-viral IFN-α & IFN-β response | Yes | Only some e.g. those carrying nucleic acids like mRNA |
| Anti-viral IFN-γ response | Yes | No |
| Alleviation of lymphopenia especially in elderly | Yes | No |
| Activation of WBC to fight viral infection | Yes | Only some |
| CD8+ cytotoxic T cell & iNKT cell response specific to SARS-CoV-2 | Yes | No. Some capable of CD8+ T cell responses. |

| | EDV-COVID-19 Therapeutic vaccine | Other vaccines e.g. Pfizer-BioNTech, Moderna, Regeneron |
|---|---|---|
| Can be effective in immuno-compromised patients e.g. cancer | Yes | No |
| Can be effective in elderly with co-morbidities | Yes | Only some |
| Toxicity | None | Some patients with severe toxicity |
| Can it be effective in patients with auto-antibodies to IFNα | Yes. Because it also provokes IFNβ and IFNγ anti-viral responses | No. Because they do not elicit other anti-viral interferon responses |
| Can the vaccine be readily altered to cover emerging mutant SARS-CoV-2 viruses | Yes. Simply add a new plasmid to the EDV which carries gene sequences for the mutant proteins. Multiple sequences can be carried by the same plasmid | No. Completely new vaccines have to be engineered. |
| Does it work as a vaccine as well as a therapeutic | Yes | No - One or the other |
| Storage & transport issues | No problems. Can be stored & transported at room temperature. | Serious issue. Storage and transport at −20° C. to −70° C. |
| Shelf life | Over 3 years | 2 months to 6 months |
| Cost of product | Inexpensive to make. Affordable world-wide | Some quite expensive & prohibitive in many countries. |

Figure 1B:
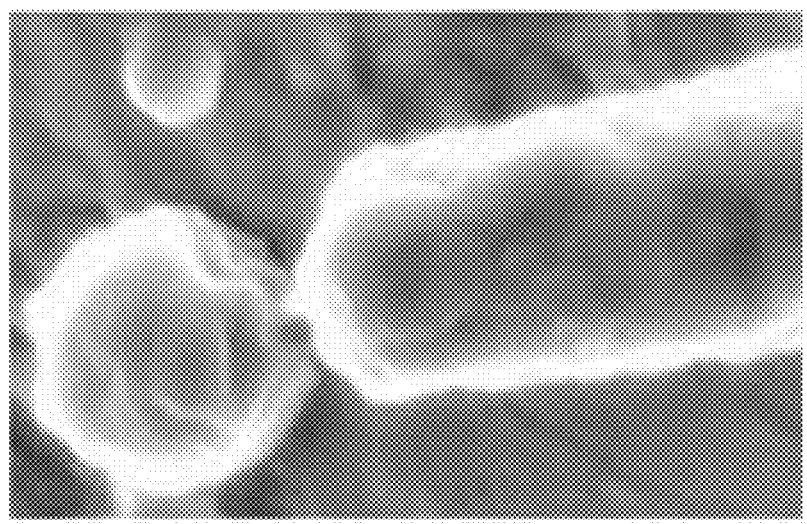
FIG. 1B depicts a transmission electron micrograph image showing the structure of an empty EDV bacterial nanocell, with a diameter of about 400 nm.
Figure 2A:
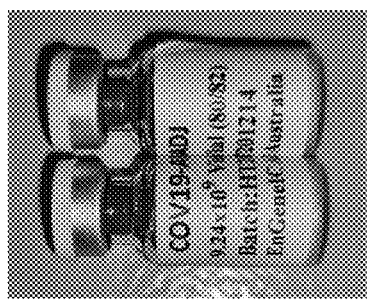
FIG. 2A is a graphical depiction of an EDV-COVID-19 vaccine composition, comprising a bacterial expression plasmid ("EDV"), such as that shown in FIG. 1B, wherein the EDV first expresses Spike protein of SARS-CoV-2 in the EDV cytoplasm and additionally carrys or is loaded with the CD1d-restricted iNKT cell antigen glycolipid α-galactosylceramide (α-GalCer) IFN-7 as an adjuvant or stimulating agent. Expressed Spike protein encoded by SARS-CoV-2 is designated by a star on FIG. 2A.

FIGS. 1-3 depict various exemplary vaccine constructs according to the disclosure. The first construct (FIG. 2A) shows a typical EDV-COVID-19 vaccine composition comprising a bacterial minicell containing a combination of (i) a bacterial gene expression plasmid encoding the Spike protein, (ii) a Spike protein expressed by the plasmid, and (iii) a glycolipid α-galactosyl ceramide as an adjuvant that elicits an IFNγ response, and the second construct (FIG. 3) shows an EDV-COVID-19 vaccine composition comprising a bacterial minicell containing a combination of (i) a bacterial gene expression plasmid encoding the Spike protein of SARS-CoV-2 as well as multiple variant encoded Spike proteins, (ii) multiple Spike proteins, including Spike proteins from COVID-19 variants expressed by the plasmid, and a (iii) glycolipid α-galactosyl ceramide as an adjuvant. Both plasmids are bacterial expression plasmids so the Spike proteins are produced in the EDV cytoplasm.

A key point of these exemplary constructs is that the plasmids are bacterial expression with bacterial origin of replication, and therefore they do not replicate in human cells and do not integrate into the chromosome. The plasmids remain episomal and degrade when the cell completes its life span.

In another aspect of the disclosure, the vaccine compositions described herein comprise one or more minicells comprising a plasmid having a bacterial gene expression promoter which produces the SARS-CoV-2 antigen (e.g., Spike protein or other SARS-CoV-2 antigen) in the parent bacterial strain and which then segregates into the recombinant minicell. Therefore, in one aspect the composition carries the plasmid, Spike proteins (or other SARS-CoV-2 antigen) and α-galactosyl ceramide in the same minicell or in multiple minicells.

A key point of these exemplary constructs is that the plasmids are bacterial expression with bacterial origin of replication, and therefore they do not replicate in human cells and do not integrate into the chromosome. The plasmids remain episomal and degrade when the cell completes its life span.

In another aspect, the plasmid can carry a mammalian gene expression promoter so the Spike proteins are only expressed in the human professional phagocytic cells once the minicells have been phagocytosed, plasmid released and mRNA expressed in the mammalian cell nucleus. Therefore, this composition differs from the composition described above since this minicell composition carries the recombinant plasmid with a mammalian gene expression promoter and Spike protein genes (or other SARS-CoV-2 antigen) from SARS-CoV-2 and mutant or variant SARS-CoV-2 cloned downstream of the promoter and α-galactosyl ceramide. Therefore, in this vaccine composition, the Spike proteins are missing in the minicell.

In another aspect, the gene sequences from SARS-CoV-2 and mutant/variant SARS-CoV-2 viruses that are cloned in the plasmid can comprise the entire Spike protein encoding genes or just the human ACE2 receptor binding (RBD) gene sequences since the desired antibody response is against the RBD regions of these virus Spike proteins (or other SARS-CoV-2 antigens).

FIGS. 1-3 depict various exemplary vaccine constructs according to the disclosure. The first construct (FIG. 2A) shows a typical EDV-COVID-19 vaccine composition comprising a bacterial minicell containing a combination of (i) a bacterial gene expression plasmid encoding the Spike protein, (ii) a Spike protein expressed by the plasmid, and (iii) a glycolipid α-galactosyl ceramide as an adjuvant that elicits an IFNγ response, and the second construct (FIG. 3) shows an EDV-COVID-19 vaccine composition comprising a bacterial minicell containing a combination of (i) a bacterial gene expression plasmid encoding the Spike protein of SARS-CoV-2 as well as multiple variant encoded Spike proteins, (ii) multiple Spike proteins, including Spike proteins from COVID-19 variants expressed by the plasmid, and a (iii) glycolipid α-galactosyl ceramide as an adjuvant. Both plasmids are bacterial expression plasmids so the Spike proteins are produced in the EDV cytoplasm.

Further, bacterial minicells or EDVs are only engulfed by professional phagocytes, e.g. macrophages, dendritic cells and NK cells. They do not enter normal cells. Finally, over 2,400 EDV (bacterial minicell) doses carrying various drugs, nucleic acids, and glycolipid have been administered in over 170 end-stage cancer patients in Australia and USA, with minimal to no toxic side effects despite repeat dosing (15 to 50 repeat doses in many patients).

The plasmid can also be a mammalian expression plasmid, where the gene expression promoter can be a mammalian expression promoter. Therefore, the Spike proteins are not produced in the EDV cytoplasm. Instead, when the EDVs are broken down in the lysosomes of the professional phagocytic cells like macrophages, dendritic cells, NK cells, the plasmid is released, exported to the nucleus and the Spike protein is expressed after the mammalian gene expression promoter expresses the mRNA.

The EDV-COVID-19 vaccines can be administered intramuscularly, intranasally, or orally. In general, intramuscular administration is preferred. However, the vaccines can be given intranasally or orally to induce a secretory IgA response in the mucosal tract and the lungs. Also, this would elicit an innate and adaptive immune response in the lungs and the oral passages.

The vaccines can be mixed and matched in that the same vaccine can be given intramuscularly and intranasally to elicit a robust systemic and mucosal immune response.

Figure 2B:
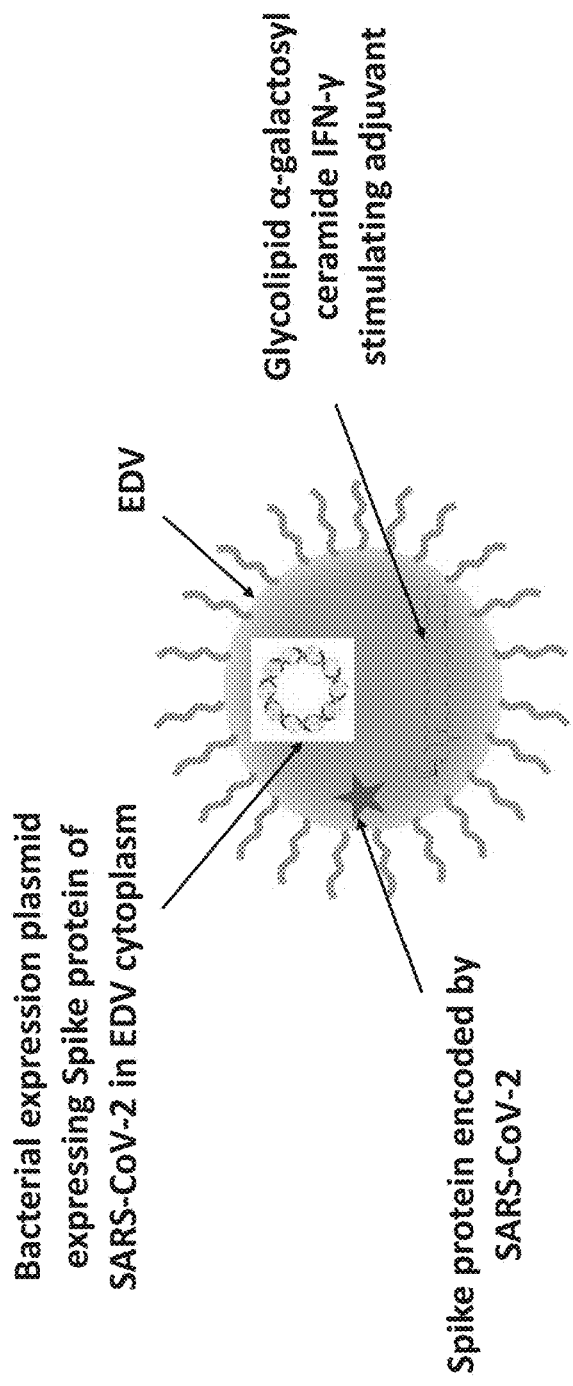
FIG. 2B shows an exemplary vial containing lyophilized EDV-COVID-19 vaccine composition.

In particular, FIG. 1A depicts a scanning electron microscope image showing production of an EnGeneIC Dream Vector (EDV) nanocell from a safe bacterium *Salmonella typhimurium* strain, and FIG. 1B depicts a transmission electron micrograph image showing the structure of an empty EDV nanocell, with a diameter of about 400 nm. FIG. 2A is a graphical depiction of an EDV-COVID-19 vaccine composition, comprising a bacterial expression plasmid ("EDV"), such as that shown in FIG. 1B, wherein the EDV first expresses Spike protein of SARS-CoV-2 in the EDV cytoplasm and additionally carrys glycolipid α-galactosyl ceramide IFN-7 stimulating agent. Expressed Spike protein encoded by SARS-CoV-2 is designated by a star on FIG. 2A. FIG. 2B shows an exemplary vial containing lyophilized EDV-COVID-19 vaccine composition.

FIG. 3 is a graphical depiction of an EDV-COVID-19 vaccine composition, comprising a bacterial expression plasmid ("EDV"), such as that shown in FIG. 1B, wherein the EDV contains (i) a plasmid expressing cloned Spike proteins from original SARS-CoV-2 and multiple genetic variants, such as delta variant and Brazil variant, (ii) a gene expression promotor expressing all proteins as a single mRNA and separate proteins in the EDV cytoplasm, (iii) multiple Spike proteins, including Spike protein produced by SARS-CoV-2, Brazil variant Spike Protein, and delta variant Spike protein, and (iv) the CD1d-restricted iNKT cell antigen glycolipid α-galactosylceramide (α-GalCer) as an adjuvant or IFN-7 stimulating agent. Expressed Spike proteins encoded are designated by stars on FIG. 3.

The EDV-COVID-19 vaccine composition can be readily lyophilized, stored at room temperature, with a shelf life of over 3 years. The EDV-COVID-19 vaccine composition can be courier shipped anywhere in the world and stored at, for example, a hospital pharmacy. Transport and storage can also be done at room temperature. Further, there is a low cost of manufacture, meaning that the EDV-COVID-19 vaccine composition is affordable worldwide.

Figure 9:
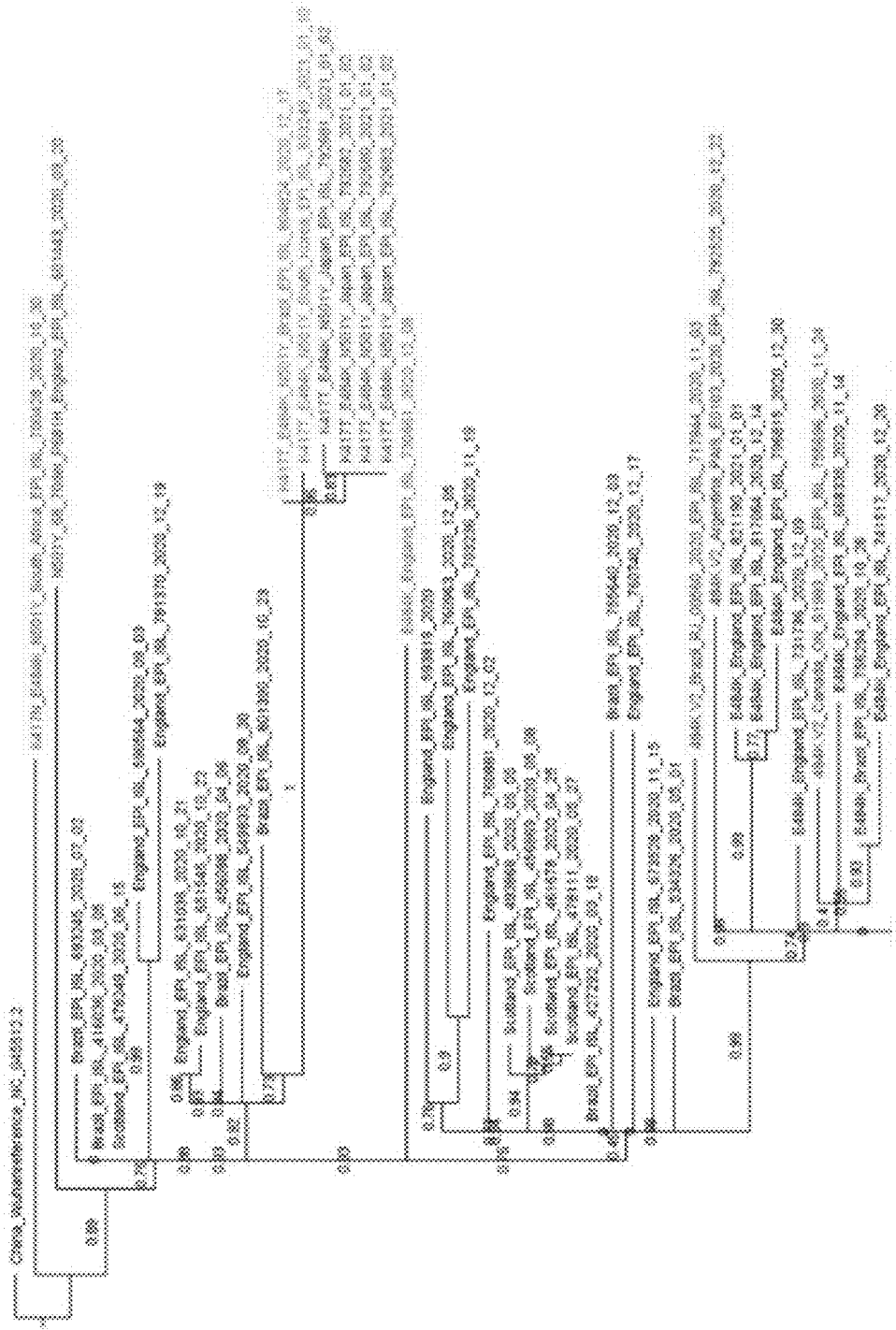
FIG. 9 depicts a representative phylogenetic tree of SARS-CoV-2 virus and known variants. Full genome SARS-CoV-2 sequences were downloaded on 19 Jan. 2021 from GISAID (https://www.gisaid.org/), aligned using MAFFT: https://mafft.cbrc.jp/alignment/software/ and manually edited using BioEdit v7.2.5. Phylogenetic tree construction was performed using FastTree v2.1.11, with Shimodaira-Hasegawa-like local branch supports, and displayed using FigTree v1.4.4. Excerpted from Toovey et al., *J. Infect.*, 82(5):e23-324 (Feb. 3, 2021).

The genomic sequence of a number of different SARS-CoV-2 virus strains and variants, including the Spike proteins of such viruses, is known. See e.g., FIG. 9. A new viral strain occurs when a virus goes through one or more mutations that change its behaviour in some way, but a variant develops when a virus goes through a mutation of any kind. Examples of SARS-CoV-2 strains include the L strain, the S strain, the V strain, the G strain, the GR strain, and the GH strain. www.sciencedaily.com/releases/2020/08/200803105246.htm.

Examples of known SARS-CoV-2 variants include, but are not limited to, (1) UK SARS-CoV-2 variant (B.1.1.7/VOC-202012/01), also known as the Alpha variant (B.1.1.7 (Alpha)); (2) B.1.1.7 with E484K variant; (3) B.1.617.2 (Delta) variant; (4) B.1.351 (Beta) variant, also known as the South Africa variant; (5) P.1 (Gamma) variant; (6) B.1.525 (Eta) variant; (7) B.1.526 (Iota) variant; (8) B.1.617 (Kappa, Delta) variants; (9) B.1.617.1 (Kappa) variant; (10) B.1.617.2 variant; (11) B.1.617.3 variant; (12) Lambda (lineage C.37) variant; (13) Epsilon (lineages B.1.429, B.1.427, CAL.20C) variants; (14) Zeta (lineage P.2) variant; (15) Theta (lineage P.3) variant; (16) R.1 variant; (17) Lineage B.1.1.207 variant; and (18) Lineage B.1.620 variant.

Other SARs-CoV-2 variants include SARS-CoV-2 variants having (1) a L452R Spike Protein Substitution, (2) an E484K Spike Protein Substitution, (3) K417N, E484K, N501Y Spike Protein Substitution, (4) K417T, E484K, N501Y Spike Protein Substitution, and (5) SARs-CoV-2 variants having one or more of the following missense mutations: N440, L452R, S477G/N, E484Q, E484K, N501Y, D614G, P681H, P681R, and A701V.

See also (1) Lu et al., "Genomic Characterization and epidemiology of 2019 novel coronavirus: implications for virus origins and receptor binding," *The Lancet*, 395:565-574 (Feb. 22, 2020); (2) Galloway et al., "Emergence of SARS-CoV-2 B.1.1.7 Lineage—United States, Dec. 29, 2020-Jan. 12, 2021," *Centers for Disease Control and Prevention*, 70(3):95-99 (Jan. 22, 2021) (SARS-CoV-2 UK variant sequencing, B.1.1.7 lineage (20I/501Y.V1)); (3) Toovey et al., "Introduction of Brazilian SARS-CoV-2 484K.V2 related variants into the UK," *J. Infect.*, 82(5):e23-e24 (Feb. 3, 2021) (describing two Brazilian variants); (4) Sah et al., "Complete Genome Sequence of a 2019 Novel Coronavirus (SARS-CoV-2) Strain Isolated in Nepal," *ASM Journals, Microbiology Resource Announcements*, 9(11) (Mar. 11, 2020); and (5) "Variants of SARS-CoV-2", www.wikipedia.org/wiki/Variants_of_SARS-CoV-2#Notable_missense_mutations.

Figure 10A:
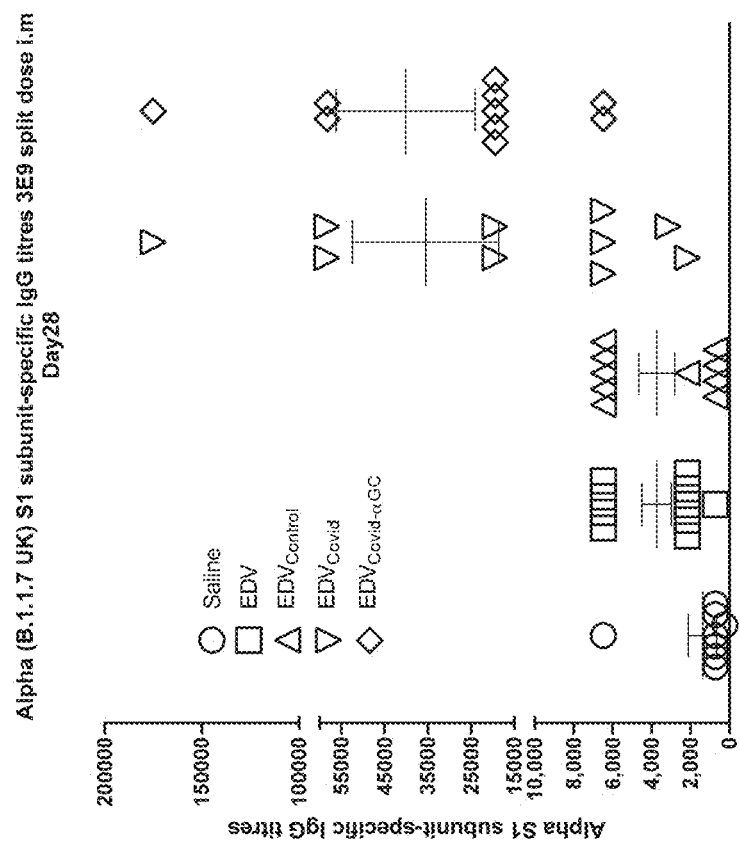
FIGS. 10A-D show the results of IgG titres following administration to five different groups of mice (n=6 per group; ELISA samples run in triplicate): Group 1=saline; Group 2=EDV (bacterial minicell with no payload); Group 3=EDV$_{control}$ (EDVs carrying the plasmid with no insert expressing the Spike protein i.e. plasmid backbone only); Group 4=EDV$_{Covid}$ (bacterial minicell comprising the plasmid and the encoded SARS-CoV-2 Spike protein) and Group 5=EDV$_{Covid+\alpha GC}$ (construct shown in FIG. 2A). These mice were given $3\times10^9$ EDVs. The results shown in FIGS. 10A-D, detailing S1 subunit-specific IgG titres 3E9 following split dose IM at day 28, demonstrate that serum IgG titres obtained from mice treated with EDV-COVID-GC binds strongly to all four mutant virus Spike proteins: (1) SARS-CoV-2 variant Alpha (B.1.1.7.UK) (FIG. 10A); (2) SARS-CoV-2 variant Beta (B.1.351. SA) (FIG. 10B); (3) SARS-CoV-2 variant Delta (B.1.617.2 India); and (4) SARS-CoV-2 variant Gamma (P.1 Brazil).
Figure 10B:
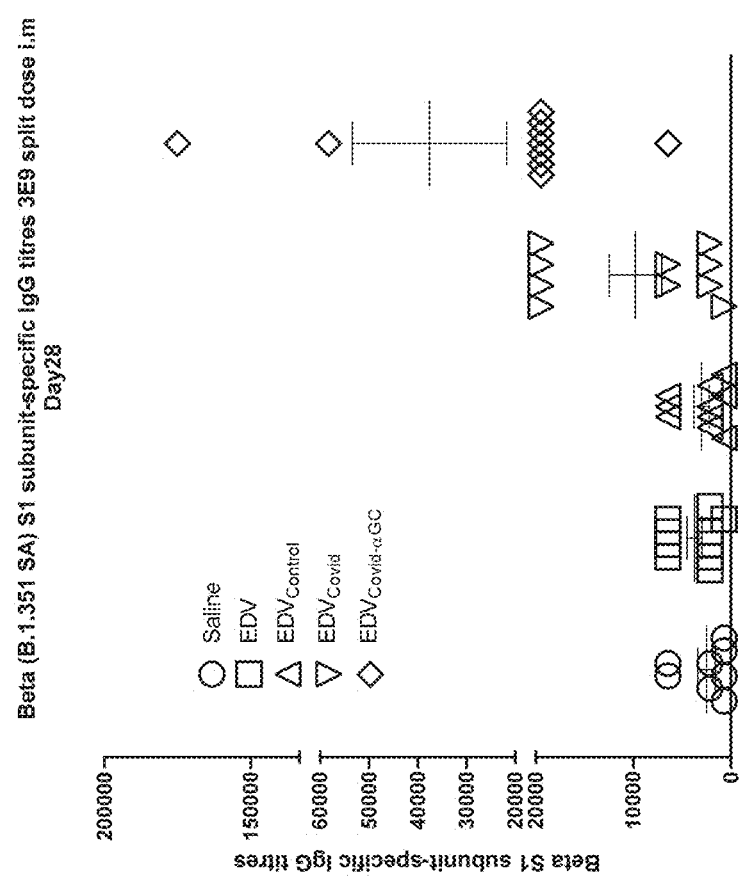
Figure 10C:
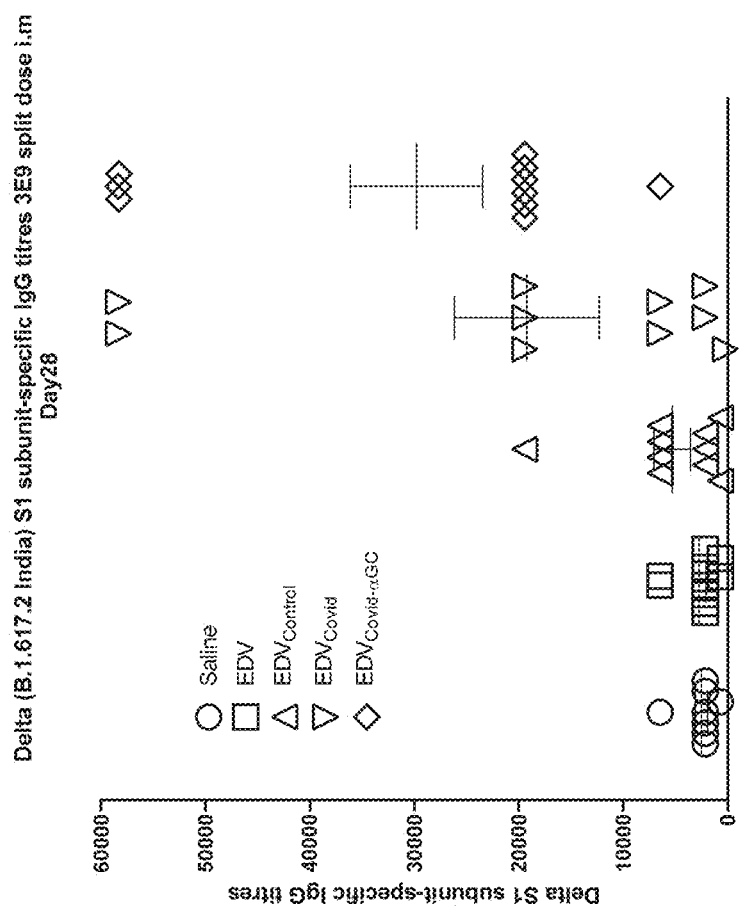
Figure 10D:
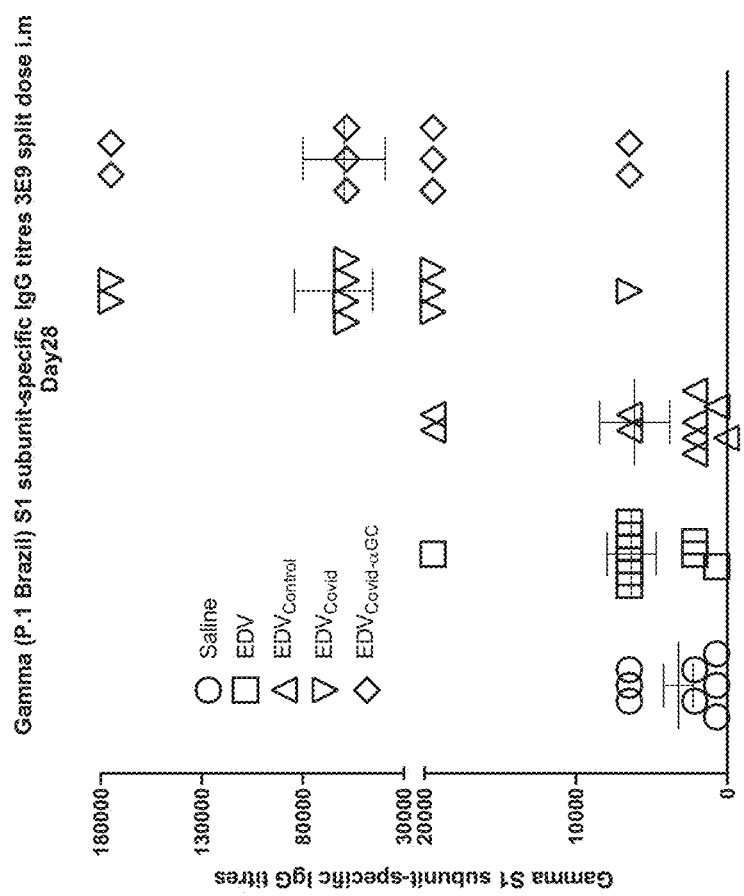

Surprisingly, and in contrast to at least some of the COVID-19 vaccines currently being used, the vaccine compositions described herein generate immunity as measured by IgG titres against multiple SARS-CoV-2 variants. In particular, FIGS. 10A-D show the results of IgG titres following administration to five different groups of mice (n=6 per group; ELISA samples run in triplicate): Group 1=saline; Group 2=EDV (bacterial minicell with no payload); Group 3=$EDV_{control}$ (EDVs carrying the plasmid with no insert expressing the Spike protein i.e. plasmid backbone only); Group 4=$EDV_{Covid}$ (bacterial minicell comprising the plasmid and the encoded SARS-CoV-2 Spike protein) and Group 5=$EDV_{Covid+alphaGC}$ (construct shown in FIG. 2A). The mice were given $3 \times 10^9$ EDVs. The results shown in FIGS. 10A-D, detailing S1 subunit-specific IgG titres 3E9 following split dose IM at day 28, demonstrate that serum IgG titres obtained from mice treated with EDV-COVID-GC binds strongly to all four mutant virus Spike proteins: (1) SARS-CoV-2 variant Alpha (B.1.1.7.UK) (FIG. 10A); (2) SARS-CoV-2 variant Beta (B.1.351. SA) (FIG. 10B); (3) SARS-CoV-2 variant Delta (B.1.617.2 India); and (4) SARS-CoV-2 variant Gamma (P.1 Brazil).

II. Compositions

The compositions comprise a combination of (a) a vector comprising a plasmid that encodes at least one viral antigen from a SARS-CoV-2 virus variant, and optionally additionally a viral antigen from SARS-CoV-2; and (b) a vector comprising a CD1d-recognized antigen, wherein at least one of the two vectors is an intact, bacterially-derived minicell or killed bacterial cell, and wherein the two vectors are present in at least one pharmaceutically acceptable carrier. An exemplary CD1d-recognized antigen is α-galactosylceramide (α-GalCer), which stimulates IFNγ, which is critical to viral immunity. In another aspect, both of the two vectors are intact, bacterially-derived minicells or killed bacterial cells, including either two separate bacterially-derived minicells or killed bacterial cells or together in a single bacterially-derived minicell or killed bacterial cell.

In another aspect, the vector or intact, bacterially derived minicell can comprise one or more of the four major structural proteins, or antigenic fragments thereof, of a SARS-CoV-2 virus or variant, e.g., the spike (S) protein, nucleocapsid (N) protein, membrane (M) protein, and the envelope (E) protein.

In another aspect, one or the other (but not both) of the plasmid payload and the CD1d-recognized payload, as described above, can be administered via a vector that is not an intact, bacterially derived minicell or a killed bacterial cell. Exemplary of such non-minicell vectors are liposomes, polymeric vectors, reconstituted virus envelopes (virosomes), and immune stimulating complexes (ISCOMs). For instance, see Bungener et al. (2002), Kersten et al. (2003), Daemen et al. (2005), Chen et al. (2012) and Yue et al. (2013). See https://www.ncbi.nlm.nih.gov/pubmed/12428908 (Bungener); https://www.meta.org/papers/liposomes-and-iscoms/12547602 (Kersten); https://www.ncbi.nlm.nih.gov/pubmed/15560951 (Daemen); https://journals.plos.org/plosone/article?id=10.1371/journal.pone.0039039 (Chen); https://pubs.rsc.org/en/content/articlelanding/2013/bm/c2bm00030j#!divAbstract (Yue).

The composition can be administered via any pharmaceutically acceptable method, such as but not limited to injection (parenteral, intramuscular, intravenous, intraportal, intrahepatic, peritoneal, subcutaneous, intratumoral, or intradermal administration), oral administration, application of the formulation to a body cavity, inhalation, insufflation, nasal administration, pulmonary administration, or any combination of routes also may be employed.

The compositions can be administered to subjects at risk of a SARS-CoV-2 variant infection as a vaccine, or the compositions can be administered as a therapeutic to a subject who is suffering from a SARS-CoV-2 variant infection viral infection.

It has been shown that in the end-stage cancer patients who are highly immunocompromised, intact bacterial minicell therapy (also referred to as "EnGeneIC Dream Vector™" or EDV™) results in: (1) activation and proliferation of CD8+ T cells, Macrophages, NK cells, Dendritic cells, and iNKT cells. This result is exactly what is desired in the CoV-2 therapeutic/vaccine.

According to one aspect, the present disclosure provides for use of recombinant, intact bacterial minicells in the preparation of a composition, the minicells comprising a plasmid encoding viral proteins for use in a method of treating and/or preventing a disease by administration of the composition to a virally infected person, or a person at risk of viral infection. The disease treated in this context is a SARS-CoV-2 viral or variant infection.

The major areas being currently explored for the treatment/vaccines against SARS-CoV2 include: (1) antiviral drugs (e.g. Gilead Sciences; nucleotide analogue Remdesivir); (2) Cocktail monoclonal antibodies (e.g. Regeneron); and (3) Attenuated viruses as vaccines to stimulate a potent antibody response to the viral proteins. Each of these strategies face difficulties but most importantly, none of these approaches is able to solve the problem of lymphopenia in the elderly and immune-compromised patients to be able to overcome the viral infection. In the absence of a robust immune system, this population of patients will still be most vulnerable and likely to succumb to the disease.

In prior EnGeneIC disclosures, the use of plasmid-packaged minicells in the treatment of neoplastic diseases has been demonstrated, where the primary function of the plasmid was to encode siRNAs or miRNAs to silence genes in cancer cells that were responsible for cell proliferation or drug resistance.

In the present disclosure, the function of the plasmid-packaged minicell component of the full composition (which includes a CD1d-recognized antigen such as an α-GC-packaged minicell) has a novel function not shown or described before. Specifically, the plasmid is used to encode viral proteins in the parent bacterial cell and the proteins segregate into the minicell at the time of asymmetric cell division. These viral proteins are delivered into the lysosomes of antigen processing and presenting cells (APCs) such as macrophages and dendritic cells. Post-antigen processing, the viral protein epitopes are displayed on the APC surface via MHC Class I and Class II molecules, which is predicted to result in a potent antibody response to the viral proteins. Additionally, the plasmid itself being a double stranded nucleic acid is recognized by nucleic acid sensing proteins in the APC and this then triggers the secretion of Type I interferons (IFNα and IFNβ).

This unique dual trigger of antibody response to viral proteins and Type I interferon response results in not only mopping up viral particles released from infected cells but also results in cells of the immune system being able to recognize virally infected cells and kill them. This dual trigger has not been described before, particularly the ability of Type I interferon to trigger a heretofore uncharacterized mechanism by which virally infected cells can be recognized and killed.

In the present disclosure, post-presentation of α-GC/CD1d to the iNKT cell receptor, the trigger of IFNγ is the key to augmenting anti-viral immunity. The exact mechanism of action is unknown, but IFNγ is critical in identifying and destroying virally infected cells. Additionally, it has never been reported that IFNγ augments serum IgG antibody response to any antigen. The present invention is the first to demonstrate this phenomenon. This discovery is clearly seen in FIGS. 6B to 6D and FIGS. 7A to 7D where the EDV composition carrying the plasmid and Spike protein did not elicit high levels of IgG antibodies to the Spike protein. In contrast, the EDV composition carrying the same COVID plasmid and Spike protein and additionally also carried αGC provided a highly significant rise in IgG antibody titers to the Spike protein. The only function of αGC is to rapidly trigger the secretion of IFNγ which then stimulates a plethora of anti-viral immune responses. This is the first discovery showing that one or more of the effects of IFNγ is to augment anti-viral serum IgG antibody titers.

In the United States, several clinical trials have been conducted where anticancer-agent loaded intact, bacterially derived minicells, and microRNA mimic loaded intact, bacterially derived minicells, have been administered to humans in methods of treating cancer. See, e.g., ClinicalTrials.gov Identifier Nos. NCT02766699, NCT02687386, and NCT02369198. In addition, in Australia a bacterial minicell loaded with α-GC is being administered to patients in a Phase IIa clinical trial in end-stage cancer patients. The results have shown that intact, bacterially derived minicells loaded with α-GC are a potent stimulator of IFN-γ. See Trial ID No. ACTRN12619000385145. Thus, in vivo efficacy in humans of intact, bacterially derived minicells loaded with a CD1d-recognized antigen has been shown, and additionally efficacy in humans of intact, bacterially derived minicells loaded with a target compound (e.g., an anticancer compound instead of a viral antigen) has been shown.

Additionally, the disclosed composition has another critical function that allows elderly and immune-compromised patients to recover from lymphopenia (rapid depletion of lymphocytes including macrophages, dendritic cells, NK cells and CD8+ T cells), which is the main reason viruses like SARS-CoV-2 takes over in these patients and they end up with Respiratory distress syndrome and eventual death.

Specifically, the minicells of the composition themselves activate the macrophages via recognition of pathogen associated molecular patterns (PAMPs) like LPS. This provides the activation, maturation and proliferation signals to the resting monocytes in the bone marrow resulting in a significant increase in activated macrophages and dendritic cells. Additionally, the minicell-associated PAMPs also activate NK cells and these are also provoked into proliferation. Further still, the activated macrophages and dendritic cells home into the infected area and engulf the apoptotic virally infected cells. They then migrate into the draining lymph nodes and activate the naïve CD8+ T cells which then get activated and proliferate.

Therefore, the minicell component of the composition, by virtue of the PAMP signals is able to overcome the lymphopenia in these elderly and immune-compromised patients and the activation of these lymphocytes helps to overcome the viral infection and prevent the patient from tipping over into respiratory distress and death.

A. Background Regarding SARS-CoV-2 Variants

Infection and inoculation both elicit an immune response against Covid-19 that lasts for months and possibly years, a growing body of research shows, but the power of vaccines against known variants make the shots critical to containing the virus. Variants including the Delta strain that is now dominant in the U.S. can partially evade the immune response from prior infection and vaccination, recent research shows. Full vaccination still appears to offer solid protection against them. The combination of immunity from infection and vaccination will likely serve as a buffer as the Delta variant takes hold in the U.S., epidemiologists say. But there is still opportunity for the virus to spread. *Wall Street Journal*, "COVID-19 Immune Response Could be Long Lasting, but Variants Present Risks" (Jul. 16, 2021).

A US government SARS-CoV-2 Interagency Group (SIG) interagency group developed a Variant Classification scheme that defines three classes of SARS-CoV-2 variants: (1) SARS-CoV-2 Variant of Interest; (2) SARS-CoV-2 Variant of Concern; and (3) SARS-CoV-2 Variant of High Consequence A SARS-CoV-2 "variant of interest" is defined by the CDC as a variant with specific genetic markers that have been associated with changes to receptor binding, reduced neutralization by antibodies generated against previous infection or vaccination, reduced efficacy of treatments, potential diagnostic impact, or predicted increase in transmissibility or disease severity.

Possible attributes of a VOI include, for example, specific genetic markers that are predicted to affect transmission, diagnostics, therapeutics, or immune escape, and/or evidence that it is the cause of an increased proportion of cases or unique outbreak clusters.

SARS-CoV-2 Variants of Interest (VOI) include B.1.427 (Pango lineage), which has Spike Protein Substitutions: L452R, D614G, and has been named "Epsilon." It was first identified in the United States (California). Notable attributes include about 20% increased transmission and a modest decrease in susceptibility to the combination of bamlanivimab and etesevimab; however, the clinical implications of this decrease are not known. Alternative monoclonal antibody treatments are available, and the variant exhibits reduced neutralization by convalescent and post-vaccination sera. This variant was deescalated from a VOC on Jun. 29, 2021, due to the significant decrease in the proportion of B.1.427 lineage viruses circulating nationally and available data indicating that vaccines and treatments are effective against this variant.

A second SARS-CoV-2 VOI is B.1.429 (Pango lineage), which has Spike Protein Substitutions: S13I, W152C, L452R, D614G, and has been named "Epsilon". Notable attributes include about 20% increased transmission and reduced susceptibility to the combination of bamlanivimab and etesevimab; however, the clinical implications of this decrease are not known. Alternative monoclonal antibody treatments are available, and the variant exhibits reduced neutralization by convalescent and post-vaccination sera. This variant was deescalated from a VOC on Jun. 29, 2021, due to the significant decrease in the proportion of B.1.429 lineage viruses circulating nationally and available data indicating that vaccines and treatments are effective against this variant.

A third SARS-CoV-2 VOI is B.1.525 (Pango lineage), which has Spike Protein Substitutions: A67V, 69del, 70del, 144del, E484K, D614G, Q677H, F888L, designed "Eta." The variant was first identified in the United Kingdom/Nigeria—December 2020. Notable attributes include a potential reduction in neutralization by some Emergency Use Authorization (EUA) monoclonal antibody treatments, and a potential reduction in neutralization by convalescent and post-vaccination sera.

A fourth SARS-CoV-2 VOI is B.1.526 (Pango lineage), which has Spike Protein Substitutions: L5F, (D80G*), T95I, (Y144-*), (F157S*), D253G, (L452R*), (S477N*), E484K, D614G, A701V, (T859N*), (D950H*), (Q957R*), and is named "Iota." The variant was first identified in the United States (New York)—November 2020. Notable attributes include reduced susceptibility to the combination of bamlanivimab and etesevimab monoclonal antibody treatment; however, the clinical implications of this are not known. Alternative monoclonal antibody treatments are available, and the variant exhibits reduced neutralization by convalescent and post-vaccination sera. B.1.526.1 sublineage has been consolidated with this parent lineage.

A fifth SARS-CoV-2 VOI is B.1.617.1 (Pango lineage), which has Spike Protein Substitutions: (T95I), G142D, E154K, L452R, E484Q, D614G, P681R, Q1071H, and is named "Kappa." The variant was first identified in India—December 2020. Notable attributes include potential reduction in neutralization by some EUA monoclonal antibody treatments, and potential reduction in neutralization by post-vaccination sera.

A sixth SARS-CoV-2 VOI is B.1.617.3 (Pango lineage), which has Spike Protein Substitutions: T19R, G142D, L452R, E484Q, D614G, P681R, D950N, and is named "20A." The variant was first identified in India—October 2020. Notable attributes include potential reduction in neutralization by some EUA monoclonal antibody treatments, and potential reduction in neutralization by post-vaccination sera.

A SARS-CoV-2 "Variant of Concern" (VOC) is defined by the CDC as a variant for which there is evidence of an increase in transmissibility, more severe disease (e.g., increased hospitalizations or deaths), significant reduction in neutralization by antibodies generated during previous infection or vaccination, reduced effectiveness of treatments or vaccines, or diagnostic detection failures.

Possible attributes of a VOC include, in addition to the possible attributes of a VOI, (a) Evidence of impact on diagnostics, treatments, or vaccines; (b) Widespread interference with diagnostic test targets; (c) Evidence of substantially decreased susceptibility to one or more class of therapies; (d) Evidence of significant decreased neutralization by antibodies generated during previous infection or vaccination; (e) Evidence of reduced vaccine-induced protection from severe disease; (f) Evidence of increased transmissibility; and (g) Evidence of increased disease severity.

A first VOC is B.1.1.7 (Pango lineage), which has Spike Protein Substitutions: 69del, 70del, 144del, (E484K*), (S494P*), N501Y, A570D, D614G, P681H, T716I, S982A, D1118H (K1191N*), and is named "Alpha." The variant was first identified in the United Kingdom, and notable attributes include (1) ~50% increased transmission, (2) potential increased severity based on hospitalizations and case fatality rates, (3) no impact on susceptibility to EUA monoclonal antibody treatments, and (4) minimal impact on neutralization by convalescent and post-vaccination sera.

A second VOC is B.1.351 (Pango lineage), which has Spike Protein Substitutions: D80A, D215G, 241del, 242del, 243del, K417N, E484K, N501Y, D614G, A701V, and is named "Beta." The variant was first identified in South Africa, and notable attributes include (1) 50% increased transmission, (2) significantly reduced susceptibility to the combination of bamlanivimab and etesevimab monoclonal antibody treatment, but other EUA monoclonal antibody treatments are available, and (3) reduced neutralization by convalescent and post-vaccination sera.

A third VOC is B.1.617.2 (Pango lineage), which has Spike Protein Substitutions: T19R, (V70F*), T95I, G142D, E156-, F157-, R158G, (A222V*), (W258L*), (K417N*), L452R, T478K, D614G, P681R, D950N, and is named "Delta." The variant was first identified in India, and notable attributes include (1) increased transmissibility, (2) potential reduction in neutralization by some EUA monoclonal antibody treatments, and (3) potential reduction in neutralization by post-vaccination sera. AY.1, AY.2 and AY.3 are currently aggregated with B.1.617.2.

A third VOC is P.1 (Pango lineage), which has Spike Protein Substitutions: L18F, T20N, P26S, D138Y, R190S, K417T, E484K, N501Y, D614G, H655Y, T1027I, and is named "Gamma." The variant was first identified in Japan/Brazil, and notable attributes include (1) significantly reduced susceptibility to the combination of bamlanivimab and etesevimab monoclonal antibody treatment, but other EUA monoclonal antibody treatments are available, and (2) reduced neutralization by convalescent and post-vaccination sera.

Finally, a SARS-CoV-2 "variant of high consequence" (VHC) is defined by the CDC as a variant that has clear evidence that prevention measures or medical countermeasures (MCMs) have significantly reduced effectiveness relative to previously circulating variants. Possible attributes of a VHC include, in addition to the possible attributes of a VOC, include the following impact on Medical Countermeasures (MCM), (1) demonstrated failure of diagnostics, (2) evidence to suggest a significantly reduction in vaccine effectiveness, a disproportionately high number of vaccine breakthrough cases, or very low vaccine-induced protection against severe disease, (3) significantly reduced susceptibility to multiple Emergency Use Authorization (EUA) or approved therapeutics, and (4) more severe clinical disease and increased hospitalizations. A VHC would require notification to WHO under the International Health Regulations, reporting to CDC, an announcement of strategies to prevent or contain transmission, and recommendations to update treatments and vaccines. Currently, there are no SARS-CoV-2 variants that rise to the level of high consequence.

As of Jun. 28, 2021, it has been reported that there are four notable SARS-CoV-2 variants in the US. B.1.1.7 (Alpha), B.1.351 (Beta), P.1 (Gamma), and B.1.617.2 (Delta). "About Variants of the Virus that Causes COVID-19", www.cdc.ov/coronavirus/2019-ncov/variants/variant.html (Jun. 28, 2021).

B.1.1.7 (Alpha) variant was first detected in the United States in December 2020. It was initially detected in the United Kingdom. Alpha. (B.1.1.7) COVID-19 variant appears to spread more easily, with about a 50% increase in transmission as compared to previous circulating variants. This variant also might have an increased risk of hospitalization and death. www.mayoclinic.org/diseases-conditions/coronavirus/expert-answers/covid-variant/faq-20505779 (accessed on Jul. 16, 2021).

B.1.351 (Beta) variant was first detected in the United States at the end of January 2021. It was initially detected in South Africa in December 2020. Beta (B.1.351) variant appears to spread more easily, with about a 50% increase in transmission as compared to previous circulating variants. It also reduces the effectiveness of some monoclonal antibody medications and the antibodies generated by a previous COVID-19 infection or COVID-19 vaccine. www.mayoclinic.org/diseases-conditions/coronavirus/expert-answers/covid-variant/faq-20505779 (accessed on Jul. 16, 2021).

P.1 (Gamma) variant was first detected in the United States in January 2021. P.1 was initially identified in travellers from Brazil, who were tested during routine screening at an airport in Japan, in early January. Gamma (P.1) variant reduces the effectiveness of some monoclonal antibody medications and the antibodies generated by a previous COVID-19 infection or a COVID-19 vaccine. www.mayoclinic.org/diseases-conditions/coronavirus/expert-answers/covid-variant/faq-20505779 (accessed on Jul. 16, 2021).

Finally, B.1.617.2 (Delta) variant was first detected in the United States in March 2021. It was initially identified in India in December 2020. Based on current data, variant B.1.1.7 (Delta) is the most common variant across the US. Id. B.1.1.7 (Delta) variant potentially spreads more easily than other variants. Research has shown that it spreads easily in indoor sports settings and households. This variant also might reduce the effectiveness of some monoclonal antibody treatments and the antibodies generated by a COVID-19 vaccine. www.mayoclinic.org/diseases-conditions/coronavirus/expert-answers/covid-variant/faq-20505779 (accessed on Jul. 16, 2021).

These variants seem to spread more easily and quickly than other variants, which may lead to more cases of COVID-19. Id. An increase in the number of cases will put more strain on healthcare resources, lead to more hospitalizations, and potentially more deaths. "About Variants of the Virus that Causes COVID-19", www.cdc.gov/coronavirus/2019-ncov/variants/variant.html (Jun. 28, 2021).

Different variants have emerged in Brazil, California and other areas. A variant called B.1.351, which first appeared in South Africa, may have the ability to re-infect people who have recovered from earlier versions of the coronavirus. It might also be somewhat resistant to some of the coronavirus vaccines in development. Still, other vaccines currently being tested appear to offer protection from severe disease in people infected with B.1.351. www.hopkinsmedicine.org/health/conditions-and-diseases/coronavirus/a-new-strain-of-coronavirus-what-you-should-know (accessed on Jul. 16, 2021).

Patients infected with SARS-CoV or MERS-CoV initially present with mild, influenza-like illnesses with fever, dyspnea, and cough. Most patients recover from this illness. However, the most vulnerable populations are patients over the age of 65 and patients with comorbidities that result in immune-suppression such as cancer, HIV, etc., where the disease progresses to more severe symptoms and is characterized by an atypical interstitial pneumonia and diffuse alveolar damage. Both SARS-CoV and MERS-CoV are capable of causing acute respiratory distress syndrome (ARDS), the most severe form of acute lung injury where alveolar inflammation, pneumonia, and hypoxic lung conditions lead to respiratory failure, multiple organ disease, and death in 50% of ARDS patients. As the disease progresses, lymphopenia is commonly observed. Most of the deaths that occur from CoV-2 infection are a result of the severe lymphopenia in immune-compromised patients and the disease takes over resulting in ARDS.

Coronavirus (SARS-CoV-2; COVID-19) causes atypical pneumonia in infected people and the symptoms include fever, dry cough, and fatigue. Most patients have lymphopenia (drop in white blood cell counts particularly T cells, B cells and NK cells). Current observations indicate that the patients most likely to die from this disease are those that are immune-compromised (elderly and those with immunosuppressive disease, such as cancer) and patients with diabetes and other underlying health conditions, such as high blood pressure, heart disease, and respiratory disorders. The former group of patients most likely succumb due to the lymphopenia and hence the viral replication and infection of both lungs becomes uncontrolled resulting in Acute Respiratory Distress Syndrome (ARDS).

The viral proliferation takes over once the major cells of the immune system e.g. T cells, B cells, macrophages and NK cells are depleted. In elderly patients, immune function is not as robust as it is in younger people. Studies have shown that in most people, their immune function is fine in their 60s, or even in their 70s. The immune functions go down rather quickly after age 75 or 80.

COVID-19 spreads rapidly by human-to-human transmission with a median incubation period of 3.0 days (range, 0 to 24.0) and the time from symptom onset to developing pneumonia is 4.0 days (range, 2.0 to 7.0) (Guan et al., 2020). Fever, dry cough, and fatigue are common symptoms at onset of COVID-19 (Huang et al., 2020). Most patients have lymphopenia and bilateral ground-glass opacity changes on chest CT scans (Huang et al., 2020; Duan and Qin, 2020). No specific antiviral treatments or vaccines are available. Development of SARS-CoV-2-based vaccines is urgently required.

The entire virus particle-based preparation of vaccines, including inactivated and attenuated virus vaccines is thought to be advisable, because it is based on previous studies about the prevention and control of seasonal influenza vaccines (Grohskopf et al., 2018). The genomic sequence of the first SARS-CoV-2 (Wuhan-Hu-1) has been completed (Genbank Accession no. MN908947.3; Wu et al., 2020). Large-scale culture of SARS-CoV-2 has been carried out and an inactivated virus vaccine has been prepared through the employment of established physical and chemical methods such as UV light, formaldehyde, and β-propiolactone (Jiang et al., 2005). The development of attenuated-virus vaccines is also possible by screening the serially propagated SARS-CoV-2 with reduced pathogenesis such as induced minimal lung injury, diminished limited neutrophil influx, and increased anti-inflammatory cytokine expressions compared with the wild-type virus (Regla-Nava et al., 2015). Both inactivated and attenuated virus vaccines have their own disadvantages and side effects (Table 1; reproduced from Shang et al., 2020).

TABLE 1

Advantages and disadvantages of different vaccine strategies.

| Vaccine strategy | Advantages | Disadvantages | References |
|---|---|---|---|
| Inactivated virus vaccines | Easy to prepare; safety; high-titer neutralizing antibodies | Potential inappropriate for highly immunosuppressed individuals | 25 |
| Attenuated virus vaccines | Rapid development; induce high immune responses | Phenotypic or genotypic reversion possible; can still cause some disease | 25 |
| Subunit vaccines | High safety; consistent production; can induce cellular and humoral immune responses; high-titer neutralizing antibodies | High cost; lower immunogenicity; require repeated doses and adjuvants | 12, 14 |
| Viral vector vaccines | Safety; induces high cellular and humoral immune responses | Possible present pre-existing immunity | 12 |
| DNA vaccines | Easier to design; high safety; high-titer neuralizing antibodies | Lower immune responses in humans; repeated doses may cause toxicity | 23 |
| mRNA vaccines | Easier to design; high degree of adaptability; induce strong immune responses | Highly unstable under physiological conditions | 23 |

All new therapies under development are (i) anti-viral drugs to stem the proliferation of the virus systemically or (ii) attenuated viruses as vaccines to stimulate a potent antibody response to the viral proteins.

None of these therapies are likely to stall the death of immune-compromised patients who get infected just as is currently seen in the case of influenza virus infected patients. Each year the largest number of deaths from flu infections occurs in immune-compromised patients and the elderly.

Effective immunotherapy strategies for the treatment of diseases such as cancer depend on the activation of both innate and adaptive immune responses. Cells of the innate immune system interact with pathogens via conserved pattern-recognition receptors, whereas cells of the adaptive immune system recognize pathogens through diverse, antigen-specific receptors that are generated by somatic DNA rearrangement. Invariant natural killer T (iNKT) cells are a subset of lymphocytes (Type I NKT) that bridge the innate and adaptive immune systems. iNKT cells express an invariant α chain T cell receptor (Vα24-Jα18 in humans and Vα14-Jα18 in mice) that is specifically activated by certain glycolipids presented in the context of the non-polymorphic MHC class I-like protein, CD1d. CD1d binds to a variety of dialkyl lipids and glycolipids, such as the glycosphingolipid α-galactosylceramide (d-GalCer). iNKT cell TCR recognition of the CD1d-lipid complex results in the release of pro-inflammatory and regulatory cytokines, including the Th1 cytokine interferon gamma (IFN). The release of cytokines in turn activates adaptive cells, such as T and B cells, and innate cells, such as dendritic cells and NK cells.

α-GalCer, also known as KRN7000, chemical formula $C_{50}H_{99}NO_9$, is a synthetic glycolipid derived from structure-activity relationship studies of galactosylceramides isolated from the marine sponge *Agelas mauritianus*. α-GalCer is a strong immunostimulant and shows potent anti-tumor activity in many in vivo models. A major challenge to using α-GalCer for immunotherapy is that it induces anergy in iNKT cells because it can be presented by other CD1d expressing cells, such as B cells, in the peripheral blood. Delivery of α-GalCer also has been shown to induce liver toxicity.

B. SARS-CoV-2

The coronaviral genome encodes four major structural proteins: the spike (S) protein, nucleocapsid (N) protein, membrane (M) protein, and the envelope (E) protein, all of which are required to produce a structurally complete viral particle. Some CoVs do not require the full ensemble of structural proteins to form a complete, infectious virion, suggesting that some structural proteins might be dispensable or that these CoVs might encode additional proteins with overlapping compensatory functions. Individually, each protein primarily plays a role in the structure of the virus particle, but they are also involved in other aspects of the replication cycle. The S protein mediates attachment of the virus to the host cell surface receptors and subsequent fusion between the viral and host cell membranes to facilitate viral entry into the host cell. In some CoVs, the expression of S at the cell membrane can also mediate cell-cell fusion between infected and adjacent, uninfected cells. This formation of giant, multinucleated cells, or syncytia, has been proposed as a strategy to allow direct spreading of the virus between cells, subverting virus-neutralising antibodies.

It has been shown that the SARS-CoV-2 spike (S) glycoprotein binds to the cell membrane protein angiotensin-converting enzyme 2 (ACE2) to enter human cells. COVID-19 has been shown to bind to ACE2 via the S protein on its surface. During infection, the S protein is cleaved into subunits, S1 and S2. S1 contains the receptor binding domain (RBD) which allows coronaviruses to directly bind to the peptidase domain (PD) of ACE2. S2 then likely plays a role in membrane fusion.

Unlike the other major structural proteins, N is the only protein that functions primarily to bind to the CoV RNA genome, making up the nucleocapsid. Although N is largely involved in processes relating to the viral genome, it is also involved in other aspects of the CoV replication cycle and the host cellular response to viral infection. Transient expression of N was shown to substantially increase the production of virus-like particles (VLPs) in some CoVs, suggesting that it might not be required for envelope formation, but for complete virion formation instead.

The M protein is the most abundant structural protein and defines the shape of the viral envelope. It is also regarded as the central organiser of CoV assembly, interacting with all other major coronaviral structural proteins. Homotypic interactions between the M proteins are the major driving force behind virion envelope formation but, alone, is not sufficient for virion formation. Binding of M to N stabilises the nucleocapsid (N protein-RNA complex), as well as the internal core of virions, and, ultimately, promotes completion of viral assembly. Together, M and E make up the viral envelope and their interaction is sufficient for the production and release of VLPs.

The CoV envelope (E) protein is the smallest of the major structural proteins. It is an integral membrane protein involved in several aspects of the virus' life cycle, such as assembly, budding, envelope formation, and pathogenesis. During the replication cycle, E is abundantly expressed inside the infected cell, but only a small portion is incorporated into the virion envelope. The majority of the protein is localised at the site of intracellular trafficking, where it participates in CoV assembly and budding. Recombinant CoVs lacking E exhibit significantly reduced viral titres, crippled viral maturation, or yield propagation incompetent progeny, demonstrating the importance of E in virus production and maturation.

Coronaviruses are viruses whose genome is a single-stranded mRNA, complete with a 3'-UTR and poly-A tail. In a subset of coronaviruses that include 2019-nCoV, SARS and MERS, the 3'-UTR contains a highly-conserved sequence (in an otherwise rather variable message) that folds into a unique structure, called the s2m (stem two motif). Although the s2m appears to be extremely conserved in sequence, and is required for virus viability, its exact function is not known. The 2019 Wuhan Novel Coronavirus (COVID-19, formerly 2019-nCoV) possesses almost exactly the same s2m sequence (and therefore structure) as SARS.

SARS-CoV-2 genome sequences are being released and have been published on https://www.ncbi.nlm.nih.gov/genbank/sars-cov-2-seqs/ (downloaded on Mar. 24, 2020), including the multiple complete nucleotide sequences from viruses around the world, as well as sequences of particular viral genes, such as the S gene, N gene, M gene, etc. Examples include GenBank accession numbers MN908947.3, MN975262.1, NC_045512.2, MN997409.1, MN985325.1, MN988669.1, MN988668.1, MN994468.1, MN994467.1, MN988713.1, and MN938384.1. SARS-CoV-2, is an enveloped, single- and positive-stranded RNA virus with a genome comprising 29,891 nucleotides, which encode the 12 putative open reading frames responsible for the synthesis of viral structural and nonstructural proteins (Wu et al., 2020; Chen et al., 2020). A mature SARS-CoV-2 has four structural proteins, namely, envelope, membrane, nucleocapsid, and spike (Chen et al., 2020). All of these proteins may serve as antigens to stimulate neutralizing antibodies and increase CD4+/CD8+ T-cell responses (Jiang et al., 2015). However, subunit vaccines require multiple booster shots and suitable adjuvants to work, and certain subunit vaccines such as hepatitis B surface antigen, PreS1, and PreS2 may fail to yield protective response when tested clinically. The DNA and mRNA vaccines that are easier to design and proceed into clinical trials very quickly remain experimental. The viral vector-based vaccines could also be quickly constructed and used without an adjuvant. However, development of such vaccines might not start until antigens containing the neutralizing epitopes are identified. The E and M proteins have important functions in the viral assembly of a coronavirus, and the N protein is necessary for viral RNA synthesis. Deletion of E protein abrogated the virulence of CoVs, and several studies have explored the potential of recombinant SARS-CoV or MERS-CoV with a mutated E protein as live attenuated vaccines. The M protein can augment the immune response induced by N protein DNA vaccine against SARS-CoV; however, the conserved N protein across CoV families implies that it is not a suitable candidate for vaccine development, and the antibodies against the N protein of SARS-CoV-2 do not provide immunity to the infection. The critical glycoprotein S of SARS-CoV-2 is responsible for virus binding and entry. The S precursor protein of SARS-CoV-2 can be proteolytically cleaved into S1 (685 aa) and S2 (588 aa) subunits. The S2 protein is well conserved among SARS-CoV-2 viruses and shares 99% identity with that of bat SARS-CoVs. The vaccine design based on the S2 protein may boost the broad-spectrum antiviral effect and is worth testing in animal models. Antibodies against the conserved stem region of influenza hemagglutinin have been found to exhibit broadly cross-reactive immunity, but are less potent in neutralizing influenza A virus. In contrast, the S1 subunit consists of the receptor-binding domain (RBD), which mediates virus entry into sensitive cells through the host angiotensin-converting enzyme 2 (ACE2) receptor. The S1 protein of 2019-nCoV shares about 70% identity with that of human SARS-CoVs. The highest number of variations of amino acids in the RBD is located in the external subdomain, which is responsible for the direct interaction between virus and host receptor.

C. Overview of how the Disclosed Compositions Function to Treat and/or Vaccinate Against Viral Infections The present invention aims to intervene pre-infection, or at an early stage post-infection, with a virus, such as a coronavirus such as SARS-CoV or MERS-CoV. The compositions and methods address issues including (i) overcoming lymphopenia to prevent the viral infection/disease from overtaking a patient's own immune defenses, (ii) stimulating a high titer of systemic antibodies to proteins exposed on the surface of the virus to rapidly mop up viral particles released from infected cells and thereby limit the infection of other healthy cells, (iii) stimulating a potent Type I and Type II interferon response, which is well known to rapidly combat a range of different viral infections through a plethora of effects such as specific stimulation of antiviral immunity and virally infected cell elimination, and (iv) elicits a virus specific CD8+ T cell response which rapidly identifies and kills virus infected cells.

To address these and other needs, the present invention provides, in accordance with one aspect, a composition comprising a combination of (i) a vector, which can be intact bacterial-derived minicells which are optionally recombinant, packaged with a plasmid encoding viral proteins which function to stimulate an antibody response to the viral proteins and stimulate Type I interferons; (ii) a vector, which can be intact bacterially-derived minicells which are optionally recombinant, packaged with a CD1d-recognized antigen, and (iii) at least one pharmaceutically acceptable carrier. The vector packaged with a CD1d-recognized antigen, such as α-GalCer, functions to stimulate Type II interferon. The minicell vector itself functions to stimulate the activation, maturation and proliferation of cells of the immune system. In another aspect, the intact bacterially-derived minicells can also be replaced with killed bacterial cells.

Thus, described herein, in certain embodiments, are compositions comprising an immunogenically effective amount of a combination of (a) a vector or intact, bacterially derived minicells or killed bacterial cells that encapsulate one or more viral antigens and a plasmid and (b) a vector or intact, bacterially derived minicells or killed bacterial cells that encapsulate a CD1d-recognized antigen, such as α-galactosylceramide (α-GalCer). In some embodiments, the encapsulated CD1d-recognized antigen is capable of uptake by a phagocytic cell, such as a dendritic cell or a macrophage. Following uptake, the CD1d-recognized cell antigen form complexes with CD1d within the lysosomes of the phagocytic cells and is subsequently transported to the surface of the phagocytic cells where the CD1d-recognized antigen bound to CD1d is presented for recognition by an iNKT cell. In some embodiments, the CD1d-recognized cell antigen induces a Th1 cytokine response particularly IFNγ by an iNKT cell that recognizes the CD1d-recognized cell antigen bound to CD1d on the surface of the phagocytic cell. IFNγ is also known to trigger a potent antiviral immune response. The ability of CD1d-restricted NKT cells to activate innate and adaptive immune responses has led to the idea that these cells can modulate immunity to infectious agents. In addition, CD1d-restricted iNKT cells may directly contribute to host resistance as they express a variety of effector molecules that could mediate an antimicrobial effect. The CD1 proteins are antigen-presenting molecules that present lipid antigens to T cells.

In one aspect, the intent of administering a composition described herein to a subject in need would be to rapidly lift the subject out of lymphopenia and simultaneously activate the key cells of the immune system to fight against the virus infection, particularly in elderly and immune-compromised patients. This would prevent exacerbation of the viral infection and resultant death of these patients. Consequently, infected subjects would suffer milder flu-like symptoms and recover more rapidly as the body's own immune system tips the balance over to recovery.

In one aspect of the disclosure, all four SARS-CoV-2 structural protein (Envelope, Membrane, Nucleocapsid and Spike) encoding genes are cloned in a plasmid that carries a bacterial origin of replication and the genes are transcribed using a bacterial gene expression promoter so that the proteins are only expressed in the EDV™-producing bacterial cell and segregated into the EDV™ cytoplasm. Thus, all four of the SARS-CoV-2 proteins can be expressed from a single bacterial expression promoter. Alternatively, the genes can be transcribed under a mammalian gene expression promoter so the proteins are expressed only by mammalian cells. The recombinant plasmid can be transformed into a minicell producing strain of *Salmonella typhimurium*. Such a recombinant intact, bacterially derived minicell therapeutic is expected to elicit a potent antibody response to all four CoV-2 proteins.

Additionally, when the recombinant intact, bacterially derived minicells are administered systemically in a CoV-2 virus infected patient, the intact, bacterially derived minicells are rapidly taken up by professional phagocytic cells such as macrophages and dendritic cells and the intact, bacterially derived minicells are broken down in the lysosomes releasing the plasmid DNA. This DNA is then recognized by intracellular DNA sensors like cGAS, AIM2, IFI16 and others and this will trigger a Type I interferon (IFNα and IFNβ) response. These interferons are known to be potent inducers of antiviral defence.

It is well recognized that early in infection, IFN stimulation results in altered cellular transcriptional programs, leading to an antiviral state characterized by the activation of a large set of host genes with partially defined antiviral functions (Schoggins et al., 2011).

In some embodiments, the CD1d-recognized antigen is a glycosphingolipid. In some embodiments, the glycosphingolipid is selected from among α-galactosylceramide (α-GalCer), C-glycosidific form of α-galactosylceramide (α-C-GalCer), 12 carbon acyl form of galactosylceramide (β-GalCer), β-D-glucopyranosylceramide (β-GlcCer), 1,2-Diacyl-3-O-galactosyl-sn-glycerol (BbGL-II), diacylglycerol containing glycolipids (Glc-DAG-s2), ganglioside (GD3), gangliotriaosylceramide (Gg3Cer), glycosylphosphatidylinositol (GPI), α-glucuronosylceramide (GSL-1 or GSL-4), isoglobotrihexosylceramide (iGb3), lipophosphoglycan (LPG), lyosphosphatidylcholine (LPC), α-galactosylceramide analog (OCH), threitolceramide, and a derivative of any thereof. In some embodiments, the glycosphingolipid is α-GalCer. In some embodiments, the glycosphingolipid is a synthetic α-GalCer analogue. In some embodiments, the synthetic α-GalCer analogue is selected from among 6'-deoxy-6'-acetamide α-GalCer (PBS57), napthylurea α-GalCer (NU-α-GC), NC-α-GalCer, 4ClPhC-α-GalCer, PyrC-α-GalCer, α-carba-GalCer, carba-α-D-galactose α-GalCer analogue (RCAI-56), 1-deoxy-neo-inositol α-GalCer analogue (RCAI-59), 1-O-methylated α-GalCer analogue (RCAI-92), and HS44 aminocyclitol ceramide. In some embodiments, the CD1d-recognized antigen is derived from a bacterial antigen, a fungal antigen, or a protozoan antigen.

In some embodiments, the immune response produced in the target cells comprises the production of Type I interferon, including interferon-α and/or interferon-β.

This bacterial minicell treatment should reduce the severity of the disease in almost all patients and reduce the duration of the disease making it more like just a common cold.

Alternatively, the treatment may be administered in a healthy person as a vaccine to protect against the viral infection where the virus carries the proteins encoded by the recombinant plasmid carried in the minicell.

In one embodiment, the adjuvant composition comprises (a) an immunogenically effective amount of an encapsulated CD1d-recognized antigen and (b) a minicell carrying a recombinant plasmid encoding one or more viral antigens.

In one embodiment, the CD1d-recognized antigen and the recombinant plasmid are packaged within two intact bacterially derived minicells or killed bacterial cells.

The CD1d-recognized antigen is comprised within a first intact bacterially-derived minicell or killed bacterial cell, and the recombinant plasmid encoding viral antigens is comprised within a second intact bacterially-derived minicell or killed bacterial cell.

In some embodiments, the encapsulated CD1d-recognized antigen (e.g., α-GalCer) and the minicell carrying the recombinant plasmid encoding at least one viral antigen are administered simultaneously. In some embodiments, the encapsulated CD1d-recognized antigen (e.g., α-GalCer) and the minicell carrying the recombinant plasmid encoding viral antigens are administered sequentially. In some embodiments, the encapsulated CD1d-recognized antigen (e.g., α-GalCer) and the minicell carrying the recombinant plasmid encoding viral antigens are administered multiple times. In some embodiments, the encapsulated CD1d-recognized antigen (e.g., α-GalCer) and the minicell carrying the recombinant plasmid encoding viral antigens are administered at least once a week or twice a week or three times per week or four times per week until the disease is resolved.

Following infection with SARS-CoV-2, the aim of this therapy would be to achieve the following: (1) stimulate innate and adaptive immunity via recruitment of fresh monocytes and dendritic cells from the bone marrow and activation of NK cells. This would keep the immune status high in the patients as the disease progresses and prevent the development of lymphopenia. (2) Physiologically well tolerated secretion of Type I (IFNα and IFNβ) and Type II (IFNγ) interferons. It is well recognized that early in viral infection, IFN stimulation results in altered cellular transcriptional programs, leading to an antiviral state characterized by the activation of a large set of host genes with partially defined antiviral functions. This activation would enable rapid elimination of virally infected cells along with a reduction in viral replication. (3) Secrete antibodies to the four structural proteins of the virus (Envelope, Membrane, Spike and Nucleocapsid) and this would aim to mop up a significant number of viral particles that are released from infected cells. All of the above would be expected with minimal to no toxicity.

III. Intact Bacterially-Derived Minicells

The term "minicell" is used herein to denote a derivative of a bacterial cell that lacks chromosomes ("chromosome-free") and is engendered by a disturbance in the coordination, during binary fission, of cell division with DNA segregation. Minicells are distinct from other small vesicles, such as so-called "membrane blebs" (about 0.2 μm or less in size), which are generated and released spontaneously in certain situations but which are not due to specific genetic rearrangements or episomal gene expression. Bacterially derived minicells employed in this disclosure are fully intact and are distinguished from other chromosome-free forms of bacterial cellular derivatives characterized by an outer or defining membrane that is disrupted or degraded, even removed. The intact membrane that characterizes the minicells of the present disclosure allows retention of the therapeutic payload within the minicell until the payload is released.

Intact, Bacterially-derived minicells or EDVs™ are anucleate, non-living nanoparticles produced as a result of inactivating the genes that control normal bacterial cell division, thereby de-repressing polar sites of cell. Moreover, in contrast to current stealth liposomal drug carriers like DOXIL (liposomal doxorubicin), for example, that can package only ~14,000 molecules per particle, or "armed antibodies," which can carry fewer than 5 drug molecules, bacterial minicells can readily accommodate payloads of up to 1 million drug molecules.

The minicells employed in the present disclosure can be prepared from bacterial cells, such as E. coli and S. typhymurium. Prokaryotic chromosomal replication is linked to normal binary fission, which involves mid-cell septum formation. In E. coli, for example, mutation of min genes, such as minCD, can remove the inhibition of septum formation at the cell poles during cell division, resulting in production of a normal daughter cell and an chromosome-less minicell.

In addition to min operon mutations, chromosome-less minicells also are generated following a range of other genetic rearrangements or mutations that affect septum formation, for example, in the divIVB1 in B. subtilis. Minicells also can be formed following a perturbation in the levels of gene expression of proteins involved in cell division/chromosome segregation. For instance, over-expression of minE leads to polar division and production of minicells. Similarly, chromosome-less minicells can result from defects in chromosome segregation, e.g., the smc mutation in Bacillus subtilis, the spoOJ deletion in B. subtilis, the mukB mutation in E. coli, and the parC mutation in E. coli. Further, CafA can enhance the rate of cell division and/or inhibit chromosome partitioning after replication, resulting in formation of chained cells and chromosome-less minicells.

Accordingly, minicells can be prepared for the present disclosure from any bacterial cell, be it of Gram-positive or Gram-negative origin due to the conserved nature of bacterial cell division in these bacteria. Furthermore, the minicells used in the disclosure should possess intact cell walls (i.e., are "intact minicells"), as noted above, and should be distinguished over and separated from other small vesicles, such as membrane blebs, which are not attributable to specific genetic rearrangements or episomal gene expression.

In a given embodiment, the parental (source) bacteria for the minicells can be Gram positive, or they can be Gram negative. In one aspect, the parental bacteria are one or more selected from Terra-/Glidobacteria (BV1), Proteobacteria (BV2), BV4 including Spirochaetes, Sphingobacteria, and Planctobacteria. Pursuant to another aspect, the bacteria are one or more selected from Firmicutes (BV3) such as Bacilli, Clostridia or Tenericutes/Mollicutes, or Actinobacteria (BV5) such as Actinomycetales or Bifidobacteriales.

Pursuant to the disclosure, killed bacterial cells are non-living prokaryotic cells of bacteria, cyanobateria, eubacteria and archaebacteria, as defined in the 2nd edition of *Bergey's Manual Of Systematic Biology*. Such cells are deemed to be "intact" if they possess an intact cell wall and/or cell membrane and contain genetic material (nucleic acid) that is endogenous to the bacterial species. Methods of preparing killed bacterial cells are described, for instance, in U.S. 2008/0038296.

In yet a further aspect, the bacteria are one or more selected from Eubacteria (Chloroflexi, Deinococcus-Thermus), Cyanobacteria, Thermodesulfobacteria, thermophiles (Aquificae, Thermotogae), Alpha, Beta, Gamma (Enterobacteriaceae), Delta or Epsilon Proteobacteria, Spirochaetes, Fibrobacteres, Chlorobi/Bacteroidetes, Chlamydiae/Verrucomicrobia, Planctomycetes, Acidobacteria, Chrysiogenetes, Deferribacteres, Fusobacteria, Gemmatimonadetes, Nitrospirae, Synergistetes, Dictyoglomi, Lentisphaerae Bacillales, Bacillaceae, Listeriaceae, Staphylococcaceae, Lactobacillales, Enterococcaceae, Lactobacillaceae, Leuconostocaceae, Streptococcaceae, Clostridiales, Halanaerobiales, Thermoanaerobacterales, Mycoplasmatales, Entomoplasmatales, Anaeroplasmatales, Acholeplasmatales, Haloplasmatales, Actinomycineae, Actinomycetaceae, Corynebacterineae, Nocardiaceae, Corynebacteriaceae, Frankineae, Frankiaceae, Micrococcineae, Brevibacteriaceae, and Bifidobacteriaceae.

For pharmaceutical use, a composition of the disclosure should comprise minicells or killed bacterial cells that are isolated as thoroughly as possible from immunogenic components and other toxic contaminants. Methodology for purifying bacterially derived minicells to remove free endotoxin and parent bacterial cells are described, for example, in WO 2004/113507. Briefly, the purification process achieves removal of (a) smaller vesicles, such as membrane blebs, which are generally smaller than 0.2 μm in size, (b) free endotoxins released from cell membranes, and (c) parental bacteria, whether live or dead, and their debris, which also are sources of free endotoxins. Such removal can be implemented with, inter alia, a 0.2 μm filter to remove smaller vesicles and cell debris, a 0.45 μm filter to remove parental cells following induction of the parental cells to form filaments, antibiotics to kill live bacterial cells, and antibodies against free endotoxins.

Underlying the purification procedure is a discovery by the present inventors that, despite the difference of their bacterial sources, all intact minicells are approximately 400 nm in size, i.e., larger than membrane blebs and other smaller vesicles and yet smaller than parental bacteria. Size determination for minicells can be accomplished by using solid-state, such as electron microscopy, or by liquid-based techniques, e.g., dynamic light scattering. The size value yielded by each such technique can have an error range, and the values can differ somewhat between techniques. Thus, the size of minicells in a dried state can be measured via electron microscopy as approximately 400 nm±50 nm. Dynamic light scattering can measure the same minicells to be approximately 500 nm±50 nm in size. Also, drug-packaged, ligand-targeted minicells can be measured, again using dynamic light scattering, to be approximately 400 nm to 600 nm±50 nm.

Another structural element of a killed bacterial cells or a minicell derived from Gram-negative bacteria is the O-polysaccharide component of lipopolysaccharide (LPS), which is embedded in the outer membrane via the lipid A anchor. The component is a chain of repeat carbohydrate-residue units, with as many as 70 to 100 repeat units of four to five sugars per repeat unit of the chain. Because these chains are not rigid, in a liquid environment, as in vivo, they can adopt a waving, flexible structure that gives the general appearance of seaweed in a coral sea environment; i.e., the chains move with the liquid while remaining anchored to the minicell membrane.

Influenced by the O-polysaccharide component, dynamic light scattering can provide a value for minicell size of about 500 nm to about 600 nm, as noted above. Nevertheless, minicells from Gram-negative and Gram-positive bacteria alike readily pass through a 0.45 μm filter, which substantiates an effective minicell size of 400 nm±50 nm. The above-mentioned scatter in sizes is encompassed by the present invention and, in particular, is denoted by the qualifier "approximately" in the phrase "approximately 400 nm in size" and the like.

In relation to toxic contaminants, a composition of the disclosure preferably comprises less than about 350 EU free endotoxin. Illustrative in this regard are levels of free endotoxin of about 250 EU or less, about 200 EU or less, about 150 EU or less, about 100 EU or less, about 90 EU or less, about 80 EU or less, about 70 EU or less, about 60 EU or less, about 50 EU or less, about 40 EU or less, about 30 EU or less, about 20 EU or less, about 15 EU or less, about 10 EU or less, about 9 EU or less, about 8 EU or less, about 7 EU or less, about 6 EU or less, about 5 EU or less, about 4 EU or less, about 3 EU or less, about 2 EU or less, about 1 EU or less, about 0.9 EU or less, about 0.8 EU or less, about 0.7 EU or less, about 0.6 EU or less, about 0.5 EU or less, about 0.4 EU or less, about 0.3 EU or less, about 0.2 EU or less, about 0.1 EU or less, about 0.05 EU or less, or about 0.01 EU or less.

A composition of the disclosure also can comprise at least about $10^9$ minicells or killed bacterial cells, e.g., at least about $1\times10^9$, at least about $2\times10^9$, at least about $5\times10^9$, or at least $8\times10^9$. In some embodiments, the composition comprises no more than about $10^{11}$ minicells or killed bacterial cells, e.g., no more than about $1\times10^{11}$ or no more than about $9\times10^{10}$, or no more than about $8\times10^{10}$.

IV. CD1d-Recognized Antigens

The present compositions and methods comprise a vector, which can be an intact bacterially derived minicell, that comprises a CD1d-recognized antigen. Such antigens result in an increases the level (e.g., the activity or expression level) of type II interferons, e.g., IFN-γ (gamma). IFN-γ is involved in the regulation of the immune and inflammatory responses; in humans, there is only one type of interferon-γ. It is produced in activated T cells and natural killer cells. IFN-γ potentiates the effects of type I IFNs. IFN-γ released by Th1 cells recruits leukocytes to a site of infection, resulting in increased inflammation. It also stimulates macrophages to kill bacteria that have been engulfed. IFN-γ released by Th1 cells also is important in regulating the Th2 response.

IFNγ cytokines are released by innate Natural Killer (NK) cells upon binding of natural antigen, but glycosphingolipid compounds can function as potent activators of both innate and acquired immune responses. Exposure to a glycosphingolipid induces a potent cytokine response by innate natural killer T (iNKT) cells, including the type II interferon, IFN-7, and a number of Interleukins (Th1-, Th2-, and/or Th17-type cytokines). iNKT cells then induce DC maturation and display T cell helper-like functions that result in the development of cytotoxic T cell responses.

Examples of glycosphingolips useful to induce a IFN type II response are described herein and include C-glycosidific form of α-galactosylceramide (α-C-GalCer), α-galactosylceramide (α-GalCer), 12 carbon acyl form of galactosylceramide (β-GalCer), β-D-glucopyranosylceramide (β-Glc-Cer), 1,2-Diacyl-3-O-galactosyl-sn-glycerol (BbGL-II), diacylglycerol containing glycolipids (Glc-DAG-s2), ganglioside (GD3), gangliotriaosylceramide (Gg3Cer), glycosylphosphatidylinositol (GPI), α-glucuronosylceramide (GSL-1 or GSL-4), isoglobotrihexosylceramide (iGb3), lipophosphoglycan (LPG), lyosphosphatidylcholine (LPC), α-galactosylceramide analog (OCH), and threitolceramide. In a particular embodiment the minicell disclosed herein comprises α-galactosylceramide (α-GalCer) as a type II IFN agonist.

α-GC, an INF type II agonist is known to stimulate the immune system through activation of a type of white blood cell known as natural killer T cell (NKT cell).

The minicell can deliver type II IFN agonists directly to cells of the immune system, with a view to enhancing iNKT cell activation and type II interferon IFN-7 production in vivo. Non-targeted intact, bacterially derived minicells are taken up by phagocytic cells of the immune system, where they are broken down in endosomes, and αGC is presented to iNKT cells for immune activation. Accordingly, in some embodiments the minicell provides targeted delivery of type II interferon agonists. In other embodiments, the composition disclosed herein comprises a non-targeted minicell comprising a type II interferon agonist.

IFN-γ production is controlled by cytokines secreted by antigen presenting cells (APCs), most notably interleukin (IL)-12 and IL-18. These cytokines serve as a bridge to link infection with IFN-γ production in the innate immune response. Macrophage recognition of many pathogens induces secretion of IL-12 and chemokines. These chemokines attract NK cells to the site of inflammation, and IL-12 promotes IFN-γ synthesis in these cells. In macrophages, natural killer cells and T cells, the combination of IL-12 and IL-18 stimulation further increases IFN-γ production. Accordingly, any of these proteins or their combinations are suitable agents for the purpose of this disclosure.

Negative regulators of IFN-γ production include IL-4, IL-10, transforming growth factor R and glucocorticoids. Proteins or nucleic acids that inhibit these factors will be able to stimulate the production of IFN-γ.

Also suitable for use in this context are polynucleotides that encode IFN-γ or genes that activate the production and/or the secretion of IFN-γ.

The agent that increases the level of IFN-γ may also be a viral vaccine. A number of viral vaccines are available that can induce IFN-γ production without causing infection or other types of adverse effects. Illustrative of this class of viral-vaccine agent is a flu (influenza) vaccine.

Serum concentration of IFN-γ required for effectively activating host immune response to is low when the patient also receives administration of drug-loaded, bispecific antibody-targeted minicells or killed bacterial cells. Thus, in one aspect the inventive methodology results in increase of serum IFN-γ concentration that is not higher than about 30,000 pg/mL. In another aspect, the serum IFN-γ concentration is increased to not higher than about 5000 pg/mL, 1000 pg/mL, 900 pg/mL, 800 pg/mL, 700 pg/mL, 600 pg/mL, 500 pg/mL, 400 pg/mL, 300 pg/mL, 200 pg/mL, or 100 pg/mL. In a further aspect, the resulting serum IFN-γ concentration is at least about 10 pg/mL, or at least about 20 pg/mL, 30 pg/mL, 40 pg/mL, 50 pg/mL, 60 pg/mL, 70 pg/mL, 80 pg/mL, 90 pg/mL, 100 pg/mL, 150 pg/mL, 200 pg/mL, 300 pg/mL, 400 pg/mL or 500 pg/mL.

Pursuant to some aspects, the agent is an IFN-γ protein or an engineered protein or analogue. In some aspects, the administration achieves from about 0.02 ng to 1 microgram of IFN-γ per ml of host blood. In one aspect, the achieved IFN-γ concentration in the host blood is from about 0.1 ng to about 500 ng per ml, from about 0.2 ng to about 200 ng per ml, from about 0.5 ng to about 100 ng per ml, from about 1 ng to about 50 ng per ml, or from about 2 ng to about 20 ng per ml.

V. Loading SARS-CoV-2 Viral and Variant Viral Antigens and CD1d-Recognized Antigens into Minicells or Killed Bacterial Cells Viral antigens as well as CD1d-recognized antigens can be packaged into minicells or killed bacterial cells directly, by co-incubating a plurality of intact minicells or killed bacterial cells with the antigens in a buffer. The buffer composition can be varied, as a function of conditions well known in this field, to optimize the loading of the antigens in the intact minicells. The buffer also may be varied in dependence on the antigen (e.g., dependent upon the nucleotide sequence or the length of the nucleic acid to be loaded in the minicells in the case of a nucleic acid payload). An exemplary buffer suitable for loading includes, but is not limited to, phosphate buffered saline (PBS). Once packaged, the antigen remains inside the minicell and is protected from degradation. Prolonged incubation studies with siRNA-packaged minicells incubated in sterile saline have shown, for example, no leakage of siRNAs.

Antigens such as proteins that can be encoded for by a nucleic acid, can be introduced into minicells by transforming into the parental bacterial cell a vector, such as a plasmid, that encodes the antigen. When a minicell is formed from the parental bacterial cell, the minicell retains certain copies of the plasmid and/or the expression product, e.g., the antigen. More details of packaging and expression product into a minicell is provided in WO 03/033519.

Data presented in WO 03/033519 demonstrated, for example, that recombinant minicells carrying mammalian gene expression plasmids can be delivered to phagocytic cells and to non-phagocytic cells. WO 03/033519 also described the genetic transformation of minicell-producing parent bacterial strains with heterologous nucleic acids carried on episomally-replicating plasmid DNAs. Upon separation of parent bacteria and minicells, some of the episomal DNA segregated into the minicells. The resulting recombinant minicells were readily engulfed by mammalian phagocytic cells and became degraded within intracellular phagolysosomes. Moreover, some of the recombinant DNA escaped the phagolysosomal membrane and was transported to the mammalian cell nucleus, where the recombinant genes were expressed. In other embodiments, multiple antigens can be packaged in the same minicell.

Antigens can be packaged in minicells by creating a concentration gradient of the antigen between an extracellular medium comprising minicells and the minicell cytoplasm. When the extracellular medium comprises a higher antigen concentration than the minicell cytoplasm, the antigen naturally moves down this concentration gradient, into the minicell cytoplasm. When the concentration gradient is reversed, however, the antigen does not move out of the minicells. More details of the active agent loading process and its surprising nature are found, for instance, in U.S. Patent Application Publication No. 2008/0051469.

VI. Formulations

The disclosure includes within its scope compositions comprising a combination of (a) a vector, intact bacterial minicell, or killed bacterial cell comprising as a payload at least one viral antigen; and (b) a vector, intact bacterial minicell, or killed bacterial cell comprising as a payload at least one CD1d-recognized antigen, both of which are present in at least one pharmaceutically acceptable carrier. The at least one viral antigen and at least one CD1d-recognized antigen can be in the same or different vector, intact bacterial minicell, or killed bacterial cell. At least one of the viral antigen and CD1d-recognized antigen is present in an intact bacterial minicell.

In another aspect, one of the viral antigen and at least one CD1d-recognized antigen are present in a non-bacterial cell carrier, such as a liposomal carrier.

In some aspects, the CD1d-recognized antigen is the interferon type II agonist α-galactosyl ceramide.

Compositions of the disclosure can be presented in unit dosage form, e.g., in ampules or vials, or in multi-dose containers, with or without an added preservative. The composition can be a solution, a suspension, or an emulsion in oily or aqueous vehicles, and can comprise formulatory agents, such as suspending, stabilizing and/or dispersing agents. A suitable solution is isotonic with the blood of the recipient and is illustrated by saline, Ringer's solution, and dextrose solution. Alternatively, formulations can be in lyophilized powder form, for reconstitution with a suitable vehicle, e.g., sterile, pyrogen-free water or physiological saline. The formulations also can be in the form of a depot preparation. Such long-acting formulations can be administered by implantation (for instance, subcutaneously or intramuscularly) or by intramuscular injection. In some embodiments, administering comprises enteral or parenteral administration. In some embodiments administering comprises administration selected from oral, buccal, sublingual, intranasal, rectal, vaginal, intravenous, intramuscular, and subcutaneous injection.

In some aspects, a minicell-comprising composition that includes a therapeutically effective amount of a viral antigen, as well as a therapeutically effective amount of a CD1d-recognized antigen, is provided. A "therapeutically effective" amount of an antigen is an amount that invokes a pharmacological response when administered to a subject, in accordance with the present disclosure.

In the context of the present disclosure, therefore, a therapeutically effective amount can be gauged by reference to the prevention or amelioration of the viral infection, either in an animal model or in a human subject, when minicells carrying a therapeutic payload are administered, as further described below. An amount that proves "therapeutically effective amount" in a given instance, for a particular subject, may not be effective for 100% of subjects similarly treated for the viral infection, even though such dosage is deemed a "therapeutically effective amount" by skilled practitioners. The appropriate dosage in this regard also will vary as a function, for example, of the stage and severity of the viral infection, as well as whether the subject has any underlying adverse medical conditions, is aged 60+, or is immunocompromised.

A. Administration Routes

Formulations of the disclosure can be administered via various routes and to various sites in a mammalian body, to achieve the therapeutic effect(s) desired, either locally or systemically. Delivery may be accomplished via any pharmaceutically acceptable route, for example, oral administration, application of the formulation to a body cavity, inhalation, nasal administration, pulmonary administration, insufflation, or by injection (e.g., parenteral, intramuscular, intravenous, intraportal, intrahepatic, peritoneal, subcutaneous, intratumoral, or intradermal administration). A combination of routes also may be employed.

B. Purity

Bacterial minicells are substantially free from contaminating parent bacterial cells. Thus, minicell-comprising formulations preferably comprise fewer than about 1 contaminating parent bacterial cell per $10^7$ minicells, fewer than about 1 contaminating parent bacterial cell per $10^8$ minicells, fewer than about 1 contaminating parent bacterial cell per $10^9$ minicells, fewer than about 1 contaminating parent bacterial cell per $10^{10}$ minicells, or fewer than about 1 contaminating parent bacterial cell per $10^{11}$ minicells.

Methods of purifying minicells are known in the art and described in PCT/IB02/04632. One such method combines cross-flow filtration (feed flow is parallel to a membrane surface; Forbes, 1987) and dead-end filtration (feed flow is perpendicular to the membrane surface). Optionally, the filtration combination can be preceded by a differential centrifugation, at low centrifugal force, to remove some portion of the bacterial cells and thereby enrich the supernatant for minicells.

Particularly effective purification methods exploit bacterial filamentation to increase minicell purity. Thus, a minicell purification method can include the steps of (a) subjecting a sample containing minicells to a condition that induces parent bacterial cells to adopt a filamentous form, followed by (b) filtering the sample to obtain a purified minicell preparation.

Known minicell purification methods also can be combined. One highly effective combination of methods is as follows:

Step A: Differential centrifugation of a minicell producing bacterial cell culture. This step, which may be performed at 2,000 g for about 20 minutes, removes most parent bacterial cells, while leaving minicells in the supernatant;

Step B: Density gradient centrifugation using an isotonic and non-toxic density gradient medium. This step separates minicells from many contaminants, including parent bacterial cells, with minimal loss of minicells. Preferably, this step is repeated within a purification method;

Step C: Cross-flow filtration through a 0.45 m filter to further reduce parent bacterial cell contamination.

Step D: Stress-induced filamentation of residual parent bacterial cells. This may be accomplished by subjecting the minicell suspension to any of several stress-inducing environmental conditions;

Step E: Antibiotic treatment to kill parent bacterial cells;

Step F: Cross-flow filtration to remove small contaminants, such as membrane blebs, membrane fragments, bacterial debris, nucleic acids, media components and so forth, and to concentrate the minicells. A 0.2 m filter may be employed to separate minicells from small contaminants, and a 0.1 m filter may be employed to concentrate minicells;

Step G: Dead-end filtration to eliminate filamentous dead bacterial cells. A 0.45 um filter may be employed for this step; and Step H: Removal of endotoxin from the minicell preparation. Anti-Lipid A coated magnetic beads may be employed for this step.

C. Administration Schedules

In general, the formulations disclosed herein may be used at appropriate dosages defined by routine testing, to obtain optimal physiological effect, while minimizing any potential toxicity. The dosage regimen may be selected in accordance with a variety of factors including age, weight, sex, medical condition of the patient; the severity of the condition to be treated, the route of administration, and the renal and hepatic function of the patient.

Optimal precision in achieving concentrations of minicell and drug within the range that yields maximum efficacy with minimal side effects may require a regimen based on the kinetics of the minicell and antigen availability to target sites and target cells. Distribution, equilibrium, and elimination of a minicell or antigen may be considered when determining the optimal concentration for a treatment regimen. The dosages of the minicells and antigens may be adjusted when used in combination, to achieve desired effects.

Moreover, the dosage administration of the formulations may be optimized using a pharmacokinetic/pharmacodynamic modelling system. For example, one or more dosage regimens may be chosen and a pharmacokinetic/pharmacodynamic model may be used to determine the pharmacokinetic/pharmacodynamic profile of one or more dosage regimens. Next, one of the dosage regimens for administration may be selected which achieves the desired pharmacokinetic/pharmacodynamic response based on the particular pharmacokinetic/pharmacodynamic profile. See, e.g., WO 00/67776.

Specifically, the formulations may be administered at least once every day for a few days (three to four) or until the symptoms of viral infection subside. In one embodiment, the formulations are administered at least once a day until viral disease subsides.

More specifically, the formulations may be administered at least once a day for about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, or about 31 days. Alternatively, the formulations may be administered about once every day, about once every about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30 or about 31 days or more.

The compositions may be administered in a single daily dose, or the total daily dosage may be administered in divided doses of two, three, or four times daily.

VII. Definitions

Unless defined otherwise, all technical and scientific terms used in this description have the same meaning as commonly understood by those skilled in the relevant art.

For convenience, the meaning of certain terms and phrases employed in the specification, examples, and appended claims are provided below. Other terms and phrases are defined throughout the specification.

The singular forms "a," "an," and "the" include plural reference unless the context clearly dictates otherwise.

As used herein, the term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

As used herein, except where the context requires otherwise, the term "comprise" and variations of the term, such as "comprising," "comprises" and "comprised" are not intended to exclude other additives, components, integers or steps.

The phrases "biologically active" and "biological activity" are used to qualify or to denote, as the case may be, the effect(s) of a compound or composition on living matter. Thus, a material is biologically active or has biological activity if it has interaction with or effect on any cell tissue in a human or animal body, e.g., by reacting with protein, nucleic acid, or other molecules in a cell.

"Individual," "subject," "host," and "patient," terms used interchangeably in this description, refer to any mammalian subject for whom diagnosis, treatment, or therapy is desired. The individual, subject, host, or patient can be a human or a non-human animal. Thus, suitable subjects can include but are not limited to non-human primates, cattle, horses, dogs, cats, guinea pigs, rabbits, rats, and mice.

The terms "treatment," "treating," "treat," and the like refer to obtaining a desired pharmacological and/or physiologic effect in a patient. The effect can be prophylactic in terms of completely or partially preventing viral infection or a symptom thereof and/or the effect can be therapeutic in terms the viral infection. Alternatively or additionally, a desired treatment effect can be an increase of overall patient survival, progress-free survival, or a reduction of adverse effect.

The phrase "pharmaceutical grade" denotes a lacking of parental cell contamination, cell debris, free endotoxin and other pyrogens that is sufficient to meet regulatory requirements for human intravenous administration. See, e.g., "Guidance for Industry—Pyrogen and Endotoxins Testing," U.S. Food and Drug Administration (June 2012).

"Payload" in this description identifies or qualifies biologically active material that is to be loaded or that has been loaded into a minicell for delivery to a targeted host cell.

The term "substantially" generally refers to at least 90% similarity. In some embodiments, in the context of a first X-ray powder diffraction pattern being substantially as shown in a second X-ray powder diffraction pattern, "substantially" refers to +0.2°. In some embodiments, in the context of a first differential scanning calorimetry thermogram being substantially as shown in a second differential scanning calorimetry thermogram, "substantially" refers to +0.4° C. In some embodiments, in the context of a first thermogravimetric analysis being substantially as shown in a second thermogravimetric analysis, "substantially" refers to ±0.4% weight. In some embodiments, "substantially purified" refers to at least 95% purity. This includes at least 96, 97, 98, or 99% purity. In further embodiments, "substantially purified" refers to about 95, 96, 97, 98, 99, 99.5, or 99.9% purity, including increments therein.

As used herein, "therapeutic activity" or "activity" may refer to an activity whose effect is consistent with a desirable therapeutic outcome in humans, or to desired effects in non-human mammals or in other species or organisms. Therapeutic activity may be measured in vivo or in vitro. For example, a desirable effect may be assayed in cell culture.

As used herein, the phrase "therapeutically effective amount" shall mean the drug dosage that provides the specific pharmacological response for which the drug is administered in a significant number of subjects in need of such treatment. It is emphasized that a therapeutically effective amount of an antigen that is administered to a particular subject in a particular instance will not always be effective in treating the viral infection described herein, even though such dosage is deemed to be a therapeutically effective amount by those of skill in the art.

The present technology, thus generally described, will be understood more readily by reference to the following examples, which are provided by way of illustration and are not intended to be limiting of the present technology.

EXAMPLES

Example 1

The purpose of this example is to describe preparation of a SARS-CoV-2 vaccine comprising an antigen of a SARS-CoV-2 vaccine variant.

FIG. 1A depicts a scanning electron microscope image showing production of an EnGeneIC Dream Vector (EDV™) nanocell, i.e., an intact, bacterially derived minicell, from a safe bacterium *Salmonella typhimurium* strain, and FIG. 1B depicts a transmission electron micrograph image showing the structure of an empty EDV bacterial nanocell, with a diameter of about 400 nm. The vectors, or bacterial minicells, are used as carriers for SARS-CoV-2 variant antigens, SARS-CoV-2 antigens, and the adjuvants described herein.

FIG. 2A is a graphical depiction of an EDV-COVID-19 vaccine composition, comprising a bacterial expression plasmid ("EDV"), such as that shown in FIG. 1B, wherein the EDV first expresses Spike protein of SARS-CoV-2 in the EDV cytoplasm and additionally carrys or is loaded with the CD1d-restricted iNKT cell antigen glycolipid α-galactosyl-ceramide (α-GalCer) IFN-γ as an adjuvant or stimulating agent. Expressed Spike protein encoded by SARS-CoV-2 is designated by a star on FIG. 2A. FIG. 2B shows an exemplary vial containing lyophilized EDV-COVID-19 vaccine composition.

FIG. 3 is a graphical depiction of an EDV-COVID-19 vaccine composition, comprising an intact, bacterial minicell comprising an expression plasmid, such as that shown in FIG. 1B, wherein the bacterial minicell comprises (i) a plasmid expressing cloned Spike proteins from original SARS-CoV-2, SARS-CoV-2 delta variant, and SARS-CoV-2 Brazil variant, (ii) a gene expression promotor expressing all proteins as a single mRNA and separate proteins in the EDV cytoplasm, (iii) multiple Spike proteins, including Spike protein produced by SARS-CoV-2, Brazil variant Spike Protein, and delta variant Spike protein, and (iv) the CD1d-restricted iNKT cell antigen glycolipid α-galactosylceramide (α-GalCer) IFN-γ as an adjuvant or stimulating agent. Expressed Spike proteins encoded are designated by starts on FIG. 3. Upon administration to a subject in need, the vaccine composition functions to stimulate antibody responses to the viral proteins. Plasmid double-stranded DNA is recognized by intracellular nucleic acid sensors and triggers IFNα and IFNβ response.

The product can be lyophilized. The intact bacterially-derived minicell based products are very stable and lyophilized vials with anti-cancer compounds and intact bacterially-derived minicell loaded with α-GC have already shown stability for more than 3 years when the vials are simply stored at 4° C. in a normal fridge at the hospital pharmacy. They can be shipped anywhere in the world via a courier, which has previously been demonstrated for US cancer trials using EDVs (e.g., bacterial minicells).

Patient dosing: When a patient is to be dosed, the vial can be reconstituted in 1 ml of sterile physiological saline and injected i.v. as a bolus injection.

The plasmid encoding the SARS-CoV-2 viral and viral variant proteins can be transformed into the intact bacterially-derived minicell producing strain and it would express the viral proteins in the bacterial cytoplasm. When the intact bacterially-derived minicell is produced during asymmetric bacterial division a lot of the protein is segregated into the intact bacterially-derived minicell cytoplasm. This has been demonstrated in in several studies where heterologous foreign proteins have been expressed in intact bacterially-derived minicell producing bacterial cells and the proteins segregate into the intact bacterially-derived minicell cytoplasm.

The expected results from plasmid-packaged intact bacterially-derived minicells is an antibody response to all the virus proteins, plus a Type I interferon response.

The injected intact bacterially-derived minicells would be rapidly engulfed by the cells of the immune system (macrophages, NK cells and dendritic cells) in the lymph nodes, liver and spleen. The intact bacterially-derived minicells normally enter the endosomes and are broken down in the lysosomes and the plasmid is released which escapes into the cytoplasm.

Cytosolic DNA sensors, which would recognize the plasmid DNA, are a class of pattern recognition receptors (PRRs), which induce the production of type I interferons (IFNα and IFNβ) and trigger the induction of a rapid and efficient innate immune response. It is well known that Type I interferons have a potent antiviral effect.

The SARS-CoV-2 viral and viral variant proteins are released from the broken down intact bacterially-derived minicells in the lysosomes and undergo antigen processing and presentation via MHC Class II on to the cell surface. This triggers a potent antibody response to the viral antigenic epitopes. This further provokes a CD4+/CD8+ T cell response against virally infected cells and this should augment the anti-viral response.

The activation maturation and proliferation of fresh bone marrow derived monocytes along with the activation and proliferation of macrophages, dendritic cells, NK cells, B cells and T cells would be expected to overcome the observed lymphopenia in the elderly and immune-compromised SARS-CoV2 patients.

Expected results from α-galactosyl ceramide packaged intact bacterially-derived minicells—induction of IFN-γ response: EDV™α-GC are also engulfed by cells of the immune system (macrophages, NK cells and dendritic cells) in the lymph nodes, liver and spleen. The intact bacterially-derived minicells are broken down in the intracellular lysosomes and the α-GC is released which is picked up by lysosomally associated CD1d (MHC Class I like molecule which is involved in the presentation of foreign glycolipids) and transported to the cell surface. This α-GC/CD1d complex is recognized by the invariant T cell receptor on invariant NKT cells and this results in the rapid release of IFN-γ. IFN-γ is known to be a potent stimulator of a specific anti-viral immune response which would then be expected to augment the rejection of the viral infection.

The intact bacterially-derived minicell therapeutics have already been shown to be safe in human cancer patients where over 1,500 doses have been administered in over 140 patients with minimal to no side effects despite repeat dosing.

Example 2

This example is directed to a study evaluating the feasibility of using bacterial minicells loaded with $EDV_{Covid-\alpha GC}$ ($EDV_{Covid-\alpha GC}$) as a vaccine against SARS-CoV-2.

α-GC and the spike protein along with the plasmids encoding the spike protein DNA sequence can be successfully incorporated into one single EDV ($EDV_{Covid-\alpha GC}$). The EDVs were then administered through subcutaneous (SC), intravenous (IV) and intra-muscular (IM) injections. It was found that administration through intra-muscular injections yielded the strongest initial interferon response 8 h post-injection as well as the highest spike protein specific IgG titres 1 week post-injection compared to all other strategies tested.

$EDV_{Covid-\alpha GC}$ and corresponding controls were then administered through intra-muscular injections and the incorporation of αGC in the EDVs resulted in a dramatic increase in IFNα, TNFα, IFNγ, IL12 and IL6 production 8 h post-treatment. This was accompanied by an increase in the amount of cytotoxic T-cells in the spleens of $EDV_{Covid-\alpha GC}$ treated mice. These T-cells responded to the stimulation of the spike protein ex vivo and expressed CD69+ CD137+.

Figure 4A:
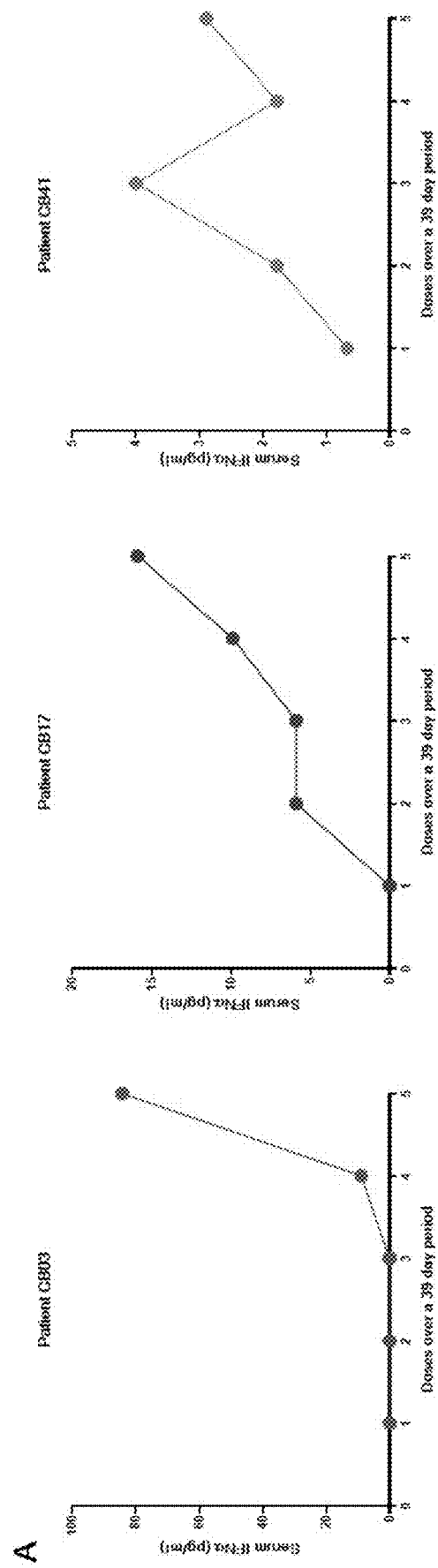
FIGS. 4A-C shows the results of administering a bacterial minicell comprising α-galactosylceramide (α-GalCer) to three pancreatic cancer patients (CB03, CB17, and CB41) over a 39 day period, or 4 pancreatic cancer patients (CB11, CB14, CB18, and CB41) over a 46 day period. Measurement of serum IFN-α (pg/mL) (FIG. 4A) and serum IFN-7 (FIG. 4B) are shown on the Y axis of the graphs depicted in FIGS. 4A and 4B. The data shows that EDV-αGC elicits a Th1 response and increased lymphocyte levels in pancreatic cancer patients.
Figure 4B:
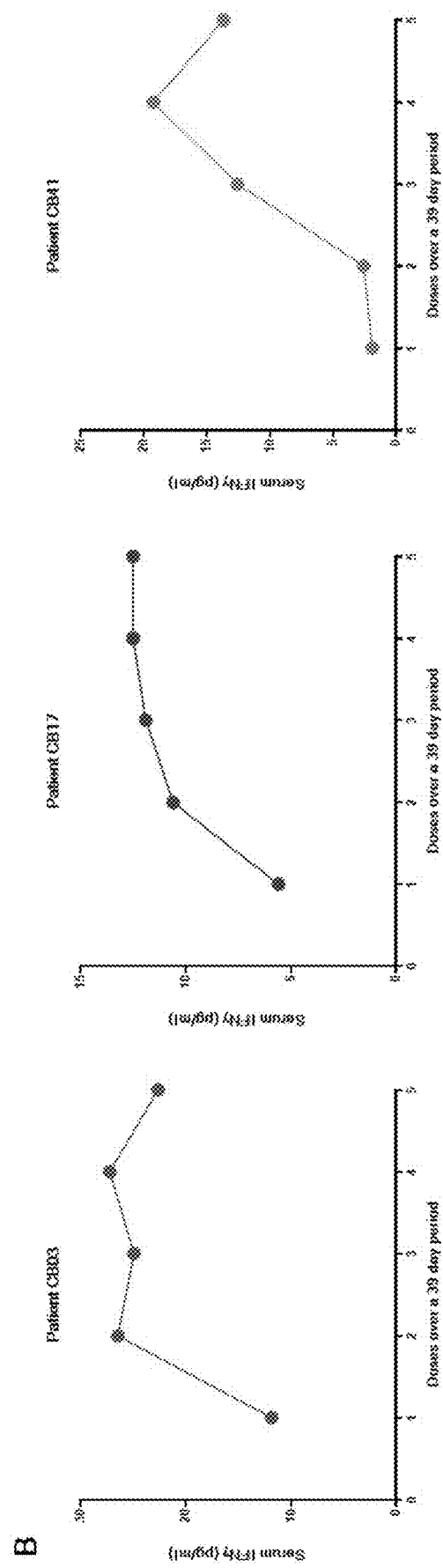
Figure 4C:
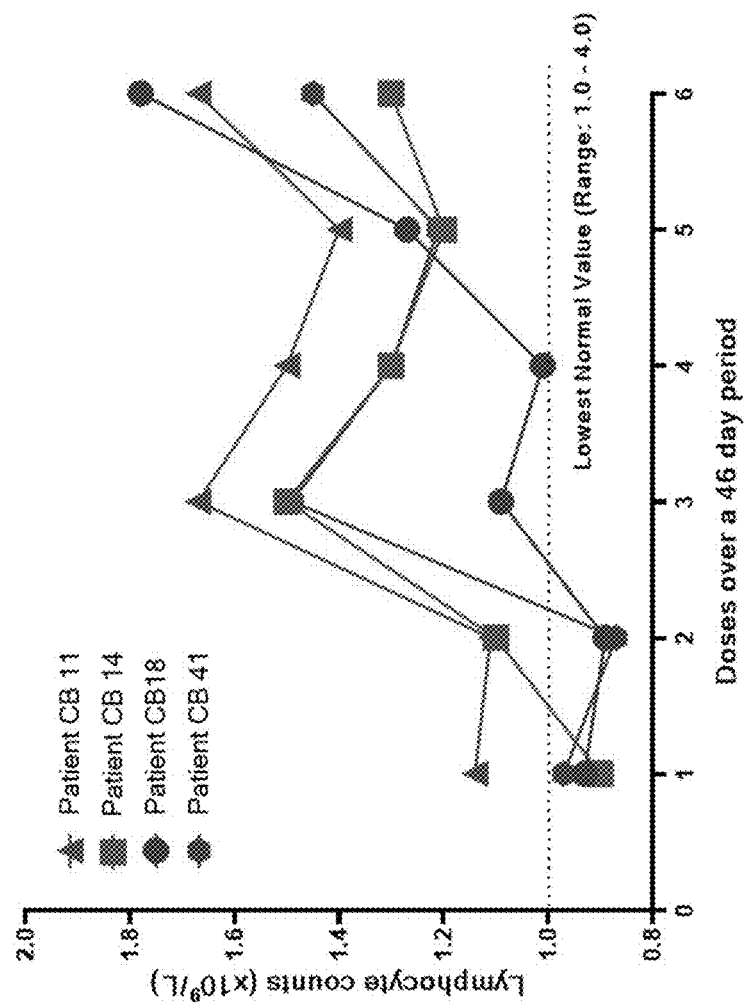

FIGS. 4A-C shows the results of administering a bacterial minicell comprising α-galactosylceramide (α-GalCer) to three pancreatic cancer patients (CB03, CB17, and CB41) over a 39 day period, or 4 pancreatic cancer patients (CB11, CB14, CB18, and CB41) over a 46 day period. Measurement of serum IFN-α (pg/mL) (FIG. 4A) and serum IFN-γ (FIG. 4B) are shown on the Y axis of the graphs depicted in FIGS. 4A and 4B. The data shows that EDV-αGC elicits a Th1 response and increased lymphocyte levels in pancreatic cancer patients. FIG. 4A shows a sustained increase in serum IFNα levels from all 3 patients following 2 doses of EDV-αGC, and FIG. 4B shows a sustained increase in serum IFNγ levels from all 3 patients following 2 doses of EDV-αGC. IFN levels were measured via ELISA from patients' blood serum samples taken throughout treatment cycles. FIG. 4C shows the results of measuring lymphocyte counts ($\times 10^9$/L) for four pancreatic cancer patients (CB11, CB14, CB18, and CB41) over a 46 day period following 2 doses of EDV-αGC. The results depicted in FIG. 4C show a rise in lymphocyte counts to within normal range (1.0-4.0) in the four pancreatic cancer patients. Lymphocyte levels were measured from patient blood samples throughout treatment cycles, by pathology service.

At 4 weeks post-initial treatment, mice injected with $EDV_{Covid-\alpha GC}$ contained the highest amount of spike protein specific IgG and IgM compared to all the controls tested. B-cells extracted from these mice were able to produce IgG and IgM ex vivo in response to spike protein stimulation. In addition, splenocytes from $EDV_{Covid-\alpha GC}$ treated mice contained the highest amount of anti-viral CD69+ CD137+ cytotoxic T-cells and ex vivo stimulation of these splenocytes using the spike protein yielded an increase in viral antigen specific CD69+ cytotoxic T cells. Moreover, the serum of $EDV_{Covid-\alpha GC}$ injected mice exhibited the strongest inhibition of spike protein binding to the hACE receptor in vitro, indicating the antibodies produced were neutralizing. Interestingly, the serum from mice that received any form of αGC also exhibited measurable but non-antigen-specific antiviral effect.

In summary, the incorporation of αGC into $EDV_{Covid}$ is important for achieving maximum anti-SARS-CoV-2 spike protein efficacy. The results of this study indicate that I.M. administration of $EDV_{Covid-\alpha GC}$ is a viable strategy for combating the current Covid-19 pandemic.

Materials and Methods

SARS-CoV-2 Spike protein bacterial expression plasmid design: The expression cassette was generated by placing the coding nucleotide sequence for SARS-Cov-2 (Covid-19) Spike protein (Genebank MN908947.3) on the 3'-end of a modified β-lactamase promoter, which has been previously tested for expression in *Salmonella typhimurium* strains (Su, Brahmbhatt et. al., *Infection and Immunity*, 60(8):3345-3359 (1992)). The expression cassette was then inserted between the Kpn 5' and Sal I 3' sites of the M13 multiple cloning site of PUC57-Kan backbone plasmid to create P-Blac-Cov2S. The control plasmid, P-Blac was created by removing the Cov2S sequence from the P-Blac-Cov2S.

Figure 5A:
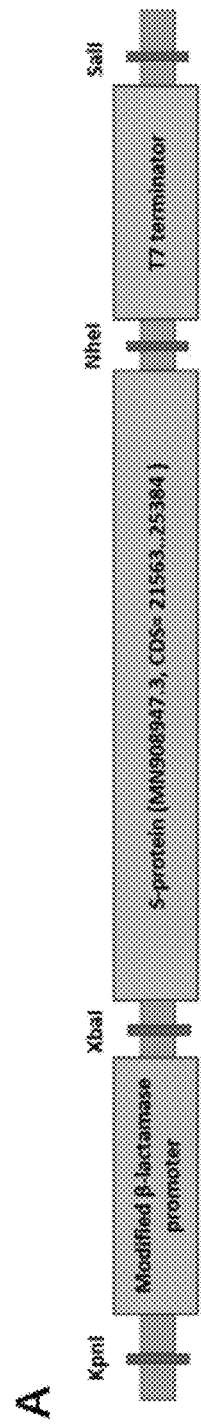
FIGS. 5A-H show a construct design for an EDV-SARS-CoV-2 vaccine (FIG. 5A). The expression cassette was generated by placing the coding nucleotide sequence for SARS-Cov-2 (Covid-19) Spike protein (Genebank MN908947.3) on the 3'-end of a modified β-lactamase promoter, which has previously been used for expression in *Salmonella typhimurium* strains (Su et al., *Infection and Immunity*, 60(8):3345-3359 (1992)). The expression cassette was then inserted between the Kpn 5' and Sal I 3' sites of the M13 multiple cloning site of PUC57-Kan backbone plasmid to create P-Blac-Cov.
Figures 5B, 5C:
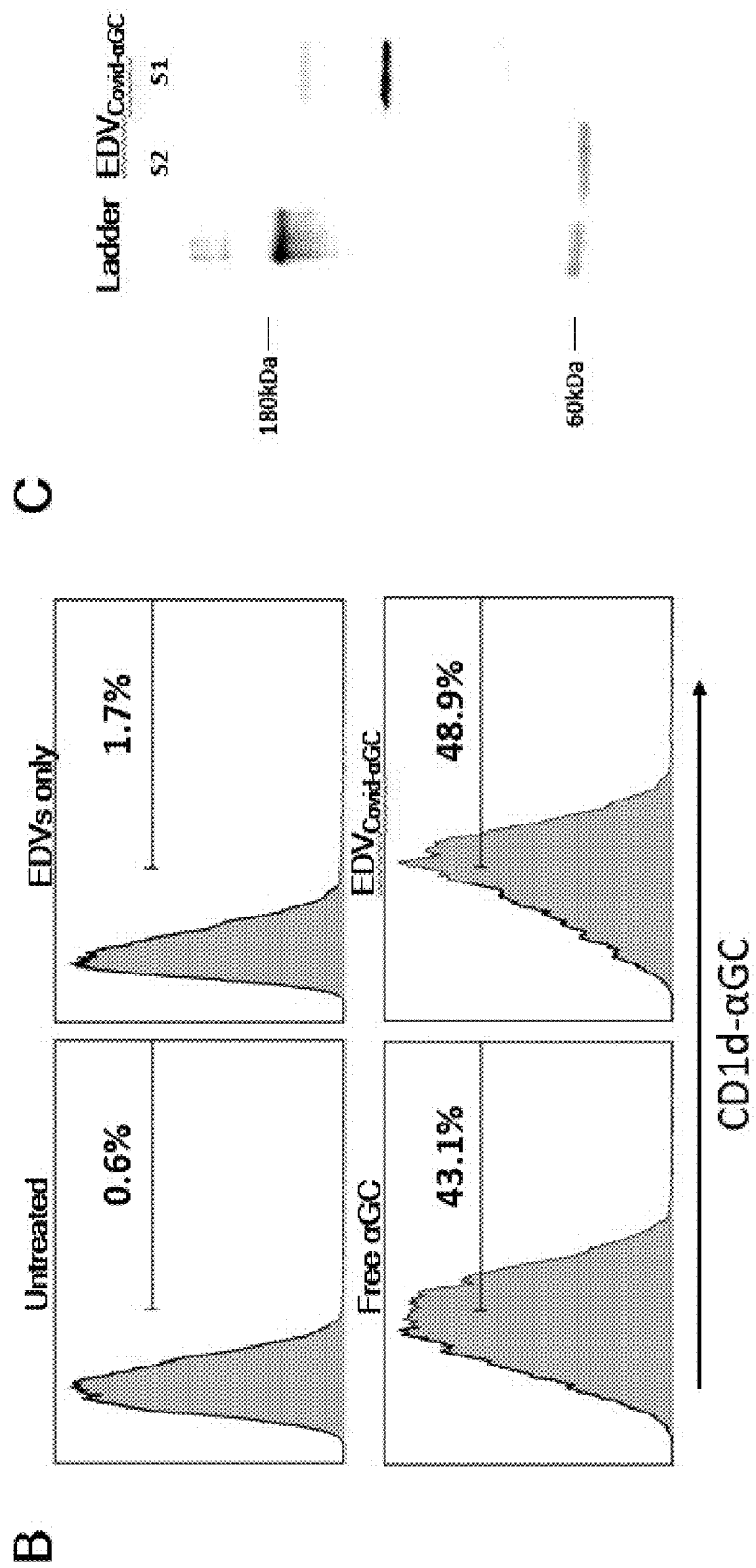
Figures 5D, 5E, 5F, 5G, 5H:
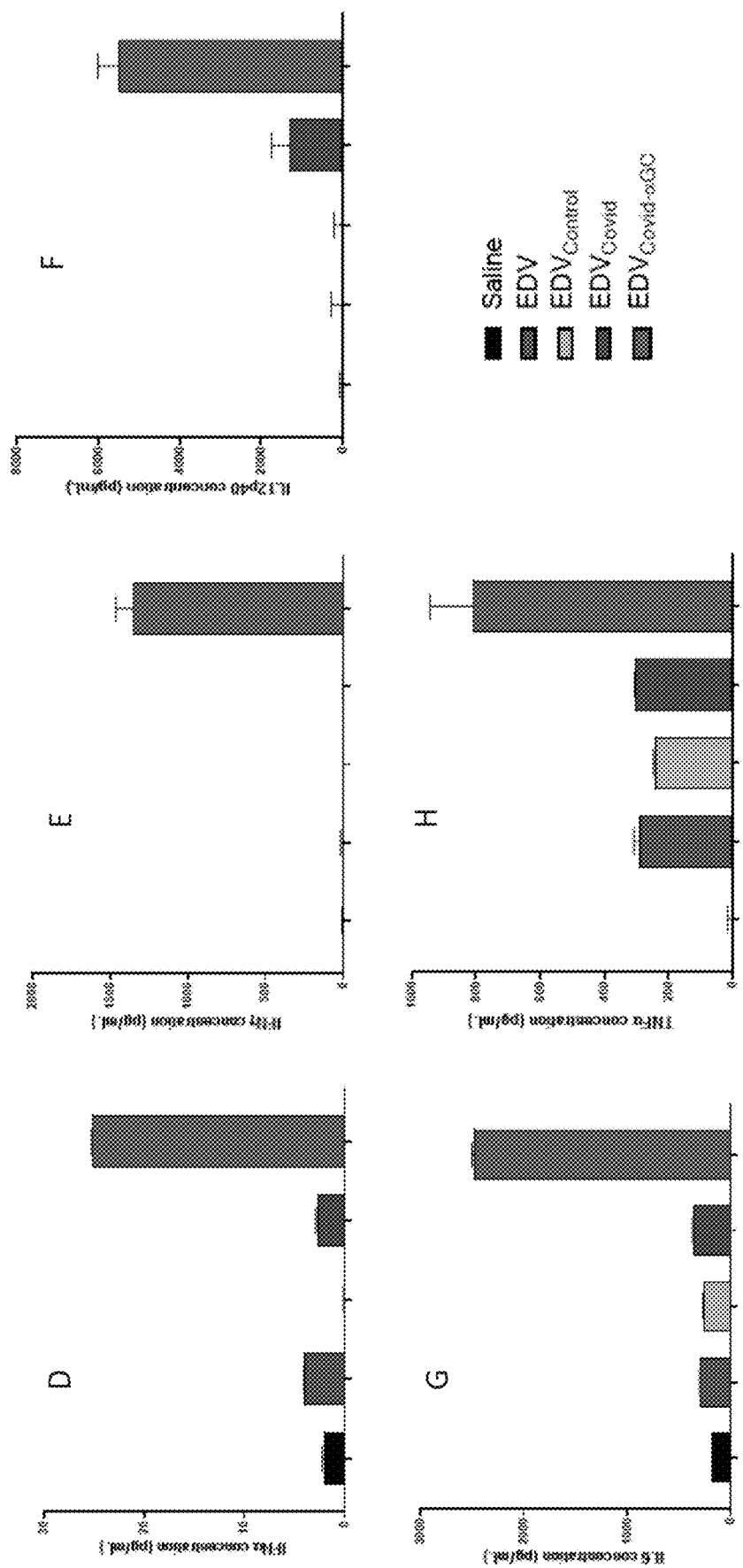

FIGS. 5A-H show a construct design for an EDV-SARs-CoV-2 vaccine (FIG. 5A). The expression cassette was generated by placing the coding nucleotide sequence for SARS-Cov-2 (Covid-19) Spike protein (Genebank MN908947.3) on the 3'-end of a modified β-lactamase promoter, which has previously been used for expression in *Salmonella typhimurium* strains (Su et al., *Infection and Immunity*, 60(8):3345-3359 (1992)). The expression cassette was then inserted between the Kpn 5' and Sal I 3' sites of the M13 multiple cloning site of PUC57-Kan backbone plasmid to create P-Blac-Cov.

Cloning of P-Blac-Cov2S and P-Blac-Cov2S into *Salmonella Typhimurium* EDV producing strain and the subsequent incorporation of P-Lac-Cov2S and the spike protein into the EDVs: P-Blac-Cov2S and P-Blac-Cov2S were electroporated using a Gene Pulser Xcell™ (Bio-Rad, Hercules CA) into a chemically competent *Salmonella typhimurium* intermediate strain (4004), which lacks plasmid restriction mechanism, using settings 200 ohm, 25 Hz, 2.5 mV. Transformants were recovered in TSB medium for 1.5 hrs at 37° C. before plating on TSB agar plates containing 75 μg/ml kanamycin (#K4000, Sigma-Aldrich, St. Louis, Missouri). Isolates were picked into TSB broth with 75 μg/ml kanamycin and plasmid DNA extracted using the Qiagen miniprep kit as per manufacturer's instructions (#27104, Qiagen, Hilden, Germany). Subsequently, the extracted plasmid DNA from 4004 strain was electroporated as above into EnGeneIC Pty. Ltd. EDV producing *Salmonella typhimurium* strain (ENSm001). The bacteria that contained P-Blac-Cov2S would produce the encoded Covid2 spike protein, which alone with the plasmid DNA, would be incorporated into the EDVs to produce $EDV_{COVID}$. The EDVs containing P-Blac (EDVCONT) would be used as a control.

To determine the plasmid content of $EDV_{COVID}$ and $EDV_{CONT}$, plasmids were extracted from $2\times10^9$ EDVs using a Qiaprep Spin miniprep kit (Qiagen) following the manufacturer's instructions. Empty EDV were treated the same was and used as controls. The quantity of DNA plasmids were then measured by absorption at 260 nm using a Biophotometer (Eppendorf). The copy number of the plasmids were calculated using:

$$\text{Number of copies} = \frac{\text{amount} * 6.022 \times 10^{23}}{\text{length} * 1 \times 10^9 * 660}$$

Western Blot: Proteins from $2\times10^{10}$ EDVCOVID were extracted using 100 µL B-PER™ (Thermo Fisher) bacterial protein extraction reagent supplemented with 10% (v/v) lysozyme (Sigma-Aldrich) and 1% (v/v) DNaseI (Qiagen). The extracted samples were then centrifuged at 12,000 g for 10 min and the supernatant was collected. The left-over pellet was also collected and resuspended in 100 µl PBS. 23 µl of the supernatant and pellet protein samples were co-incubated with 5 µl of loading buffer and 2 µl DTT (Sigma-Aldrich) at 80° C. for 20 min before the entire content of each sample was loaded onto a NuPAGE 4-12% Bis-Tris mini gel (Life Technologies) and run at 190 V for ~80 min. The sample was then transferred using an iBlot 2 machine and the membrane was blocked using Superblock blocking buffer (Thermo Fisher) and subsequently stained with 1:2000 Rabbit poly-clonal SARS-CoV2 spike antibody (also cross-reacts with the S1 subunit, Sino Biological, Beijin, China) and incubated overnight at 4° C. The membrane was then washed with PBST and incubated with RP conjugated anti-rabbit secondary antibody (1:5000) (Abcam) for 1 h at room temperature. The blot was developed using Lumi-Light Western Blot substrate (Roche) and visualised using a Chemidoc MP (Biorad).

α-galactosylceramide loading into EDVCOVID and cell culture: α-galactosylceramide glycolipid adjuvant (α-GC) was loaded into EDVCOVID to created EDVCOVID-αGC using a proprietary method developed at EnGeneIC.

JAWSII cells (ATCC) were treated with EDVCOVID-αGC in a 96-well Perfecta3D hanging drop plate (Sigma) at $1\times10^4$ EDV-COVID-αGC per cell. JAWSII cells treated with 4 µg/mL α-GC was used as a positive control. The cultures were then incubated for 24 h at 37° C. with 5% $CO_2$ and cells were collected and stained with a CD1d-αGC antibody (ThermoFisher) and analysed using a Gallios flow cytometer (Beckman). The results were analysed using Kaluza Analysis software (Beckman).

Animal studies: Female Balb/c mice, 6-7 weeks old were obtained from the Animal Resources Company in Western Australia. The mice were acclimatized for one week before the experiments commenced. The mice were injected with appropriate treatments through SC and IM injections and serum was collected 8 h, 1 week and 4 weeks post-injection through the tail vein and the spleen and bone marrows were collected.

FIG. 5D-5H show the results following intramuscular (IM) injections of $2\times10^9$ EDV-COVID-α-GC into five groups of BALB/c mice, with IFNα concentration (pg/mL) (FIG. 5D), IFNγ concentration (pg/mL) (FIG. 5E), IL12p40 concentration (pg/mL) (FIG. 5F), IL6 concentration (pg/mL) (FIG. 5G), and TNFα concentration (pg/mL) (FIG. 5H) shown on the Y axis of the figures. The results show that administration resulted in a strong type I interferon response within 8 h post-injection. The five groups of mice (n=6 per group) were: Group 1=saline; Group 2=EDV (bacterial minicell with no payload); Group 3=$EDV_{control}$ (EDVs carrying the plasmid with no insert expressing the Spike protein i.e. plasmid backbone only); Group 4=$EDV_{Covid}$ (bacterial minicell comprising a SARS-CoV-2 spike protein) and Group 5=$EDV_{Covid}$+αGC (construct shown in FIG. 2A).

Figures 6A, 6B:
FIGS. 6A-6F show the response in Balb/c mice (n=8 per group) four weeks post I.M dose of EDV-COVID-αGC ($2\times 10^9$ day 1 first dose; $1\times 10^9$ day 21 second dose). High levels of anti-S protein IgM (FIG. 6A) and IgG (FIG. 6B) antibody titers were detected in the serum of the mice immunized with EDV-COVID-α-GC at 28 days post-initial dose, with a booster administration at 21 day.
Figures 6C, 6D:
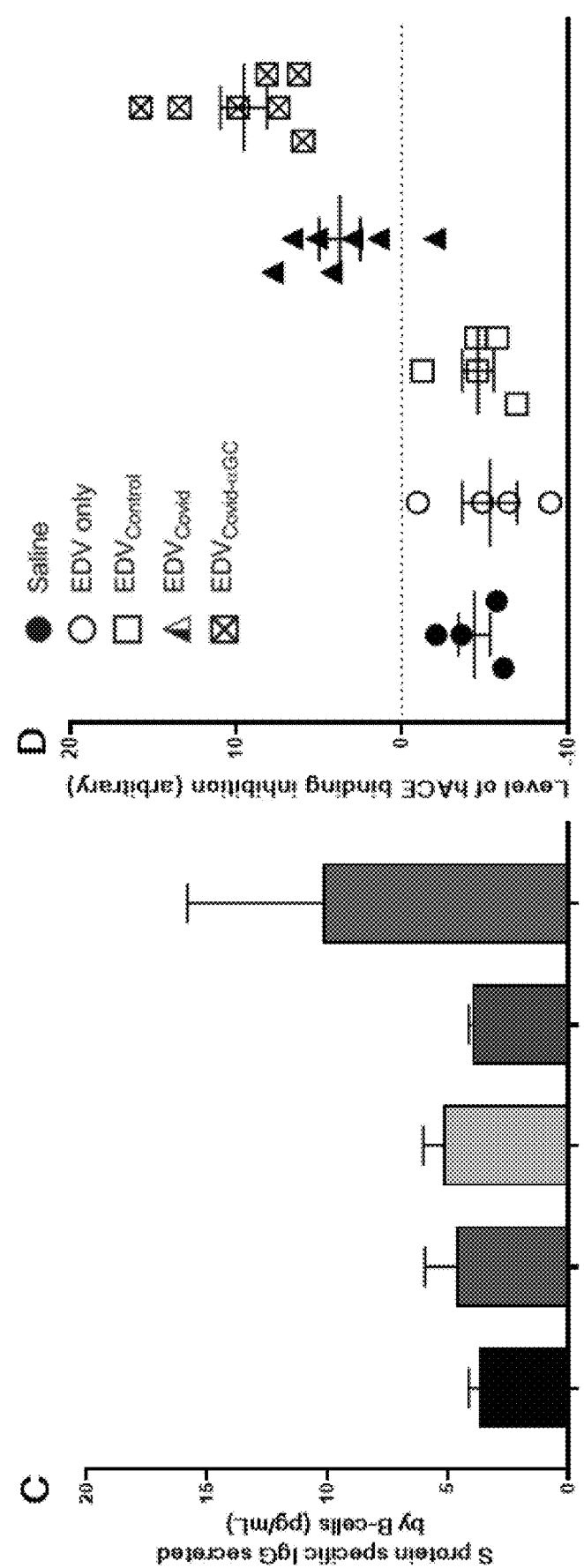

FIGS. 6A-6F show the response in Balb/c mice (n=8 per group) four weeks post I.M dose of EDV-COVID-αGC ($2\times10^9$ day 1 first dose; $1\times10^9$ day 21 second dose). High levels of anti-S protein IgM (FIG. 6A) and IgG (FIG. 6B) antibody titers were detected in the serum of the mice immunized with EDV-COVID-α-GC at 28 days post-initial dose, with a booster administration at 21 day. FIG. 6C shows the results following isolation of B-cells from the mouse bone marrow at 28-day post-initial injection and co-incubation with the SARS-CoV-2 S protein ex vivo. It was found that B-cells isolated from EDV-COVID-α-GC immunized mice produced a significantly greater amount of S protein-specific IgG in response to the presence of S protein as compared to all other groups tested. FIG. 6D shows the results of a neutralizing antibody assay, which demonstrated that the serum of 100% of the mice immunized with EDV-COVID-α-GC resulted in SARS-CoV-2 RBD binding inhibition to hACE2 receptor. The cPASS™ SARS-Cov-2 Neutralizing Antibody Assay (FDA approved; Tan et al, *Nature Biotech*, 2020) for detection in various species was used to assess inhibition of RBD binding to hACE2 receptor.

Enzyme-linked immunosorbent assay: The levels of IL-12p40, IFN-γ, TNFα, IL-6, IL2, IFNα and IFNβ in the mouse serum were measured by standard sandwich enzyme-linked immunosorbent assay (ELISA) from R&D Systems according to manufacturer's instructions. The concentrations of the protein present were determined by calculating absorbance of the samples again standards curves constructed within the same assay using purified proteins.

For analysis of anti-RBD specific IgG and IgM antibodies, 96-well plates (Immulon 4 HBX; Thermo Fisher Scientific) were coated at 4° C. with 50 µl per well of a 2 µg/ml solution of anti-covid spike RBD protein (Genetex) suspended in PBS (GIBCO). On the following day, the coating protein solution was removed and the samples in each well were blocked using 100 µl per well of 3% non-fat milk prepared in PBS with 0.1% Tween 20 (PBST) at room temperature for 1 h. During this time, serial dilutions of mouse serum were prepared in 1% non-fat milk prepared in PBST. The blocking solution was then removed and 100 µl of each serial diluted serum sample was added to the plates and incubated for 2 h at room temperature. At the end of incubation period, the plates were washed three times with 250 µl per well of 0.1% PBST, before adding 100 µl of 1:3,000 dilution of goat anti-mouse IgG/IgM-horseradish peroxidase (HRP) conjugated secondary antibody (ThermoFisher) prepared in 0.1% PBST. The samples were incubated at room temperature for 1 h and then were again washed three times with 0.1% PBST. Once completely dry, the samples were visualised by incubating with TMD. The reactions were then terminated and the samples were read at 490 nm using a KC Junior plate reader (BioTek Instruments).

Antibody titre was determined using ELISA by generating 1:3 serial dilution of the treated mouse serum samples and is expressed as the inverse of the highest dilution with a positive result.

Statistical analysis: Student's T-tests and One-way ANOVA was conducted using Prism 8 (GraphPad). A P value of <0.05 is considered to be statistically significant.

Results

To achieve effective and efficient delivery of the vaccine with one single injection, αGC was co-loaded into $EDV_{Covid}$ to create $EDV_{Covid}$-αGC. The function of the co-loaded αGC was tested by examining its presentation on JAWSII cells via CD1d ligand following $EDV_{Covid-\alpha GC}$ treatment. It was found that a high percentage of JAWSII cells expressed CD1d-αGC following the treatment at a comparable or higher level than those that were treated with 3 ptg/mL of free αGC. Western blot analysis was conducted to ensure the spike protein incorporated into the $EDV_{Covid}$-αGC was not affected by the secondary incorporation of αGC.

The effect of different delivery methods for the $EDV_{Covid}$-αGC was then assessed in vivo. Mouse serum samples were collected from treatments administrated through subcutaneous (S.C.), intravenous (I.V.) and Intra-muscular (I.M.) injections and analysed via ELISA levels of IFNα (FIG. 7C; serum IFNα concentration 8 h post-injection), IFNγ (FIG. 7D; serum IFNγ concentration 8 h post-injection), IL12 (FIG. 7E; IL12p40 serum concentration 8 h post-injection), IL6 (FIG. 7F; IL6 serum concentration 8 h post-injection) and TNFα (FIG. 7G; serum TNFα, concentration 8 h post-injection). It was found that $EDV_{Covid}$-αGC administered through I.M. injection was vastly superior at inducing the production of all the cytokines tested in mice at 8 h post-injection.

The difference between the different methods of administration of $EDV_{Covid}$-αGC was further demonstrated when spike protein specific antibodies were analyzed at 1 week post-initial injection. High spike protein specific IgG titre was detected in the serum of EDVCovid-αGC treated mice through I.M. injections compared that of through S.C. injections. It was concluded that due to the high levels of initial interferon response and subsequent high IgG titres, administration of $EDV_{Covid-αGC}$ through I.M. injection was the preferred delivery strategy.

Detailed analysis of initial interferon response following I.M. injections of EDV, $EDV_{αGC}$, $EDV_{Control}$, $EDV_{Control-αGC}$, $EDV_{Covid}$, $EDV_{Covid-αGC}$ showed that the early interferon response in mice was predominantly induced by the administration of αGC carried by EDVs with or without an accompanying antigen-specific plasmid. See FIG. 12A (serum IFNα concentration 8 h post-IM injection); FIG. 12B (serum IFNγ concentration 8 h post-IM injection); FIG. 12C (IL6 serum concentration 8 h post-IM injection); FIG. 12D (serum TNFα, concentration 8 h post-IM injection); and FIG. 12E (IL12p40 serum concentration 8 h post-IM injection)

FACS analysis of mouse splenocytes at 1 week post-injection showed that there is an increase in CD3+ CD8+ cytotoxic T-cell number in the $EDV_{Covid-αGC}$ injected mice as compared to the saline group. AIMS assay was conducted on the ex vivo splenocytes and it was found that there is an increase in viral antigen-specific CD69+ CD137+ population within the cytotoxic T-cell population when stimulated with the spike protein, at a higher level as compared to the PHA stimulated positive controls.

At 4 weeks post-initial injection, the highest levels of spike protein specific IgG and IgM were observed in the serum of the mice that were treated with $EDV_{Covid-αGC}$ administered through I.M. injections. Interestingly, it was also found that the serum of mice treated with $EDV_{Control-αGC}$ also contained spike protein "specific" antibodies. This finding was confirmed by neutralizing antibody analysis. While the serum of mice treated with $EDV_{Covid-αGC}$ contained the highest amount of neutralizing antibodies, serums of mice treated with $EDV_{Control-αGC}$, $EDV_{Covid}$ and $EDV_{αGC}$ also resulted in measurable degree of spike protein to hACE receptor binding inhibition. It appeared that αGC alone has anti-viral properties in which the administration of the compound could result in the inhibition of viral binding to the cells in the body. In contrast, injecting $EDV_{Covid}$ by itself without the addition of αGC was capable of producing neutralizing antibodies in the serum, albeit at much lower levels compared to that of treated with $EDV_{Covid-αGC}$. This demonstrated the importance of incorporating αGC as an immuno-adjuvant in this system as a vital part of a functional vaccine.

To further demonstrate the specificity of the antibody response, B-cells were extracted from the bone marrow of the treated mice at 4 weeks post-initial injection and stimulated with spike protein for 48 h in vitro. B cells from mice treated with $EDV_{Covid-αGC}$ produced the highest level of spike protein specific IgG and IgM as compared to all other treatment groups. FIG. 5B shows the results of mouse experiments, where four groups of mice were evaluated (Group 1=untreated; Group 2=EDVs with no payload; Group 3=administration of free αGC; and Group 4=administration of a bacterial minicell vaccine comprising a combination of SARS-CoV-2 Spike protein and αGC (depicted in FIG. 2A). The data shown in FIG. 5B demonstrates that EDV™-COVID-α-GC was able to effectively deliver α-GC into murine bone marrow derived, JAWSII, cells and presented through CD1d-ligand to a similar efficiency as free α-GC. FIG. 5C shows a Western blot analysis using a polyclonal antibody against the RBD and the S1 subunit, with the results demonstrating the presence of the spike protein within the EDV™-COVID-GC. Incorporation of the bacterially expressed protein into EDV™s occurs during cell division and segregation of the cytoplasmic proteins.

Figures 6E, 6F:
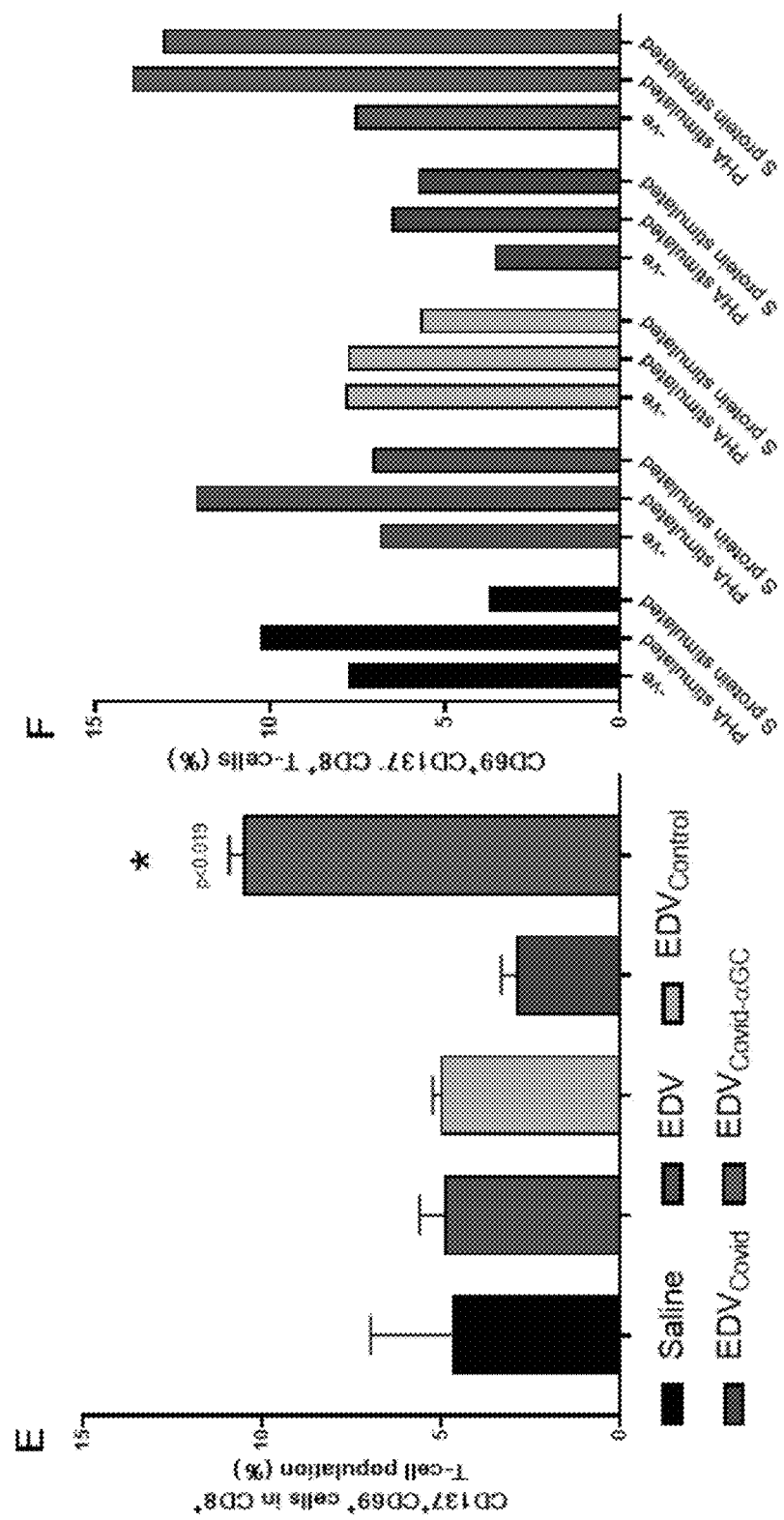

FIG. 6E shows the results of an E-FACS analysis of CD8+ cytotoxic T-cells in mouse splenocytes, demonstrating that mice immunized with $EDV_{COVID-α-GC}$ had the highest amount of antigen-specific memory CD137+CD69+ cytotoxic T-cell at 4 weeks (1 boost at day 21) post-initial injection, e.g., there were significantly high number of CD137+ CD69+ population within the cytotoxic T-cell population in the $EDV_{Covid-αGC}$ treated mice as compared to all other treatment groups. CD137+ signalling is essential in the CD8+ T cell anti-viral response. FIG. 6F shows the results of an ex-vivo AIMS Assay showing Spike antigen specific CD8+ T cell response. There is an increase in the CD69+/CD8+ T cell numbers following the stimulation with Covid Spike protein in the EDV-Covid and EDV-Covid-aGC groups but not in any other groups. PHA was used as a positive control. These results indicate that both plasmid and protein contained within EDVs creates a specific response.

Thus, FACS analysis of ex vivo splenocytes from treated mice showed that $EDV_{Covid-αGC}$ treatment resulted in an increase in CD69+ CD137+ cytotoxic T-cells as compared to all other treatment conditions. It was also observed that when the ex vivo spherocytes were stimulated with the spike protein, there was an increase in viral antigen specific CD69+ CD137– cells within the cytotoxic T-cell population at a similar rate compared to the PHA stimulated positive controls from $EDV_{Covid-αGC}$ and $EDV_{Covid}$ treated mice. This was not observed in all the other treatment groups. It indicates that, unlike the anti-viral response triggered by $EDV_{Covid-αGC}$ treatment, the anti-viral property of αGC may be broad spectrum and not antigen-specific.

Example 3

The purpose of this example was to demonstrate immunity generated against a SARS-CoV-2 variant using a vaccine composition described herein.

Two SARS-CoV-2 variants of concern are the UK (B.1.1.7) variant and the South Africa (B.1.351) variant. The UK (B.1.1.7) variant, also known as the Alpha SARS-CoV-2 variant, has been reported to have a rate of transmission 71% higher than other variants (*BMJ*, "Covid-19: What have we learned about the new variant in the UK?" Dec. 23, 2020). One report noted that the UK variant seemingly achieved dominance by outcompeting an existing population of circulating variants, which is strongly suggestive of natural selection of a virus that is more transmissible at a population level (Lauring et al., "Genetic Variants of SARS-CoV-2-What do They Mean?" *JAMA*, 325(6):529-531 (Feb. 9, 2021)). The South Africa (B.1.351) variant is associated with increased transmissibility, a higher viral load, and is defined by an unusually large number of mutations. (www.thermofisher.com/blog/ask-a-scientist/what-you-need-to-know-about-the-501y-v2-b-1-351-south-african-variant-of-sars-cov-2/, accessed on Jul. 16, 2021).

Figures 7A, 7B:
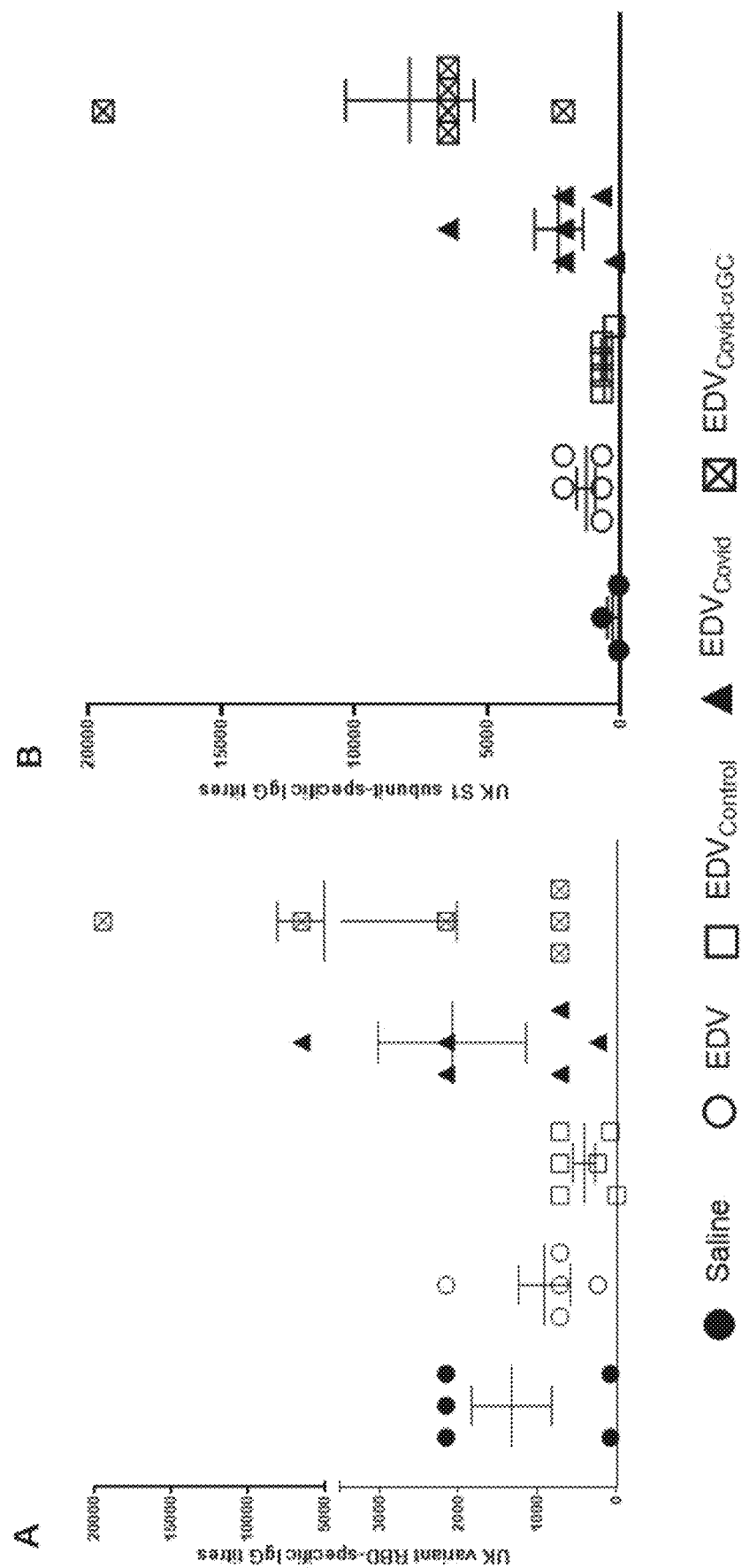
Figures 7C, 7D:
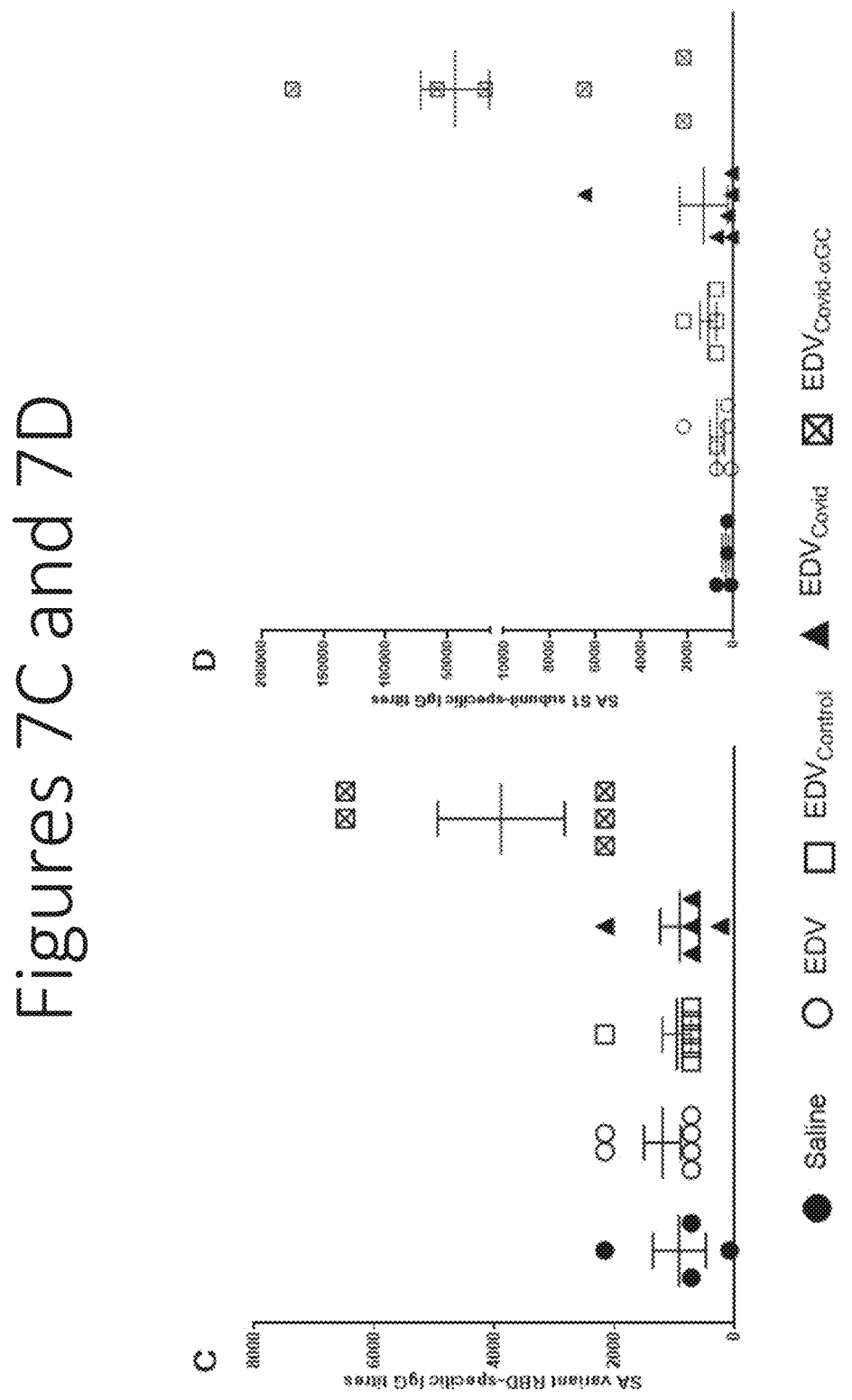
Figure 8:
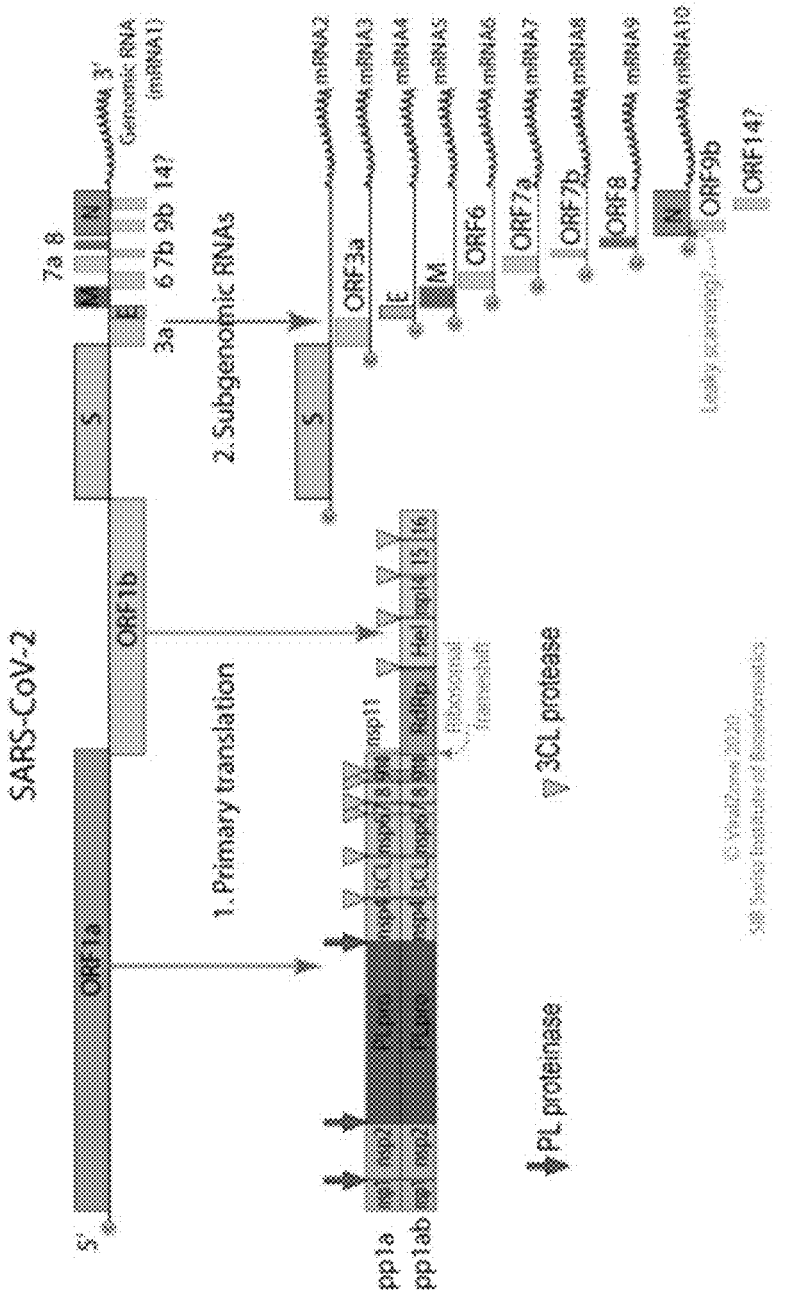
FIG. 8 shows the genome of the SARS-CoV-2 virus, identifying transcription sites and protein coding domains. www.viralzone.espasy.ort/resources/nCoV_genome_bis.png.

FIGS. 7A-7D show the robustness of the immunity generated by EDV-COVID-α-GC by analyzing the specificity and cross-reactivity of the serum IgG from immunized mice against the RBD and S1 subunits of the UK (B.1.1.7) and South Africa (B.1.351) variants of the virus. The results showed that, while UK variant RBD-specific IgG was produced in some of the EDV-COVID-α-GC immunized mice (FIG. 7A), a much greater S1-specific IgG antibody titer was observed (FIG. 7B), indicating the binding of the S protein-specific antibody lands mainly outside of the RBD. A similar trend was observed for the SA variant (FIGS. 7C and D).

This data demonstrates the surprising broad effectiveness of the vaccine compositions of the disclosure against SARS-CoV-2 variants.

Example 4

The purpose of this example was to demonstrate immunity generated against a SARS-CoV-2 variant using a vaccine composition described herein.

Five groups of mice were administered a COVID variant vaccine as described herein and various controls. The five groups of mice (n=6 per group; ELISA samples run in triplicate) were: Group 1=saline; Group 2=EDV (bacterial minicell with no payload); Group 3=$EDV_{control}$ (EDVs carrying the plasmid with no insert expressing the Spike protein i.e. plasmid backbone only); Group 4=$EDV_{Covid}$ (bacterial minicell comprising the plasmid and the encoded SARS-CoV-2 Spike protein) and Group 5=$EDV_{Covid+\alpha GC}$ (construct shown in FIG. 2A).

FIGS. 10A-D show the results of IgG titres following administration of $3\times10^9$ EDVs to the five different groups of mice on days 1 and 21, with serum analysis at day 28. The results shown in FIGS. 10A-D, detailing S1 subunit-specific IgG titres at day 28, demonstrate that serum IgG titres obtained from mice treated with EDV-COVID-GC binds strongly to all four mutant virus Spike proteins: (1) SARS-CoV-2 variant Alpha (B.1.1.7.UK) (FIG. 10A); (2) SARS-CoV-2 variant Beta (B.1.351. SA) (FIG. 10B); (3) SARS-CoV-2 variant Delta (B.1.617.2 India); and (4) SARS-CoV-2 variant Gamma (P.1 Brazil).

This data demonstrates the surprising broad effectiveness of the vaccine compositions of the disclosure against SARS-CoV-2 variants.

Example 5

The purpose of this example is to describe a clinical trial that is proposed to be conducted using a COVID-19 vaccine as described herein.

The clinical trial in healthy volunteers will comprise injecting intramuscularly $8\times10^9$ EDV-COVID-GC (FIG. 2A) on days, 1, 21 and serum analysis on day 28 and 3 months. The results are expected to demonstrate immunity generated against SARS-CoV-2 variants, as measured by IgG analysis.

Example 6

This example describes a Phase I/IIa, open label study to determine the safety of EDV nanocells packaged with a plasmid encoding SARS-CoV-2 spike protein in the EDV and a glycolipid α-galactosyl ceramide (EDV-plasmid-spike-GC) in non-COVID-19 infected volunteers, 18 years and older.

All participants were otherwise healthy and did not report any history of chronic health conditions. Subjects were identified as SARS-CoV-2 naive via PCR test and naïve for prior COVID-19 vaccines. All subjects received a dose of $9\times10^9$ EDV-COVID-αGC with an equal booster dose at day 21. All doses were administered in clinic with 3 hour safety monitoring on dosing days, including vital signs, laboratory tests and adverse event monitoring.

Samples were collected at 4 time points: pre-vaccine baseline (time point 1), day 21 before the booster vaccination (time point 2), and day 28 one week post-boost (time point 4). Subjects are also scheduled to return for a 3 month and 6 month time point. Each study visit included collection of 20 mL of peripheral blood. The study began in September 2021 and at time of submission there are a number of volunteers that have come forward to be part of the study. Full data (all time points) is presented here for six volunteers.

Animal studies: Female BALB/C mice, 6-8 weeks old were obtained from the Animal Resource Centre in Western Australia. The mice were acclimatized for one week before the experiments commenced. Treatment groups (n=4-10 depending on experiment) included EDV-COVID-αGC as well as control groups consisting of saline, EDV, EDV-αGC, EDV-CONTROL (Control Plasmid) and EDV-COVID. Initial experiments involved a $2\times10^9$ i.m. particle dose into a single flank at day 0, followed by a booster of $1\times10^9$ at day 21. Subsequent experiments applied a higher i.m. only dose of $3\times10^9$ particles split into $1.5\times10^9$ per back flank due to limitations of particle volume/concentration acceptable per flank, with a boost of the same dose and mode of delivery at day 21. Depending on the experiment, serum and tissues were collected at 8 h, day 7, day 21 and day 28 post-initial injection. Blood was collected via heart puncture immediately following euthanasia, or tail bleeding for ongoing analysis. Other tissues harvested include spleen, lymph nodes, and bone marrow from the femur.

Methods Details

Recombinant CoV proteins and antibodies: SARS-CoV-2 spike proteins were purchased from ACRObiosystems Inc. SARS-CoV-2 (Cov-19) S protein, His Tag, super stable trimer (MALS & NS-EM verified) (Cat. #SPN-C52H9) was used in early experiments to analyze IgG and IgM response as well as for Activated Immune Cell Marker assays (AIM). Subsequently, with the emergence of new variants of concern and increased availability of recombinant proteins, the following were purchased: SARS-CoV-2 UK Alpha S1 protein (HV69-70del, Y144del, N501Y, A570D, D614G, P681H, T716I, S982A, D1118H), His Tag (Cat. #SPN-C52H6); SARS-CoV-2 S UK Alpha protein RBD (N501Y), His Tag (Cat. #SPD-C52Hn); SARS-CoV-2 SA Beta S protein (L18F, D80A, D215G, 242-244del, R246I, K417N, E484K, N501Y, D614G, A701V) trimer 50 ug Cat. #SPN-C52Hk; SARS-CoV-2 SA Beta S protein RBD (K417N, E484K, N501Y), His Tag (MALS verified) (Cat. #SPD- C52Hp); SARS-CoV-2 Brazil Gamma S1 protein (L18F, T20N, P26S, D138Y, R190S, K417T, E484K, N501Y, D614G, H655Y, T1027I, V11 (Cat. #SPN-C52Hg); SARS-CoV-2 India Delta spike S1 (T95I, G142D, E154K, L452R, E484Q, D614G, P681R), His Tag (Cat. #S1N-C52Ht); SARS-CoV-2 Omicron spike protein RP (RBD, G339D, S371L, S373P, S375F, K417N, N440K, G446S, S477N, T478K, E484A, Q493R, G496S, Q498R, N501Y, Y505H, His Tag)-RP (Cat #Z03730).

SARS-CoV-2 (COVID-19) spike antibody against the S1 and S2 subunits, were purchased from Genetex (Cat. #GTX135356 and #GTX632604) for western blot confirmation of S protein within EDV™. SARS-CoV-2 (2019-nCoV) spike RBD rabbit PAb, antigen affinity purified (Cat. #40592-T62, Sino Biological) was used for quantitation of the S protein within EDVs using ELISA.

Cell lines: JAWSII mouse bone marrow derived dendritic cells (ATCC© CRL-11904™) were grown in α-minimum essential medium with ribonucleosides and deoxyribonucleosides (4 mM L-glut, 1 mM Sodium Pyruvate, 5 ng/ml GMCSF and 20% FBS) at 37° C., 5% $CO_2$.

Generation of plasmid expressing SARS-CoV-2 S protein under bacterial promoter: An expression cassette was generated by placing the coding nucleotide sequence for SARS-CoV-2 (Covid-19) spike protein (Wuhan sequence; GenBank MN908947.3) on the 3'-end of a modified β-lactamase promoter, which has been previously used for expression in Salmonella typhimurium strains (Su et al., 1992). The expression cassette was then inserted between the KpnI 5' and SalI 3' sites of the M13 multiple cloning site of pUC57-Kan backbone plasmid to create pLac-CoV2. The sequence was optimised for S. typhimurium codon usage before manufacturing by Genscript services. A negative control plasmid, pLac-control, was created as above by removing the CoV2 sequence from the pLac-CoV2 (FIGS. 5C and D & 11 Å-K). Cloning of pLac-CoV2 and pLac into Salmonella Typhimurium EDV Producing Strain and the Assessment of Plasmid and S Protein within EDVs Cloning: PLac-Cov2 and pLac-CoV2-control were electroporated into a chemically competent S. typhimurium intermediate strain, which lacks a plasmid restriction mechanism, using a Gene Pulser Xcell™ (Bio-Rad, Hercules CA). Transformants were recovered in TSB medium for 1.5 h at 37° C. before plating on TSB agar plates containing 75 µg/mL kanamycin (Sigma-Aldrich, St. Louis, Missouri). Isolates were picked into TSB broth with 75 µg/mL kanamycin and plasmid DNA was extracted using the Qiagen miniprep kit as per manufacturer's instructions (Qiagen, Hilden, Germany). Subsequently, the extracted plasmid DNA from the 4004 strain was electroporated as above into the EDV™ producing S. typhimurium strain (ENSm001). Clones containing pLac-CoV2 produce the encoded Covid-19 spike protein, which along with the plasmid DNA, becomes incorporated into EDVs during cell division to produce EDV-COVID. The EDVs containing pLac (EDV-CONTROL) were created in the same way to be used as a negative control.

To determine the plasmid content of EDV-COVID and EDV-CONTROL, plasmids were extracted from $2 \times 10^9$ EDVs using a Qiaprep Spin miniprep kit (Qiagen) following the manufacturer's instructions. Empty EDV were processed in the same manner as a control. The quantity of DNA plasmids was then measured by absorption at $OD_{260nm}$ using a biophotometer (Eppendorf). The copy number of the plasmids were calculated using:

$$\text{Number of copies} = \frac{\text{amount} \times 6.22 \times 10^{23}}{\text{length} \times 10^9 \times 660}$$

Western Blot: Proteins from $2 \times 10^{10}$ EDV-COVID were extracted using 100 µL B-PER™ (Bacterial Protein Extraction Reagent; ThermoFisher) supplemented with 10% (v/v) lysozyme (Sigma-Aldrich) and 1% (v/v) DNase I (Qiagen). The extracted samples were then centrifuged at 12000 g for 10 min and the supernatant was collected. The pellet was also collected and resuspended in 100 µL PBS. 23 µL of the supernatant and pellet protein samples were co-incubated with 5 µL of loading buffer and 2 µL DTT (Sigma-Aldrich) at 80° C. for 20 min before the entire content of each sample was loaded onto a NuPAGE 4-12% Bis-Tris Mini Protein Gel (ThermoFisher) and run at 190 V for ~80 min. The gel was then transferred using the iBlot 2 system (ThermoFisher) after which the membrane was blocked using SuperBlock™ blocking buffer (ThermoFisher) and subsequently stained with 1:1000 Rabbit poly-clonal anti-SARS-CoV-2 spike (S1) antibody (Genetex) or 1:1000 mouse mono-clonal anti-SARS-CoV-2 spike (S2) antibody (Genetex) and incubated overnight at 4° C. The membrane was then washed with PBST and incubated with HRP conjugated anti-rabbit (1:5000) (Abcam) or anti-mouse (1:5000) (ThermoFisher) IgG secondary antibody for 1 h at RT. The blot was developed using Lumi-Light Western Blot substrate (Roche) and visualized using a Chemidoc MP (Bio-Rad).

EDV S protein estimation by ELISA: $4 \times 10^9$ EDV-COVID particles were pelleted by centrifugation at 13000 g for 8 min. 100 µL of B-Per™ Bacteria lysis agent supplemented with 100 µg/reaction of lysozyme (Sigma) and 5 U/reaction rDNase I (Macherey-Nagel) was added to each sample and incubated on a vortex shaker for 2 h at 600 rpm at RT. The samples were then mixed with 1:5 Dithiothreitol (ThermoFisher) and placed on an 80° C. heat block (Eppendorf) at 600 rpm agitation for a further 20 min. Protein quantity was assayed using the DC Protein Assay kit (Bio-rad) following the manufacturer's specifications.

Standards were generated through serial dilution of the spike protein (ACRObiosystems) to achieve the following concentrations: 2000, 1000, 500, 250, 125, 62.5, 31.3 µg/mL. EDV-COVID S protein samples were diluted 1:1000 in PBS. Standards and EDV spike protein samples, were then coated on the ELISA plate, sealed, and incubated O/N at 4° C. The plates were then washed 3 times with 300 µL PBST using a plate washer. 200 µL protein free blocking buffer (Astral Scientific) was added to the plate which was sealed and incubated at RT for 1 h.

Spike RBD Rabbit PAb detection antibody (Sino Biological) was diluted 1:10000 in 10 mL PBST and 100 µL per well was added and incubated for 1 h at RT. The plate was washed in PBST as above before addition of 100 µL sheep anti-rabbit IgG (H+L)-peroxidase (Merck, 1:10000) in 10 mL PBST. Sealed plates were incubated for 30 min at RT in the dark. The plate was washed again as above and 100 µL of TMB solution (ThermoFisher) was added per well. The reaction was stopped by adding 50 µL of 2 M $H_2SO_4$ per well within minutes of TMB addition. The samples were analyzed at $OD_{450nm}$ using a pQuant plate reader (Bio-TEK Instruments, Inc.) and KC junior software.

α-galactosylceramide loading into EDV-COVID: EDV-COVID nanoparticles carrying the S protein were purified in large batches through bio-fermentation of the parent bacteria S. typhimurium, followed by tangential flow filtration (TFF) to purify the EDV-COVID particles from the parent as previously described (MacDiarmid et al., 2007). EDV-COVID particles were then buffer exchanged from media into PBS pH 7.4 (Dulbecco's; ThermoFisher) complemented with 0.5% tyloxapol (Sigma-Aldrich) prior to loading with αGC based on a protocol described in Singh et al (2014).

α-galactosylceramide glycolipid adjuvant (αGC; Advanced Molecular Technologies, Melbourne) stocks were formulated in 100% DMSO (Sigma). Stock αGC was added to EDV-COVID solutions in PBS at a final concentration of 10 μM (8.58 μg/mL equivalent). Co-incubation of EDV-COVID particles and αGC was performed at 37° C. with mixing overnight. Unloaded αGC was removed by washing the particles in PBS pH 7.4 (Dulbecco's; ThermoFisher) through a 0.2 μm TFF system. EDV-COVID-αGC particles were then concentrated in PBS pH 7.4 followed by buffer exchange to 200 mM Trehalose (Cat. #T9531, Sigma) ready for vial filling and freeze-drying.

EDV-COVID-αGC batch vials underwent quality control testing including particle count, uniformity, sterility, S protein concentration, plasmid copy number and αGC concentration per $10^9$ EDV particles, prior to use in animal experiments. Activity of loaded αGC through dendritic cell (DC) uptake and presentation through the CD1d T cell receptor was carried out as described below.

αGC uptake and presentation by murine DCs: JAWSII cells (ATCC) were treated with EDV-COVID-αGC in a 96-well Perfecta3D hanging drop plate (Sigma-Aldrich) at $1\times10^9$ EDV-COVID-αGC per cell. JAWSII cells treated with 2 μg/mL αGC (Advanced Molecular Technologies) served as a positive control. The cultures were then incubated for 24 h at 37° C. with 5% $CO_2$ and cells were collected and stained with a PE conjugated CD1d: αGC complex antibody (ThermoFisher, 1:2000) and analyzed using a Gallios flow cytometer (Beckman). The results were analyzed using Kaluza Analysis software (V.2.1, Beckman).

Detection of spike protein and CD1d associated αGC in murine DCs following EDV-COVID-αGC co-incubation: JAWSII cells (ATCC) were seeded onto a 96 well hanging drop plate (Sigma-Aldrich) at $5\times10^4$ cells/well. EDV only, EDV-αGC, EDV-CONTROL, EDV-COVID and EDV-COVID-αGC were co-incubated with the cells at $1\times10^9$ EDVs per well. Untreated JAWSII cells were used as controls. The samples were cultured at 37° C. with 5% $CO_2$ for 48 h before collected and co-stained with PE anti-mouse αGC:CD1d complex antibody (ThermoFisher, 1:2000) and SARS-CoV-2 S1 protein polyclonal primary antibody (Genetex, 1:2000) at room temperature for 30 min in the dark. The samples were then stained with Alexa Fluor 647 goat anti-rabbit IgG (H+L) highly cross-adsorbed secondary antibody (ThermoFisher, 1:1000) at 4° C. for a further 20 min and analysed using a Gallios flow cytometer (Beckman Coulter). Mouse IgG2a and rabbit IgG (Biolegend) were used as isotype controls. DAPI was used to differentiate live/dead cells and single stained samples were used to generate compensation. The samples were analysed using the Kaluza analysis software (V2.1, Beckman Coulter).

Extraction of αGC from EDV-COVID-αGC for quantitation: An αGC extraction method was adapted from previous similar studies (Sartorius et al., 2018; von Gerichten et al., 2017). The necessary number of EDV vials were taken to achieve a total of $4\times10^{10}$ EDVs per sample for extraction of αGC. An EDV only sample was used as a negative control.

All lyophilized vials were resuspended in 400 μL of PBS (Dulbecco's $Ca^{2+}$ $Mg^{2+}$ free, ThermoFisher). Each sample was aliquoted to give ~$2\times10^{10}$ EDVs per sample in Eppendorf tubes (i.e., two tubes per sample) and all samples were centrifuged @ 13200 rpm for 7.5 min. The supernatant was removed from each sample and the EDV pellets were resuspended in 800 μL PBS for each $2\times10^{10}$ and centrifuged again as above. The supernatant was removed once again, and all samples were resuspended in 500 μL of UltraPure™ $H_2O$ (ThermoFisher).

For α-GC extraction, each 500 μL sample was transferred to a conical bottom 2 mL microtube (Axygen). One stainless steel bead (5 mm) was added to each sample and samples were then homogenized using agitation on the Qiagen TissueLyser II homogeniser (Qiagen). Homogenisation was carried out in two rounds of 2 min agitations at 25 Hz with a brief stoppage between sets. Lysates were then removed to fresh tubes combining 500 μL aliquots from each sample to give a 1 mL sample (leaving the bead behind).

Each 1 mL sample was then extracted for lipids by adding 1 mL of chloroform/methanol (2:1 CHCl3:MeOH ratio), shaking vigorously by hand and incubating at 37° C. for 15 min with sonication every 5 min for 1 min. Following 15 min, samples were centrifuged at 2000 g for 10 min in a benchtop micro centrifuge. The organic layer (bottom) was removed to a fresh tube. The samples were then dried before analysis.

Quantitative LC-MS/MS Analysis of αGC: The standard, α-galactosylceramide (αGC), and the internal standard (IS), D-galactosyl-β-1,1'N-palmitoyl-D-erythro-sphingosine were dissolved in DMSO to 1 mM or 2 mM with heating at 60-80° C. for 5 min if necessary to dissolve. Prior to data acquisition the standard stock solution was used to prepare stock dilutions in MEOH:$H_2O$ (95:5). A working IS dilution was prepared with final concentration of 200 ng/mL.

Standards were prepared by using five calibration points of αGC (STD) (62.5, 125, 250, 500, and 1 000 ng/mL) spiked with 200 ng/mL IS (Sartorius et al., 2018). The standard: IS area ratios were used as calibration curve (CC) points or linearity against which the unknown samples were quantified. The samples were dried and reconstituted in 1 ml of working IS dilution.

Samples were acquired along with the freshly prepared CC standards on a TSQ Altis (ThermoFisher) triple quadruple mass spectrometer (MS) interfaced with Vanquish (ThermoFisher) UHPLC (Ultra High-Performance Liquid Chromatography) (LC). The LC-MS instrument method employed for data acquisition was optimised as per Sartorius et al. (2017) (Sartorius et al., 2018). Xcalibur and TraceFinder software were used for data acquisition and analysis respectively (ThermoFisher).

The chromatographic analysis (LC) was performed on an Acquity BEH Phenyl column (Waters, 100×2.1 mm, 1.7 m), eluted with a short gradient program from 95:5 MeOH/H2O to 100% MeOH in 1 min followed by an isocratic elution at 100% MeOH for 4 min. Flow rate was set at 0.4 mL/min and column temperature at 40° C. αGC eluted at a RT of 1.53 min, IS at 1.07 min. Two MRM transitions were monitored for both STD and IS for quantitative purposes and to confirm analytical identification. The most intense transitions for each compound (i.e., m/z 856.7>178.9 for STD and m/z 698.5>89.2 for IS) were used as analytical responses.

Isolation of Serum: Whole blood samples in SST vacutainers (VACUETTE®) were allowed to clot at RT for 1 h. After centrifugation for 10 min at 800 g the serum layer was aliquoted and stored at −80° C. for SARS-CoV-2 specific antibody detection by ELISA and neutralizing antibody assays.

Murine splenocyte isolation: Tissue suspensions were isolated from dissected spleens of treated BALB/C mice using a Dounce homogenizer and resuspended in RPMI-1640 medium (Sigma-Aldrich). The homogenized tissue was then filtered through sterile 70 μm MACS SmartStrainers (Miltenyi Biotec) and incubated with Red Cell Lysing Buffer Hybri-Max™ (Sigma-Aldrich) as recommended by the manufacturer. Cells were then resuspended in 2.5 mL of autoMACS running buffer (Miltenyi Biotec) and passed through a 70 μm MACS SmartStrainer to obtain a single-cell suspension.

Cytokine ELISA: IFNγ, TNFα, IL-6, IFNα, IL-12p40, IL-10, IL-2 and IL-4 from mouse sera were measured using DuoSet® ELISA kits from R&D Systems according to manufacturer's instructions. Serum levels of IL-21 was analyzed using a LEGEND MAX Mouse IL-21 ELISA kit (Biolegend) following the manufacturer's instructions. Cytokine concentration was determined by calculating absorbance of the samples against standard curves constructed within the same assay using purified material.

S-protein RBD and S1 IgG/IgM serum titer ELISA: For analysis of anti-RBD specific IgG and IgM antibodies, 96-well plates (Immulon 4 HBX; Thermo Fisher Scientific) were coated at 4° C. with 50 μL per well of a 2 μg/mL solution of RBD or S1 protein of the corresponding variant being tested (ACRObiosystems) suspended in PBS (GIBCO). On the following day, the coating protein solution was removed and 100 μL of 3% skim milk blocking solution in PBS/0.1% Tween 20 (PBST) or protein free blocking solution (G-Biosciences) was added and incubated at RT for 1 h. Serial dilutions of mouse serum were prepared in 1% skim milk/PBST or protein free blocking solution. The blocking solution was removed and 100 μL of each serum sample was added to the plates and incubated for 2 h at RT. Following incubation, the wells were washed three times with 250 μL of 0.1% PBST, before adding 100 μL of goat anti-mouse IgG (H+L) or IgM (Heavy)-horseradish peroxidase (RP) conjugated secondary antibody (ThermoFisher, 1:3000) prepared in 0.1% PBST. The samples were incubated at RT for 1 h and washed three times with 0.1% PBST. Once completely dry, the samples were visualized by incubating with TMB. The reactions were then terminated, and the samples were read at $OD_{490nm}$ using a KC Junior plate reader (BioTek Instruments).

Antibody titer was determined using ELISA by generating 1:3 serial dilution of the treated mouse serum samples and is expressed as the inverse of the highest dilution with a positive result.

B cell extraction from murine bone marrow: 0.5 mL microfuge tubes were punctured at the base with a 21-gauge needle and placed inside a 2 mL tube. The isolated murine tibia and femur were placed in the 1 mL tubes with the cut side of the bone at the bottom. Bone marrow cells were extracted from the tibia and femur via 30 s centrifugation at >10000 g. Pelleted cells were resuspended in 1 mL RPMI-1640 medium (Sigma-Aldrich) and incubated with Hybri-Max™ Red Cell Lysing Buffer (Sigma-Aldrich) for 5 min. The lysis buffer was neutralized with 15 mL of RPMI-1640 medium supplemented with 10% Fetal Bovine Serum (FBS) (Interpath) and centrifuged at 300 g for 10 min. Cells were resuspended in a final volume of 10 mL of RPMI-1640 medium for final counting. B cells were isolated using the Pan B Cell Isolation Kit (Miltenyi Biotec) as per manufacturers' instructions.

B cell stimulation and ELISA: ELISA micro plates were coated with 2 μg/mL SARS-CoV-2 spike protein trimer (ACRObiosystems) and incubated overnight at 4° C. Microplates were washed 3× with phosphate-buffered saline (PBS) and blocked with 200 μl/well of Protein-Free Blocking Buffer PBST (G-Biosciences) for 2 h at RT.

Mouse splenocytes were isolated from treated mice and $1\times10^5$ cells were seeded into each well in 200 μL AIMV media and incubated at 37° C. for 48 h.

At the end of the incubation period, the cells were removed from each well and each microplate was washed 5× with 200 μL/well of 0.05% Tween 20 in PBST. The samples were then incubated in 100 μL/well of 1:5000 mouse IgG-RP in PBST for 2 h at RT in the dark before washing 3× in 250 μL PBST. The presence of Covid specific IgG was detected by adding 100 μL/well of TMB Substrate System and allowed to incubate up to 20 min or until color solution formed. Enzyme reaction was stopped by adding 50 μL/well of 2N H2SO4 Stop Solution. The samples were analyzed using a CLARIOstar microplate reader (BMG LABTECH) at $OD_{450nm}$ with $OD_{540nm}$ as the reference wavelength and analyzed using the MARS software.

Activation-Induced Markers (AIM) Assay: Isolated spleen cells were seeded at $1\times10^6$ cells/200 μL/well in AIMV (Life Technologies) serum free media in a 96-well U-bottom plate. Cells were stimulated with 1 μg/mL SARS-CoV-2 trimer (ACRObiosystems) for 24 h at 37° C., 5% $CO_2$. 1 μg/mL DMSO was used as a negative control and 10 μg/mL PHA (Sigma) as a positive control. After 24 h of stimulation, samples were collected in 1.5 mL microfuge tubes by pipetting up and down to collect the cells and centrifuged at 300 g for 10 min. The supernatant was collected and frozen for processing for IFNγ by ELISA (DuoSet, R&D Systems).

For T-cell activation staining the cell pellets from above were washed twice in 500 μL FACS buffer, centrifuging as above. Final cell pellets were resuspended in 500 μL FACS buffer and stained with the appropriate antibody (included in the kit) for 30 min at RT in the dark. Cells were then centrifuged at 300 g for 5 min and washed twice with 500 μL FACS buffer. Cells were then fixed in 1% paraformaldehyde for 10 min at 4° C. and after that centrifuged at 300 g for 5 min again. Final resuspension was in 300 μL of FACS buffer before analyzing on a Gallios flow cytometer (Beckman). Single stain samples and mouse IgG isotype controls were used to create compensation for the staining.

Th1/Th2 Phenotyping: Th1/Th2 phenotyping was carried using the Mouse Th1/Th2/Th17 phenotyping kit (BD). Firstly, as per AIM assay, isolated spleen cells were seeded at $1\times10^6$ cells/200 μL/well in AIMV (Life Technologies) serum free media in a 96-well U-bottom plate. Cells were stimulated with 1 μg/mL SARS-CoV-2 trimer (ACRObiosystems) for 24 h at 37° C., 5% $CO_2$. 1 μg/mL DMSO was used as a negative control. After 24 h of stimulation, 1 μL of BD GolgiStop™ (protein transport inhibitor; BD) per 200 μL/well of cell culture was added, mixed thoroughly, and incubated for a further 2 h at 37° C. Cells were then centrifuged at 250 g for 10 min and washed 2 times with stain buffer (FBS) (BD). The cells were counted and approximately 1 million cells were transferred to each flow test tube for immunofluorescent staining as per manufacturer's instructions. Cells were protected from light throughout the staining procedure. Firstly, cells were fixed by spinning at 250 g for 10 min at RT and thoroughly resuspending in 1 mL of cold BD Cytofix™ buffer (BD) and incubated for 10-20 min at RT. Following fixation cells were pelleted at 250 g for 10 min at RT and washed twice at RT in stain buffer (FBS). The stain buffer was removed by spinning and the cell pellet was resuspended in 1×BD Perm/Wash™ buffer (BD) diluted in distilled water, and incubated at RT for 15 min. Cells were spun down at 250 g for 10 min at RT and the supernatant removed. For staining, the fixed/permeabilized cells were thoroughly resuspended in 50 µL of BD Perm/Wash™ buffer incubated with 20 µL/tube of cocktail included in the kit (Mouse CD4 PerCP-Cy5.5 (clone: RM4-5), Mouse IL-17A PE (clone: TC11-18H10.1), Mouse IFN-GMA FITC (clone: XMG1.2), Mouse IL-4 APC (clone: 11B11) or appropriate negative control. Samples were incubated at RT for 30 min in the dark before proceeding to FACs analysis on a Gallios flow cytometer (Beckman). Compensation was performed manually for each channel using single stained controls.

SARS-CoV-2 Surrogate Virus Neutralization Test (Mouse and Human samples): Assessment of neutralizing antibodies was carried out using the FDA approved "cPASS SARS-CoV-2 Surrogate Virus Neutralization Test Kit" (Genscript) (Tan et al., 2020). The kit is a blocking ELISA detection tool mimicking the virus neutralization process, suitable for use with serum from mice and other species. The capture plate is precoated with hACE2 protein. The necessary of hACE2 coated plate strips were placed on the plate and the remainder stored at 2-8° C. RP-RBD (Wuhan, Genscript) was diluted 1:1000 in HRP dilution buffer provided to a total of 10 mL as per protocol. Mouse and human serum samples, PBMC supernatant and positive and negative controls were diluted 1:10 (10 µL+90 µL sample dilution buffer) and pre-incubated with HRP-RBD in a 1:1 ratio (60 µL+60 µL) to allow binding of neutralizing Abs with HRP-RBD. Mixes were incubated at 37° C. for 30 min. 100 µL of samples or controls were added to the appropriate wells. The plate was covered with plate sealer and incubated at 37° C. for 15 min. The sealer was then removed and the plate washed 4 times with 260 µL of 1× wash solution. The plate was pat dried after washing. 100 µL of TMB solution was then added to each well and the plate incubated in the dark at RT for up to 15 min. 50 µL of stop solution was added to terminate the reactions. Absorbance was analyzed at $OD_{450nm}$ immediately using a CLARIOstar microplate reader. HACE2 receptor binding inhibition was calculated using the formula provided by the manufacturer (% inhibition=1−(OD value of sample/OD value of negative control)×100%. As per spec sheet a positive value was interpreted as >30% and a negative as <30%.

For the assessment of neutralizing antibodies against variant SARS-CoV-2 strains the following HRP-RBD proteins were purchased from Genscript for substitution into the cPASS kit: SARS-CoV-2 Alpha spike protein (RBD, E484K, K417N, N501Y, Avi & His tag)-RP, SARS-CoV-2 Beta spike protein (RBD, N501Y, Avi & His tag)-RP, SARS-CoV-2 Gamma spike protein (RBD, E484K, K417T, N501Y, Avi & His Tag)-RP, SARS-CoV-2 Delta spike protein (RBD, L452R, T478K, Avi & His Tag)-HRP, SARS-CoV-2 Omicron spike protein HRP (RBD, G339D, S371L, S373P, S375F, K417N, N440K, G446S, S477N, T478K, E484A, Q493R, G496S, Q498R, N501Y, Y505H, His Tag)-HRP.

Neutralizing titer analysis: Serum samples were diluted in 1:1, 1:10, 1:20, 1:40, 1:80, 1:160, 1:320 and 1:640, and analyzed using the FDA approved "cPASS SARS-CoVv-2 Surrogate Virus Neutralization Test Kit" against the wildtype SARS-CoV-2 virus as described previously. The neutralizing titer was determined as the final serum dilution from which resulted in a RBD to hACE2 binding inhibition of greater or equal than 30%.

FACS analysis of T cells and B cells in Human Samples: T cell analysis was conducted using DuraClone IM T cell subsets tube (Beckman Coulter). $1\times10^6$ purified PBMCs were added to the tubes directly in 100 µL and incubated at RT for 30 min in the dark. The samples were then pelleted at 300 g for 5 min and washed once in 3 mL of PBS. The final samples were resuspended in 500 µL of PBS with 0.1% formaldehyde. The compensation for the assay was generated using the Compensation Kit provided in the IM Dura-Clone T cell subset tube using purified PBMCs.

Volunteer PBMCs were analysed using SARS-CoV-2 Spike B Cell Analysis Kit, human (Miltenyi Biotec). In short, PBMCs were stained with SARS-CoV2 spike protein-Biotin then co-labelled with Streptavidin PE and Streptavidin PE-Vio 770 to eliminative the chance of non-specific binding. The cells were then stained with 7AAD, CD19, CD27, IgG, and IgM before analysed using FACS. All compensations were conducted using UltraComp eBeads™ Plus Compensation Beads (ThermoFisher). Samples were analysed using a Gallios flow cytometer (Beckman Coulter) and analysed using the Kaluza software (Beckman Coulter).

Samples were processed using a Gallios flow cytometer (Beckman) and the results were analyzed using the Kaluza Analysis software (ver 2.1, Beckman).

Activation-Induced Markers (AIM) Assay in Human samples: Volunteer PBMCs were seeded at $1\times10^6$ cells/200 µL/well in AIMV (Life Technologies) serum free media in a 96-well U-bottom plate. Cells were stimulated with 2 µg/mL SARS-CoV-2 trimer (ACRObiosystems) for 24 h at 37° C., 5% $CO_2$. 2 µg/mL DMSO was used as a negative control and PHA (eBiosciences) as a positive control. After 24 h of stimulation, samples were collected in 1.5 mL microfuge tubes by pipetting up and down to collect the cells and centrifuged at 300 g for 10 min. The supernatant was collected and frozen for processing for IFNγ by ELISA (DuoSet, R&D Systems) and for SARS-CoV-2 wildtype surrogate virus neutralization test using the cPASS kit (Genscript). The negative controls of the samples were also used for IL-21 analysis using IL-21 Human ELISA kit (ThermoFisher) following the manufacturer's instructions.

Results: SARS-CoV-2 EDV formulation and dual antigen presentation: Cancer therapeutic EDVs are packaged with a cytotoxic payload and targeted to cancer cells via scFv bispecific antibodies specific to EDV lipopolysaccharide and cancer cell receptors such as EGFR (MacDiarmid et al., 2007). In this example, EDV-COVID-αGC was created, which is a dual packaged nanocell carrying both the SARS-CoV-2 spike protein and the glycolipid adjuvant, α-galactosylceramide (FIG. 11A). The pLac-CoV2 bacterial recombinant plasmid expressing SARS-CoV-2 S-protein under a modified β-lactamase promoter (FIG. 11B), was transformed into the EDV producing *S. typhimurium* and purified EDV-COVID nanocells were shown to contain both subunits of the S-protein by western blot using a polyclonal antibody against S1 and a monoclonal antibody against the S2 subunit (FIG. 5C). EDV plasmid extraction and quantitation gave a plasmid copy number of ~100 copies pLac-CoV2 per EDV while protein quantitation showed ~16 ng of spike protein per $10^9$ EDVs.

Purified EDV-COVID were loaded with αGC to produce EDV-COVID-αGC and LC-MS/MS measurement from lipid-extracted EDV-COVID-αGC showed ~30 ng of αGC per $10^9$ EDV's. Flow cytometric analysis of murine JAWS II cells treated with EDV-COVID-αGC and stained with anti-CD1d:αGC demonstrated the uptake and CD1d mediated surface presentation of αGC (FIG. 5B). Furthermore, co-staining of JAWS II cells with anti-spike S1 and anti-CD1d:αGC, confirmed the presentation of both S-protein and αGC on the surface of DCs following co-incubation with EDV-COVID-αGC (FIG. 11C).

Figures 11J, 11K:
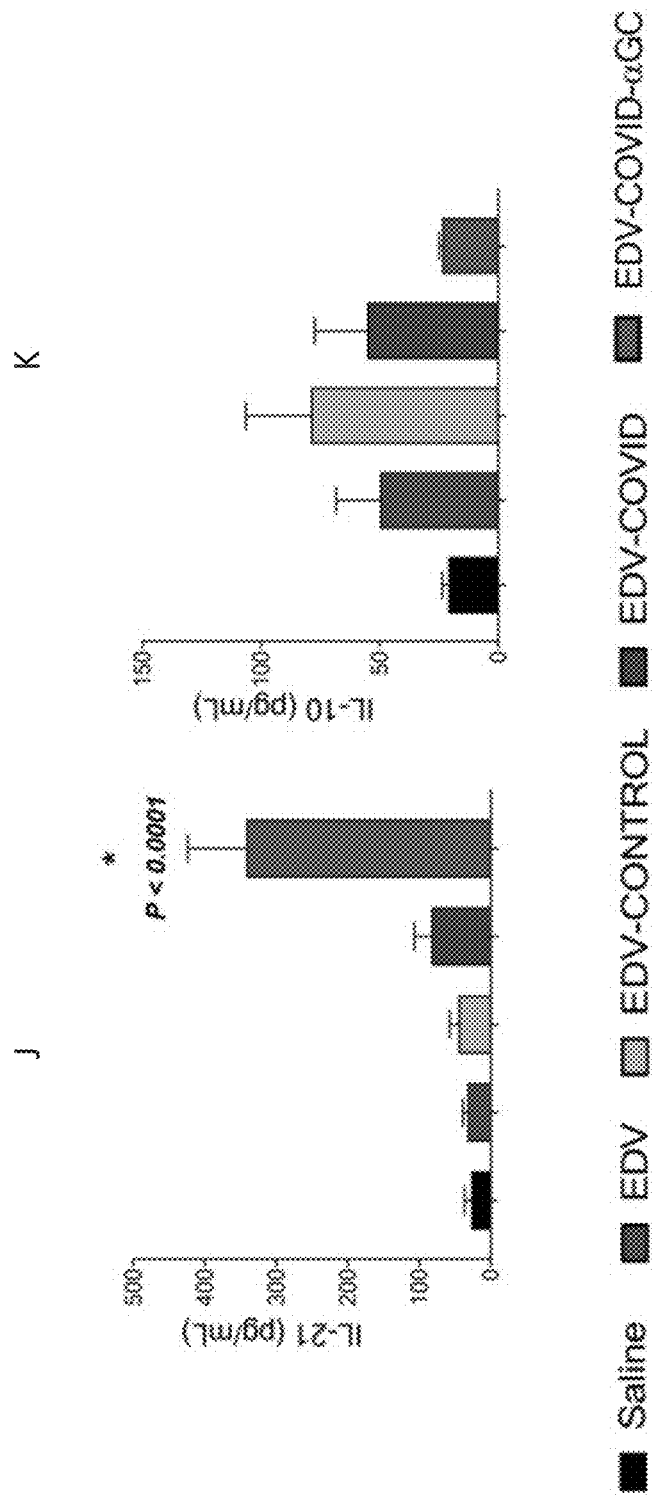

Early cytokine response in mice treated with EDV-COVID-αGC: Intramuscular (i.m.) inoculation of BALB/c mice with a single first dose of $2\times10^9$ or $3\times10^9$ EDV-COVID-αGC resulted in 8 h serum samples showing elevated Th1 cellular immune response cytokines compared to controls. As shown in FIG. 11 (D-I), IFNα, IFNγ, IL-12p40, IL-2, TNFα, and IL-6 rose to significantly higher levels in EDV-COVID-αGC groups compared to controls including Saline, EDV, EDV-CONTROL (spike-negative plasmid) and EDV-COVID (spike protein alone), demonstrating the impact of αGC. IL-21, a Th2 cytokine crucial in anti-viral activity was significantly elevated in mice treated with EDV-COVID-αGC by 8 h (FIG. 11J). IL-10, also a Th2 cytokine was elevated comparatively among all groups (FIG. 11K).

S-protein-specific antibody titers in mice treated with EDV-COVID-αGC: Mice dosed i.m. with $2\times10^9$ or $3\times10^9$ EDVs and an equal boost at day 21 were analyzed for serum IgM and IgG antibody titers at day 28 using S-protein-specific ELISA. Both dose levels of EDV-COVID and EDV-COVID-αGC gave elevated IgM (FIG. 12A) and IgG (FIG. 12B) S-protein-specific antibody titers compared to Saline, EDV and EDV-CONTROL groups. Antibody titers were higher for EDV-COVID-αGC compared to EDV-COVID. IgM (FIG. 12C) and IgG (FIG. 12D) levels were shown to be elevated by day 7 at comparable levels for both EDV-COVID and EDV-COVID-αGC. By day 21 prior to boosting, IgM titers dropped for both EDV-COVID and EDV-COVID-αGC groups (FIG. 12E) but remained elevated for IgG, particularly in the EDV-COVID-αGC group (FIG. 12F).

S-protein-specific B and T cell response: To study the B cell response after immunization of mice at both $2\times10^9$ and $3\times10^9$ levels, bone marrow derived B cells were stimulated ex-vivo with SARS-CoV-2 S-protein and B cell secreted S-specific IgM and IgG titers were measured. A dose of $2\times10^9$ EDV-COVID-αGC resulted in significantly elevated IgM and IgG levels (p=0.0081, p<0.0001) compared to all other groups dosed at $2\times10^9$ and similarly, $3\times10^9$ EDV-COVID-αGC resulted in significantly elevated IgM and IgG levels compared to all other groups at $3\times10^9$ (p<0.0001, p=0.0175) (FIGS. 13A and B).

Figure 13E:
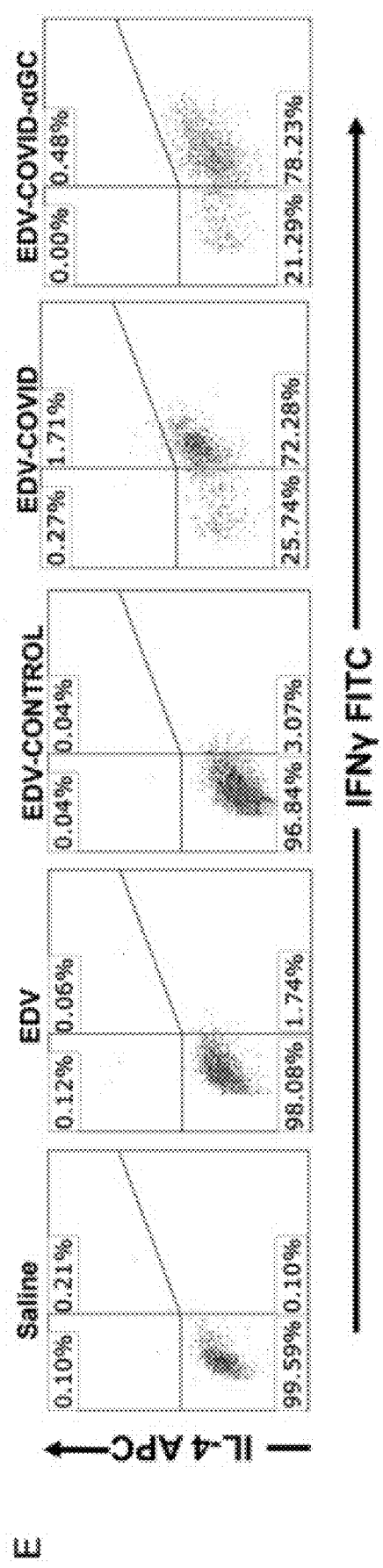
Figures 13F, 13G, 13H, 13I, 13J, 13K:
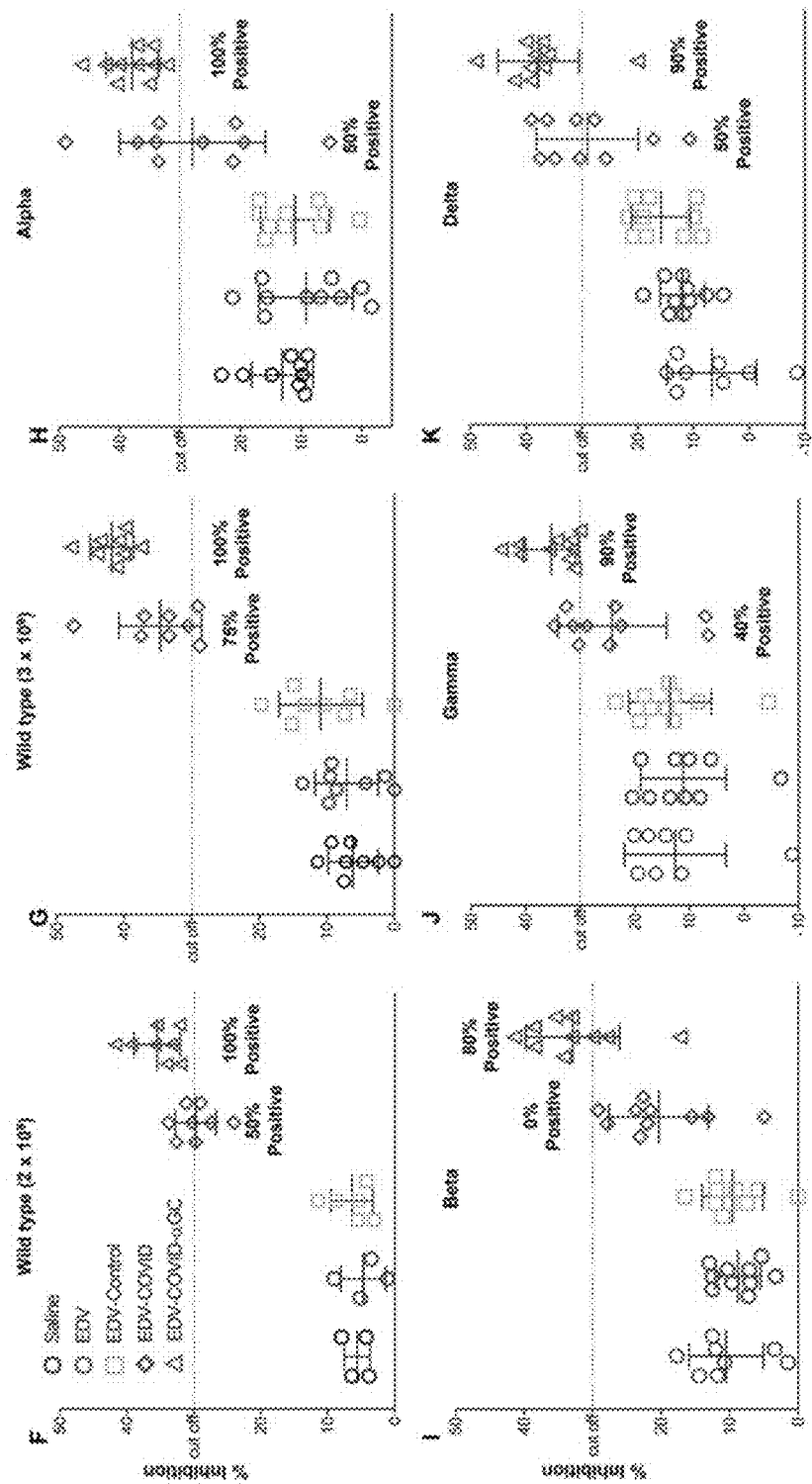

When analyzing the activation marker CD69 as a percentage of CD3/CD69 within the ex vivo splenic CD8$^+$ T cell population by flow cytometry, a dose of $2\times10^9$ EDV-COVID-αGC gave a higher T cell response (p=0.0159) following stimulation with S-protein compared to DMSO stimulation (FIG. 13C). This higher % CD3/CD69 ratio was also observed at a dose of $3\times10^9$ (p=0.0185) (FIG. 13D). In FIG. 13E, Th1/Th2 phenotyping studies following S-protein stimulation of ex-vivo splenocytes, show that CD4+ T cells from EDV-COVID and EDV-COVID-αGC mice produced IFNγ but not IL-4 within 24 h compared to other groups, which had no response.

Multi-strain neutralization by EDV-COVID-αGC measured using a Surrogate Viral Neutralization Test (sVNT): FDA approved cPASS™ sVNT kit was used to evaluate the level of neutralizing antibodies in mouse serum at day 28 post i.m. inoculation of $2\times10^9$ and $3\times10^9$ (for Wild type Wuhan strain) and $3\times10^9$ for Alpha, Beta, Gamma and Delta strains. According to the kit's specifications a sample is deemed positive for neutralization at 30% level of inhibition (Jung et al., 2021; Tan et al., 2020). Following these guidelines, at a dose of both $2\times10^9$ and $3\times10^9$, 100% of the mice treated with EDV-COVID-αGC neutralized RBD from Wild type SARS-CoV-2, while 50% and 75% respectively for the corresponding doses of EDV-COVID showed RBD neutralization (FIGS. 13F and G). 100% of mice treated with $3\times10^9$ EDV-COVID-αGC neutralized the respective RBDs from Alpha strain, 80% Beta and 90% Gamma and Delta (FIG. 13H-K).

Clinical results: Healthy volunteers receiving $9\times10^9$ EDV-COVID-αGC from the phase I study cohorts exhibited strong neutralising activity (>$PRNT_{90}$ equivalent) against wildtype, delta and omicron variants of the SARS-CoV2 virus by day 28. For comparison, neutralisation results have also been included for the omicron variant from 5 volunteers who had received at least 2 doses of the Pfizer vaccine (FIG. 14A). The serum IFNγ (FIG. 14B) and IFNα (FIG. 14C) levels was increased and sustained from these volunteers. Total PBMC analysis showed that there is an increase in $CD4^+$ (FIG. 14*d*) and $CD8^+$ (FIG. 14E) circulating memory B cells in the vaccinated volunteers from day 1 to day 28. Ex vivo PBMCs isolated on day 28 responded to SARS-CoV2 spike protein stimulation and produced elevated levels of IFNγ (FIG. 14F). Similarly, there is an increase in $CD69^+$ T cells in the PBMCs following spike protein stimulation (FIG. 14G). There is an increase in the percentage of spike protein specific B cells in the PBMCs by 2 months post-initial injection (FIG. 1411), a similar trend was also observed in spike protein specific memory B cells (FIG. 14I). B cell class switching was observed by 2 months post-initial injection, which saw a general trend of reduction in $IgM^+$ B cell numbers (FIG. 14J) and an increase in $IgG^+$ B cell numbers (FIG. 14K).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof, inclusive of the endpoints. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

REFERENCES

Agnihothram S, Gopal R, Yount B L, et al. Evaluation of serologic and antigenic relationships between Middle Eastern respiratory syndrome coronavirus and other coronaviruses to develop vaccine platforms for the rapid response to emerging coronaviruses. *J Infect Dis.* 2014; 209(7):995-1006. Available from: http://www.ncbi.nlm.nih.gov/pmc/articles/PMC3952667/

Ansel et al. (1999). In vivo-activated CD4 T cells upregulate CXC chemokine receptor 5 and reprogram their response to lymphoid chemokines. J Exp Med 190, 1123-1134. 10.1084/jem.190.8.1123.

Avery et al. (2008). IL-21-induced isotype switching to IgG and IgA by human naive B cells is differentially regulated by IL-4. Journal of immunology (Baltimore, Md.: 1950) 181, 1767-1779. 10.4049/jimmunol.181.3.1767.

Avery et al. (2010). B cell-intrinsic signaling through IL-21 receptor and STAT3 is required for establishing long-lived antibody responses in humans. J Exp Med 207, 155-171. 10.1084/jem.20091706.

Bauquet et al. (2009). The costimulatory molecule ICOS regulates the expression of c-Maf and IL-21 in the development of follicular T helper cells and TH-17 cells. Nature immunology 10, 167-175. 10.1038/ni.1690.

Beier et al. (2000). Induction, binding specificity and function of human ICOS. European journal of immunology 30, 3707-3717. 10.1002/1521-4141(200012)30: 12<3707::aid-immu3707>3.0.co;2-q.

Bergamaschi et al. (2021). Systemic IL-15, IFN-γ, and IP-10/CXCL10 signature associated with effective immune response to SARS-CoV-2 in BNT162b2 mRNA vaccine recipients. Cell reports 36, 109504. 10.1016/j.celrep.2021.109504.

Bolles M, Deming D, Long K, et al. A double-inactivated severe acute respiratory syndrome coronavirus vaccine provides incomplete protection in mice and induces increased eosinophilic proinflammatory pulmonary response upon challenge. J Virol. 2011; 85(23):12201-12215. Available from: http://jvi.asm.org/content/85/23/12201.abstract Bonhagen et al. (2003). ICOS+ Th cells produce distinct cytokines in different mucosal immune responses. European journal of immunology 33, 392-401. 10.1002/immu.200310013.

Breitfeld et al. (2000). Follicular B helper T cells express CXC chemokine receptor 5, localize to B cell follicles, and support immunoglobulin production. J Exp Med 192, 1545-1552. 10.1084/jem.192.11.1545.

Bricard, G., and Porcelli, S. A. (2007). Antigen presentation by CD1 molecules and the generation of lipid-specific T cell immunity. Cellular and molecular life sciences: CMLS 64, 1824-1840. 10.1007/s00018-007-7007-0.

Brouwer et al. (2020). Potent neutralizing antibodies from COVID-19 patients define multiple targets of vulnerability. Science (New York, N.Y.) 369, 643-650. 10.1126/science.abc5902.

Cele et al. (2021). Escape of SARS-CoV-2 501Y.V2 from neutralization by convalescent plasma. Nature 593, 142-146. 10.1038/s41586-021-03471-w.

Chan et al. Genomic characterization of the 2019 novel human-pathogenic coronavirus isolated from a patient with atypical pneumonia after visiting Wuhan. *Emerg. Microbes Infect.* 9, 221-236 (2020).

Crotty, S. (2014). T follicular helper cell differentiation, function, and roles in disease. Immunity 41, 529-542. 10.1016/j.immuni.2014.10.004.

Drosten C, Günther S, Preiser W, et al. Identification of a novel coronavirus in patients with severe acute respiratory syndrome. *N Engl J Med.* 2003; 348(20):1967-1976.

Duan, Y. N. & Qin, J. Pre- and posttreatment chest CT findings: 2019 novel coronavirus (2019-nCoV) pneumonia. Radiology 2020.

Eertwegh et al. (1993). In vivo CD40-gp39 interactions are essential for thymus-dependent humoral immunity. I. In vivo expression of CD40 ligand, cytokines, and antibody production delineates sites of cognate T-B cell interactions. The Journal of experimental medicine 178, 1555-1565. 10.1084/jem.178.5.1555.

Ewer et al. (2021). T cell and antibody responses induced by a single dose of ChAdOx1 nCoV-19 (AZD1222) vaccine in a phase 1/2 clinical trial. Nature Medicine 27, 270-278. 10.1038/s41591-020-01194-5.

Garside et al. (1998). Visualization of specific B and T lymphocyte interactions in the lymph node. Science (New York, N.Y.) 281, 96-99. 10.1126/science.281.5373.96.

Grohskopf, L. A. et al. Prevention and control of seasonal influenza with vaccines: Recommendations of the Advisory Committee on Immunization Practices-United States, 2018-19 influenza season. MMWR. Recomm. Rep. 67, 1-20 (2018).

Guan, W. et al. Clinical characteristics of 2019 novel coronavirus infection in China. medRxiv. (2020).

Gunn et al. (1998). A B-cell-homing chemokine made in lymphoid follicles activates Burkitt's lymphoma receptor-1. Nature 391, 799-803. 10.1038/35876.

Haidar et al. (2021). Immunogenicity of COVID-19 Vaccination in Immunocompromised Patients: An Observational, Prospective Cohort Study Interim Analysis. medRxiv, 2021.2006.2028.21259576. 10.1101/2021.06.28.21259576.

Hermans et al. (2003). NKT cells enhance CD4+ and CD8+ T cell responses to soluble antigen in vivo through direct interaction with dendritic cells. Journal of immunology (Baltimore, Md.: 1950) 171, 5140-5147. 10.4049/jimmunol.171.10.5140.

Hu et al. (2011). Noncanonical NF-kappaB regulates inducible costimulator (ICOS) ligand expression and T follicular helper cell development. Proc Natl Acad Sci USA 108, 12827-12832. 10.1073/pnas.1105774108.

Huang et al., Clinical features of patients infected with 2019 novel coronavirus in Wuhan, China. Lancet. 395, 497-506 (2020).

Jacob et al. (1991). Intraclonal generation of antibody mutants in germinal centres. Nature 354, 389-392. 10.1038/354389a0.

Jiang, S., He, Y. & Liu, S. SARS vaccine development. Emerg. Infect. Dis. 11, 1016-1020 (2005).

Jung et al. (2021). Analytical and clinical performance of cPass neutralizing antibodies assay. Clinical biochemistry. 10.1016/j.clinbiochem.2021.09.008.

Kao et al. (2015). A Significant Metabolic and Radiological Response after a Novel Targeted MicroRNA-based Treatment Approach in Malignant Pleural Mesothelioma. Am J Respir Crit Care Med 191, 1467-1469. 10.1164/rccm.201503-0461LE.

Kim et al. (2001). Subspecialization of CXCR5+ T cells: B helper activity is focused in a germinal center-localized subset of CXCR5+ T cells. J Exp Med 193, 1373-1381. 10.1084/jem.193.12.1373.

Ksiazek T G, Erdman D, Goldsmith C S, et al. A novel coronavirus associated with severe acute respiratory syndrome. N Engl J Med. 2003; 348(20):1953-1966.

Lan et al. (2020). Structure of the SARS-CoV-2 spike receptor-binding domain bound to the ACE2 receptor. Nature 581, 215-220. 10.1038/s41586-020-2180-5.

Lew T W K, Kwek T-K, Tai D, et al. Acute respiratory distress syndrome in critically Ill patients with severe acute respiratory syndrome. JAMA. 2003; 290(3):374-380. Available from: http://iama.ama-assn.org/cgi/content/abstract/290/3/374.

Liang et al. (2020). Cancer patients in SARS-CoV-2 infection: a nationwide analysis in China. Lancet Oncol 21, 335-337. 10.1016/51470-2045(20)30096-6.

Lohning et al. (2003). Expression of ICOS in vivo defines CD4+ effector T cells with high inflammatory potential and a strong bias for secretion of interleukin 10. J Exp Med 197, 181-193. 10.1084/jem.20020632.

Ma, C. S., and Deenick, E. K. (2014). Human T follicular helper (Tfh) cells and disease. Immunology and cell biology 92, 64-71. 10.1038/icb.2013.55.

MacDiarmid et al. (2009). Sequential treatment of drug-resistant tumors with targeted minicells containing siRNA or a cytotoxic drug. Nat Biotechnol 27, 643-651. 10.1038/nbt.1547.

MacDiarmid et al. (2007). Bacterially derived 400 nm particles for encapsulation and cancer cell targeting of chemotherapeutics. Cancer Cell 11, 431-445. 10.1016/j.ccr.2007.03.012.

MacLennan, I. C. (1994). Germinal centers. Annual review of immunology 12, 117-139. 10.1146/annurev.iy.12.040194.001001.

Menachery V D, Yount B L Jr, Debbink K, et al. A SARS-like cluster of circulating bat coronaviruses shows potential for human emergence. Nat Med. 2015; 21:1508-1513.

Pegu et al. (2021). Durability of mRNA-1273 vaccine-induced antibodies against SARS-CoV-2 variants. Science (New York, N.Y.) 373, 1372-1377. 10.1126/science.abj4176.

Pène et al. (2004). Cutting edge: IL-21 is a switch factor for the production of IgG1 and IgG3 by human B cells. Journal of immunology (Baltimore, Md.: 1950) 172, 5154-5157. 10.4049/jimmunol.172.9.5154.

Regla-Nava, J. A. et al. Severe acute respiratory syndrome coronaviruses with mutations in the E protein are attenuated and promising vaccine candidates. J. Virol. 89, 3870-3887 (2015).

Sagnella et al. (2020). Cyto-Immuno-Therapy for Cancer: A Pathway Elicited by Tumor-Targeted, Cytotoxic Drug-Packaged Bacterially Derived Nanocells. Cancer Cell 37, 354-370 e357. 10.1016/j.ccell.2020.02.001.

Sattler et al. (2020). SARS-CoV-2-specific T cell responses and correlations with COVID-19 patient predisposition. J Clin Invest 130, 6477-6489. 10.1172/jci140965.

Schoggins J W, Wilson S J, Panis M, et al. A diverse range of gene products are effectors of the type I interferon antiviral response. Nature. 2011; 472(7344):481-485.

Sartorius et al. (2018). Vectorized Delivery of Alpha-GalactosylCeramide and Tumor Antigen on Filamentous Bacteriophage fd Induces Protective Immunity by Enhancing Tumor-Specific T Cell Response. Front Immunol 9, 1496. 10.3389/fimmu.2018.01496.

Schaerli et al. (2000). CXC chemokine receptor 5 expression defines follicular homing T cells with B cell helper function. J Exp Med 192, 1553-1562. 10.1084/jem.192.11.1553.

Shang W, Yang Y, Rao Y, and Rao X. The outbreak of SARS-CoV-2 pneumonia calls for viral Vaccines npj Vaccines (2020) 5:18.

Sheahan T, Whitmore A, Long K, et al. Successful vaccination strategies that protect aged mice from lethal challenge from influenza virus and heterologous severe acute respiratory syndrome coronavirus. J Virol. 2011; 85(1):217-230. Available from: http://jvi.asm.org/content/85/1/217.abstract.

Singh et al. (2014). Direct incorporation of the NKT-cell activator alpha-galactosylceramide into a recombinant Listeria monocytogenes improves breast cancer vaccine efficacy. Br J Cancer 111, 1945-1954. 10.1038/bjc.2014.486.

Song et al. (2018). Cryo-EM structure of the SARS coronavirus spike glycoprotein in complex with its host cell receptor ACE2. PLoS pathogens 14, e1007236. 10.1371/journal.ppat.1007236.

Su et. al., Infection and Immunity, 60(8):3345-3359 (1992).

Tan et al. (2020). A SARS-CoV-2 surrogate virus neutralization test based on antibody-mediated blockage of ACE2-spike protein-protein interaction. Nat Biotechnol 38, 1073-1078. 10.1038/s41587-020-0631-z.

Toellner et al. (1996). Immunoglobulin switch transcript production in vivo related to the site and time of antigen-specific B cell activation. Journal of Experimental Medicine 183, 2303-2312. 10.1084/jem.183.5.2303.

Uriu et al. (2021). Ineffective neutralization of the SARS-CoV-2 Mu variant by convalescent and vaccine sera. bioRxiv, 2021.2009.2006.459005. 10.1101/2021.09.06.459005.

van Zandwijk et al. (2017). Safety and activity of microRNA-loaded minicells in patients with recurrent malignant pleural mesothelioma: a first-in-man, phase 1, open-label, dose-escalation study. Lancet Oncol 18, 1386-1396. 10.1016/S1470-2045(17)30621-6.

Vinuesa et al. (2016). Follicular Helper T Cells. Annual review of immunology 34, 335-368. 10.1146/annurev-immunol-041015-055605.

von Gerichten et al. (2017). Diastereomer-specific quantification of bioactive hexosylceramides from bacteria and mammals. J Lipid Res 58, 1247-1258. 10.1194/jlr.D076190.

Whittle et al. (2015). First in human nanotechnology doxorubicin delivery system to target epidermal growth factor receptors in recurrent glioblastoma. J Clin Neurosci 22, 1889-1894. 10.1016/j.jocn.2015.06.005.

Wu, F. et al. A new coronavirus associated with human respiratory disease in China. Nature. (2020).

Zaki A M, van Boheemen S, Bestebroer T M, et al. Isolation of a novel coronavirus from a man with pneumonia in Saudi Arabia. *N Engl J Med.* 2012; 367(19):1814-1820.

What is claimed is:

1. A composition comprising:
   (a) a vector comprising:
      (i) at least one viral antigen protein from a SARS-CoV-2 variant; and
      (ii) a plasmid that encodes the least one viral antigen protein; and
   (b) a vector comprising α-galactosylceramide (α-GalCer); and
   (c) at least one pharmaceutically acceptable carrier, wherein at least one of vector (a) and vector (b) is an intact, bacterially-derived minicell or killed bacterial cell.

2. The composition of claim 1, wherein the SARS-CoV-2 variant is selected from the group consisting of:
   (a) UK SARS-CoV-2 variant (B.1.1.7/VOC-202012/01);
   (b) B.1.1.7 with E484K variant;
   (c) B.1.617.2 (Delta) variant;
   (d) B.1.617 variant;
   (e) B.1.617.1 (Kappa) variant;
   (f) B.1.617.3 variant;
   (g) South Africa B.1.351 (Beta) variant;
   (h) P.1 (Gamma) variant;
   (i) B.1.525 (Eta) variant;
   (j) B.1.526 (Iota) variant;
   (k) Lambda (lineage C.37) variant;
   (l) Epsilon (lineage B.1.429) variant;
   (m) Epsilon (lineage B.1.427) variant;
   (n) Epsilon (lineage CAL.20C) variant;
   (o) Zeta (lineage P.2) variant;
   (p) Theta (lineage P.3) variant;
   (q) R.1 variant;
   (r) Lineage B.1.1.207 variant; and
   (s) Lineage B.1.620 variant.

3. The composition of claim 1, wherein the SARS-CoV-2 variant is selected from the group consisting of a SARS-CoV-2 variant comprising:
   (a) a L452R Spike Protein Substitution;
   (b) an E484K Spike Protein Substitution;
   (c) K417N Spike Protein Substitution;
   (d) E484K Spike Protein Substitution;
   (e) N501Y Spike Protein Substitution;
   (f) K417T Spike Protein Substitution;
   (g) E484K Spike Protein Substitution;
   (h) N501Y Spike Protein Substitution; and
   (h) SARs-CoV-2 variants having one or more of the following missense mutations: N440, L452R, S477G/N, E484Q, E484K, N501Y, D614G, P681H, P681R, and A701V.

4. The composition of claim 1, wherein:
   (a) the vector (a) additionally comprises at least one viral antigen from a SARS-CoV-2 strain; and/or
   (b) the vector (a) additionally comprises at least one viral antigen from a SARS-CoV-2 strain, and wherein the SARS-CoV-2 strain is selected from the group consisting of the L strain, the S strain, the V strain, the G strain, the GR strain, and the GH strain; and/or
   (c) the vector (a) additionally comprises at least one viral antigen from a SARS-CoV-2 strain, wherein the viral antigen is encoded by a polynucleotide comprising the sequence of SARS-CoV-2, or a polynucleotide having at least 80% sequence identity to the polynucleotide comprising the sequence of SARS-CoV-2.

5. The composition of claim 1, wherein the plasmid encodes:
   (a) at least one of spike(S) protein, nucleocapsid (N) protein, membrane (M) protein, and envelope (E) protein of SARS-CoV-2 or a SARS-CoV-2 variant; and/or
   (b) the spike(S) protein, nucleocapsid (N) protein, membrane (M) protein, and the envelope (E) protein; and/or
   (c) the spike(S) protein of SARS-CoV-2 or a SARS-CoV-2 variant; and/or
   (c) the receptor binding domain (RBD) of a Spike protein of SARS-CoV-2 or a SARS-CoV-2 variant.

6. The composition of claim 1, wherein:
   (a) vector (a) is a first intact, bacterially derived minicell or killed bacterial cell, and vector (b) is a second intact, bacterially derived minicell or killed bacterial cell; and/or
   (b) vector (a) and vector (b) are the same intact, bacterially derived minicell or killed bacterial cell, comprising the α-GalCer and the plasmid that encodes at least one viral antigen protein from a SARS-CoV-2 variant; and/or
   (c) one of vector (a) and vector (b) is not an intact, bacterially derived minicell or killed bacterial cell and the other of vector (a) and vector (b) is an intact, bacterially derived minicell or killed bacterial cell.

7. The composition of claim 1, wherein the composition is formulated for oral administration, injection, nasal administration, pulmonary administration, or topical administration.

8. A method of treating and/or vaccinating against a viral infection, comprising administering to a subject in need a composition comprising administering to a subject in need a composition according to claim 1.

9. The method of claim 8, wherein the subject:
   (a) is suffering from or at risk of developing lymphopenia; and/or
   (b) is deemed at risk for severe illness and/or serious complications from the viral infection; and/or
   (c) is about age 50 or older, about age 55 or older, about age 60 or older, or about age 65 or older; and/or
   (d) suffers from one or more pre-existing conditions selected from the group consisting of diabetes, asthma, a respiratory disorder, high blood pressure, and heart disease; and/or
   (e) is immunocompromised; and/or
   (f) is immunocompromised due to AIDS, cancer, a cancer treatment, hepatitis, an auto-immune disease, steroid receiving, immunosenescence, or any combination thereof.

10. The method of claim 8, wherein administration:
    (a) increases the chance of survival following exposure to a coronavirus; and/or
    (b) reduces the risk of transmission of coronavirus.

11. The method of claim 10, wherein:
    (a) the chance of survival is increased by about 10%, about 20%, about 30%, about 40%, about 50%, about 60%, about 70%, about 80%, about 90%, or about 100%, as measured using any clinically recognized technique; and/or (b) the reduction in risk of transmission is by about 10%, about 20%, about 30%, about 40%, about 50%, about 60%, about 70%, about 80%, about 90%, or about 100%, as measured using any clinically recognized technique.

12. The method of claim 8, wherein administering is via any pharmaceutically acceptable methods.

13. The method of claim 8, wherein the subject is exposed to or is anticipated to be exposed to an individual who is contagious for a coronavirus.

14. The method of claim 13, wherein the individual who is contagious for a coronavirus has one or more symptoms selected from the group consisting of fever, cough, shortness of breath, diarrhea, sneezing, runny nose, and sore throat.

15. The method of claim 8, wherein the subject is a healthcare worker, aged 60 years or older, frequent traveler, military personnel, caregiver, or a subject with a preexisting condition that results in increased risk of mortality with infection.

16. The method of claim 8:
(a) further comprising administering one or more antiviral drugs; and/or
(b) further comprising administering one or more antiviral drugs, wherein the one or more antiviral drugs are selected from the group consisting of chloroquine, darunavir, galidesivir, interferon beta, lopinavir, ritonavir, remdesivir, and triazavirin.

17. The method of claim 8, wherein the α-GalCer induces a Th1 cytokine response in the subject, and optionally wherein the cytokine comprises IFNγ.

18. The method of claim 8, wherein:
(a) a first minicell comprising the α-GalCer and a second minicell comprising the plasmid encoding at least one viral antigen are administered to the subject simultaneously; and/or
(b) a first minicell comprising the α-GalCer and a second minicell comprising the plasmid encoding at least one viral antigen are administered to the subject sequentially; and/or
(c) a first minicell comprising the α-GalCer and second minicells comprising the plasmid encoding at least one viral antigen are administered to the subject repeatedly; and/or
(d) a first minicell comprising the α-GalCer and second minicells comprising the plasmid encoding at least one viral antigen are administered to the subject at least once a week, twice a week, three times per week, or four times per week.

19. The composition of claim 1, wherein the plasmid encodes a Spike protein from at least one of SARS-CoV-2 variant Alpha (B.1.1.7.UK), SARS-CoV-2 variant Beta (B.1.351. SA), SARS-CoV-2 variant Delta (B.1.617.2 India), and/or SARS-CoV-2 variant Gamma (P.1 Brazil).

20. The composition of claim 1, wherein vector (a) and vector (b) are the same intact, bacterially derived minicell or killed bacterial cell, comprising the α-GalCer, the plasmid that encodes at least one SARS-CoV-2 viral antigen protein, wherein at least some of the SARS-CoV-2 variant antigen protein is present in the membrane of the intact bacterially derived minicell or killed bacterial cell.

* * * * *